US008730836B2

(12) United States Patent
Cohen et al.

(10) Patent No.: US 8,730,836 B2
(45) Date of Patent: May 20, 2014

(54) CONDITIONALLY INTERCEPTING DATA INDICATING ONE OR MORE ASPECTS OF A COMMUNIQUÉ TO OBFUSCATE THE ONE OR MORE ASPECTS OF THE COMMUNIQUÉ

(75) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); Mark A. Malamud, Seattle, WA (US); William H. Mangione-Smith, Kirkland, WA (US); John D. Rinaldo, Jr., Bellevue, WA (US); Clarence T. Tegreene, Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 285 days.

(21) Appl. No.: 12/807,701

(22) Filed: Sep. 10, 2010

(65) Prior Publication Data

US 2011/0083010 A1 Apr. 7, 2011

Related U.S. Application Data

(63) Continuation-in-part of application No. 12/228,664, filed on Aug. 14, 2008, and a continuation-in-part of application No. 12/228,873, filed on Aug. 15, 2008, and a continuation-in-part of application No. 12/287,268, filed on Oct. 7, 2008, now Pat. No. 8,224,907, and a continuation-in-part of application No. 12/454,113, filed on May 12, 2009, and a continuation-in-part of application No. 12/806,738, filed on Aug. 18, 2010, and a continuation-in-part of application No. 12/799,794, filed on Apr. 29, 2010, and a continuation-in-part of application No. 12/802,139, filed on May 27, 2010, and a continuation-in-part of application No. 12/802,136, filed on May 28, 2010, and a continuation-in-part of application No. 12/802,863, filed on Jun. 14, 2010, and a continuation-in-part of application No. 12/802,922, filed on Jun. 15, 2010, and a continuation-in-part of application No. 12/804,765, filed on Jul. 27, 2010, and a continuation-in-part of application No. 12/804,832, filed on Jul. 28, 2010, and a continuation-in-part of application No. 12/806,677, filed on Aug. 17, 2010, and a continuation-in-part of application No. 12/807,700, filed on Sep. 9, 2010.

(51) Int. Cl.
*H04L 12/28* (2006.01)
*H04M 1/66* (2006.01)
*H04M 3/42* (2006.01)

(52) U.S. Cl.
USPC ............ 370/254; 370/230; 455/411; 455/415

(58) Field of Classification Search
None
See application file for complete search history.

(56) References Cited

U.S. PATENT DOCUMENTS 3,985,972 A 10/1976 Rolin et al.
4,218,738 A 8/1980 Matyas et al.

(Continued)

OTHER PUBLICATIONS

"Sometimes, I just don't want them to know it's me calling . . . "; spoofcard.com; pp. 1-2; located at: http://www.spoofcard.com/; printed on Jul. 8, 2010.

(Continued)

*Primary Examiner* — Otis L Thompson, Jr.
*Assistant Examiner* — Jenkey Van

(57) ABSTRACT

A computationally implemented method includes, but is not limited to: intercepting communiqué aspect data that is directed to an end user entity and that indicates one or more aspects of a communiqué directed to the end user entity and that is affiliated with a particular source entity, the intercepting of the communiqué aspect data being in accordance with one or more conditional directives of the end user entity to conditionally obfuscate the communiqué affiliated with the source entity; and transmitting to the end user entity, in response to intercepting the communiqué aspect data and in lieu of transmitting direct indication of the communiqué to the end user entity, covert indicator data that upon reception by the end user entity covertly indicates the one or more aspects of the communiqué. In addition to the foregoing, other method aspects are described in the claims, drawings, and text forming a part of the present disclosure.

47 Claims, 22 Drawing Sheets

100

(56) References Cited

U.S. PATENT DOCUMENTS 5,493,692 A 2/1996 Theimer et al.
5,508,699 A 4/1996 Silverman
5,732,138 A 3/1998 Noll et al.
5,751,806 A 5/1998 Ryan
5,812,639 A 9/1998 Bartholomew et al.
5,835,856 A 11/1998 Patel
5,933,498 A 8/1999 Schneck et al.
6,005,926 A 12/1999 Mashinsky
6,026,291 A 2/2000 Carlsson et al.
6,199,102 B1 3/2001 Cobb
6,224,109 B1 5/2001 Yang
6,351,745 B1 2/2002 Itakura et al.
6,396,531 B1 5/2002 Gerszberg et al.
6,496,931 B1 12/2002 Rajchel et al.
6,510,236 B1 1/2003 Crane et al.
6,522,889 B1 2/2003 Aarnio
6,529,592 B1 3/2003 Khan
6,563,913 B1 5/2003 Kaghazian
6,591,291 B1 7/2003 Gabber et al.
6,738,808 B1 5/2004 Zellner et al.
6,816,885 B1 11/2004 Raghunandan
6,857,021 B1 2/2005 Schuster et al.
6,918,039 B1 7/2005 Hind et al.
6,937,730 B1 8/2005 Buxton
6,985,569 B2 1/2006 Baker
6,990,590 B2 1/2006 Hanson et al.
7,007,025 B1 2/2006 Nason et al.
7,133,837 B1 11/2006 Barnes, Jr.
7,159,011 B1 1/2007 Knight et al.
7,203,315 B1 4/2007 Livesay
7,225,342 B2 5/2007 Takao et al.
7,248,885 B2 * 7/2007 Benco et al. .................. 455/461
7,275,090 B2 9/2007 Oeda et al.
7,308,251 B2 12/2007 Karaoguz
7,310,816 B1 12/2007 Burns et al.
7,327,312 B1 2/2008 Harris
7,334,267 B2 2/2008 Engstrom
7,363,024 B2 4/2008 Jenkins
7,382,881 B2 6/2008 Uusitalo et al.
7,389,541 B2 6/2008 Jia et al.
7,400,878 B2 7/2008 Hassan et al.
7,401,159 B1 7/2008 Aviani et al.
7,458,095 B2 11/2008 Forsberg
7,567,936 B1 7/2009 Peckover et al.
7,614,081 B2 11/2009 Prohel et al.
7,616,943 B2 11/2009 Oesterling
7,623,639 B2 * 11/2009 Thai et al. ................ 379/142.04
7,627,334 B2 12/2009 Cohen et al.
7,630,495 B2 12/2009 Kiiveri et al.
7,634,295 B2 12/2009 Hayaashi et al.
7,643,484 B2 1/2010 Willman et al.
7,724,918 B2 5/2010 Balakrishnan et al.
7,783,741 B2 8/2010 Hardt
7,787,870 B2 * 8/2010 Burgan et al. ................. 455/415
7,797,024 B2 * 9/2010 Sutardja ........................ 455/574
7,814,017 B2 10/2010 Vancini et al.
7,920,050 B2 4/2011 Juels et al.
7,921,052 B2 4/2011 Dabney et al.
7,966,664 B2 6/2011 Makkinejad
8,140,062 B1 3/2012 Hildner et al.
8,190,128 B1 * 5/2012 Lundy et al. .................. 455/411
2001/0023432 A1 9/2001 Council et al.
2001/0031631 A1 10/2001 Pitts
2001/0034677 A1 10/2001 Farhat et al.
2001/0034723 A1 10/2001 Subramaniam
2001/0036822 A1 11/2001 Mead et al.
2002/0044067 A1 4/2002 Ilcisin
2002/0077078 A1 6/2002 Antti
2002/0081972 A1 6/2002 Rankin
2002/0099822 A1 7/2002 Rubin et al.
2002/0111954 A1 8/2002 McCoy
2002/0143869 A1 10/2002 Cohen
2002/0154055 A1 10/2002 Davis et al.
2002/0163572 A1 11/2002 Center, Jr. et al.
2002/0169664 A1 11/2002 Walker et al.
2002/0169840 A1 11/2002 Sheldon et al.
2002/0174073 A1 11/2002 Nordman et al.
2002/0174363 A1 11/2002 Chefalas et al.
2002/0177449 A1 11/2002 McDonnell et al.
2002/0188562 A1 12/2002 Igarashi et al.
2002/0198777 A1 12/2002 Yuasa
2003/0008672 A1 1/2003 Fujii
2003/0009593 A1 1/2003 Apte
2003/0014286 A1 1/2003 Cappellini
2003/0014637 A1 1/2003 Ellison et al.
2003/0021413 A1 1/2003 Kiiveri et al.
2003/0044050 A1 3/2003 Clark et al.
2003/0086543 A1 5/2003 Raymond
2003/0134645 A1 7/2003 Stern et al.
2003/0145039 A1 7/2003 Bonney et al.
2003/0149881 A1 8/2003 Patel et al.
2003/0154254 A1 8/2003 Awasthi
2003/0158960 A1 8/2003 Engberg
2003/0177357 A1 9/2003 Chamberlin et al.
2003/0217151 A1 11/2003 Roese et al.
2003/0217287 A1 11/2003 Kruglenko
2003/0220978 A1 11/2003 Rhodes
2003/0224754 A1 12/2003 Herzog
2003/0227386 A1 12/2003 Pulkkinen et al.
2003/0233329 A1 12/2003 Laraki et al.
2004/0015553 A1 1/2004 Griffin et al.
2004/0030932 A1 2/2004 Juels et al.
2004/0064692 A1 4/2004 Kahn et al.
2004/0064734 A1 4/2004 Ehrlich
2004/0083166 A1 4/2004 Pailles
2004/0111625 A1 6/2004 Duffy et al.
2004/0139204 A1 7/2004 Ergezinger et al.
2004/0162904 A1 8/2004 Eida et al.
2004/0165702 A1 8/2004 Finnigan
2004/0178880 A1 9/2004 Meyer et al.
2004/0181683 A1 9/2004 Jia et al.
2004/0203776 A1 10/2004 Jun
2004/0248588 A1 12/2004 Pell et al.
2004/0254998 A1 12/2004 Horvitz
2004/0255127 A1 12/2004 Arnouse
2005/0004871 A1 1/2005 Dort
2005/0008135 A1 * 1/2005 Bressler ................... 379/211.01
2005/0027618 A1 2/2005 Zucker et al.
2005/0031106 A1 * 2/2005 Henderson ............... 379/142.17
2005/0044423 A1 2/2005 Mellmer et al.
2005/0048951 A1 3/2005 Saito
2005/0075096 A1 * 4/2005 Aljuraid ..................... 455/414.1
2005/0084100 A1 4/2005 Spies et al.
2005/0091393 A1 4/2005 Gleeson et al.
2005/0091543 A1 4/2005 Holtzman et al.
2005/0100140 A1 5/2005 Tsai
2005/0114343 A1 5/2005 Wesinger, Jr. et al.
2005/0136903 A1 6/2005 Kashima et al.
2005/0172120 A1 8/2005 Wang et al.
2005/0192056 A1 9/2005 Karaki
2005/0198131 A1 9/2005 Appelman et al.
2005/0204008 A1 9/2005 Shinbrood
2005/0204037 A1 9/2005 Levy
2005/0227705 A1 10/2005 Rousu et al.
2005/0232423 A1 10/2005 Horvitz et al.
2005/0246419 A1 11/2005 Jaatinen
2005/0275543 A1 12/2005 Hisano
2006/0005023 A1 1/2006 Homer et al.
2006/0026438 A1 2/2006 Stern et al.
2006/0031369 A1 2/2006 Caron et al.
2006/0041507 A1 2/2006 Novack et al.
2006/0052095 A1 3/2006 Vazvan
2006/0079238 A1 4/2006 Liu et al.
2006/0099967 A1 * 5/2006 Colvin et al. .............. 455/456.4
2006/0109983 A1 5/2006 Young et al.
2006/0116142 A1 6/2006 Cofta
2006/0123245 A1 6/2006 Avidan et al.
2006/0152374 A1 7/2006 Singer et al.
2006/0167991 A1 7/2006 Heikes et al.
2006/0168059 A1 7/2006 Chang et al.
2006/0173957 A1 8/2006 Robinson et al.
2006/0176821 A1 8/2006 Hemesath et al.
2006/0227955 A1 * 10/2006 Thai et al. ................ 379/201.11
2006/0248011 A1 11/2006 Hecht-Nielsen et al.

(56) References Cited

U.S. PATENT DOCUMENTS

| | | | | |
|---|---|---|---|---|
| 2006/0256959 | A1 | 11/2006 | Hymes | |
| 2006/0274896 | A1 | 12/2006 | Livesay | |
| 2006/0276226 | A1 | 12/2006 | Jiang | |
| 2007/0022165 | A1 * | 1/2007 | Daniels et al. | 709/206 |
| 2007/0030824 | A1 | 2/2007 | Ribaudo et al. | |
| 2007/0032225 | A1 | 2/2007 | Konicek et al. | |
| 2007/0036314 | A1 | 2/2007 | Kloberdans et al. | |
| 2007/0074046 | A1 | 3/2007 | Czajkowski et al. | |
| 2007/0127658 | A1 | 6/2007 | Gruchala et al. | |
| 2007/0130323 | A1 | 6/2007 | Landsman et al. | |
| 2007/0140145 | A1 | 6/2007 | Kumar et al. | |
| 2007/0180122 | A1 | 8/2007 | Barrett | |
| 2007/0203644 | A1 | 8/2007 | Thota et al. | |
| 2007/0204026 | A1 | 8/2007 | Berger | |
| 2007/0208816 | A1 | 9/2007 | Baldwin et al. | |
| 2007/0208947 | A1 | 9/2007 | Sudo et al. | |
| 2007/0242827 | A1 | 10/2007 | Prafullchandra et al. | |
| 2007/0243880 | A1 | 10/2007 | Gits et al. | |
| 2007/0250571 | A1 | 10/2007 | Griffin, Jr. | |
| 2007/0250641 | A1 | 10/2007 | Flannery et al. | |
| 2007/0255704 | A1 | 11/2007 | Baek et al. | |
| 2007/0264974 | A1 | 11/2007 | Frank et al. | |
| 2007/0277235 | A1 | 11/2007 | Barrett et al. | |
| 2007/0293202 | A1 | 12/2007 | Moshir et al. | |
| 2007/0294096 | A1 | 12/2007 | Randall et al. | |
| 2008/0005325 | A1 | 1/2008 | Wynn et al. | |
| 2008/0010665 | A1 | 1/2008 | Hinton et al. | |
| 2008/0056468 | A1 | 3/2008 | Fredlund et al. | |
| 2008/0071544 | A1 | 3/2008 | Beaufays et al. | |
| 2008/0086646 | A1 | 4/2008 | Pizano | |
| 2008/0108324 | A1 | 5/2008 | Moshir et al. | |
| 2008/0118150 | A1 | 5/2008 | Balakrishnan et al. | |
| 2008/0130630 | A1 | 6/2008 | Shim et al. | |
| 2008/0146157 | A1 | 6/2008 | Aaron | |
| 2008/0154697 | A1 | 6/2008 | Guday et al. | |
| 2008/0163365 | A1 | 7/2008 | Austin et al. | |
| 2008/0169903 | A1 | 7/2008 | Fein et al. | |
| 2008/0196098 | A1 | 8/2008 | Cottrell et al. | |
| 2008/0207329 | A1 | 8/2008 | Wallace et al. | |
| 2008/0235336 | A1 | 9/2008 | Stern et al. | |
| 2008/0247543 | A1 | 10/2008 | Mick et al. | |
| 2008/0248815 | A1 | 10/2008 | Busch | |
| 2008/0250129 | A1 | 10/2008 | Carpenter et al. | |
| 2008/0254817 | A1 | 10/2008 | Tornkvist | |
| 2008/0267099 | A1 | 10/2008 | Curcio et al. | |
| 2008/0294726 | A1 | 11/2008 | Sidman | |
| 2008/0300859 | A1 | 12/2008 | Chen et al. | |
| 2008/0318598 | A1 | 12/2008 | Fry | |
| 2009/0005072 | A1 | 1/2009 | Forstall et al. | |
| 2009/0081989 | A1 | 3/2009 | Wuhrer | |
| 2009/0099701 | A1 | 4/2009 | Li et al. | |
| 2009/0109037 | A1 | 4/2009 | Farmer | |
| 2009/0131022 | A1 | 5/2009 | Buckley et al. | |
| 2009/0132419 | A1 | 5/2009 | Grammer et al. | |
| 2009/0158054 | A1 | 6/2009 | Dijk et al. | |
| 2009/0170532 | A1 | 7/2009 | Lee et al. | |
| 2009/0183215 | A1 | 7/2009 | McCartie et al. | |
| 2009/0195445 | A1 | 8/2009 | DeHaas | |
| 2009/0204580 | A1 | 8/2009 | Seamon et al. | |
| 2009/0215469 | A1 | 8/2009 | Fisher et al. | |
| 2009/0227268 | A1 | 9/2009 | Sorensson et al. | |
| 2009/0234764 | A1 | 9/2009 | Friesen | |
| 2009/0248844 | A1 | 10/2009 | Sommer et al. | |
| 2009/0275363 | A1 | 11/2009 | McGregor et al. | |
| 2009/0298474 | A1 | 12/2009 | George | |
| 2009/0318112 | A1 | 12/2009 | Vasten | |
| 2009/0319172 | A1 | 12/2009 | Almeida et al. | |
| 2010/0009657 | A1 | 1/2010 | Dingler et al. | |
| 2010/0015991 | A1 | 1/2010 | Evans et al. | |
| 2010/0024042 | A1 | 1/2010 | Motahari et al. | |
| 2010/0053169 | A1 | 3/2010 | Cook | |
| 2010/0071035 | A1 | 3/2010 | Budko et al. | |
| 2010/0183125 | A1 | 7/2010 | Hayes, Jr. et al. | |
| 2010/0257222 | A1 | 10/2010 | Hamilton, II et al. | |
| 2010/0281051 | A1 | 11/2010 | Sheffi et al. | |
| 2010/0283728 | A1 | 11/2010 | Hollemans et al. | |
| 2010/0313253 | A1 | 12/2010 | Reiss | |
| 2011/0143716 | A1 | 6/2011 | Shaw | |
| 2011/0238767 | A1 | 9/2011 | Murphy | |
| 2012/0174233 | A1 | 7/2012 | Waterson | |

OTHER PUBLICATIONS

"Spoof Caller ID with Telespoof.com"; Telespoof.com; Bearing a date of 2010; pp. 1-2; located at: http://www.telespoof.com/; printed on Jul. 8, 2010.

"Spoofkit is the ultimate windup kit available on the net today"; Spootkit.com; Bearing dates of 2010-2014; pp. 1-6; located at: http://www.spootkit.com/; printed on Jul. 8, 2010.

U.S. Appl. No. 12/927,966, Jung et al.
U.S. Appl. No. 12/927,791, Cohen et al.
U.S. Appl. No. 12/927,555, Cohen et al.
U.S. Appl. No. 12/927,500, Cohen et al.
U.S. Appl. No. 12/925,014, Cohen et al.
U.S. Appl. No. 12/924,992, Cohen et al.
U.S. Appl. No. 12/807,700, Cohen et al.
U.S. Appl. No. 12/806,738, Cohen et al.
U.S. Appl. No. 12/806,677, Cohen et al.
U.S. Appl. No. 12/804,832, Cohen et al.
U.S. Appl. No. 12/804,765, Cohen et al.
U.S. Appl. No. 12/802,922, Cohen et al.
U.S. Appl. No. 12/802,863, Cohen et al.
U.S. Appl. No. 12/802,139, Cohen et al.
U.S. Appl. No. 12/802,136, Cohen et al.
U.S. Appl. No. 12/799,794, Cohen et al.
U.S. Appl. No. 12/454,113, Cohen et al.
U.S. Appl. No. 12/287,268, Cohen et al.
U.S. Appl. No. 12/228,873, Cohen et al.
U.S. Appl. No. 12/228,664, Cohen et al.

* cited by examiner

CONDITIONALLY INTERCEPTING DATA INDICATING ONE OR MORE ASPECTS OF A COMMUNIQUÉ TO OBFUSCATE THE ONE OR MORE ASPECTS OF THE COMMUNIQUÉ

RELATED APPLICATIONS

For purposes of the USPTO extra-statutory requirements, the present application constitutes a continuation of U.S. patent application Ser. No. 12/807,700, entitled CONDITIONALLY INTERCEPTING DATA INDICATING ONE OR MORE ASPECTS OF A COMMUNIQUÉ TO OBFUSCATE THE ONE OR MORE ASPECTS OF THE COMMUNIQUÉ , naming Alexander J. Cohen; Edward K.Y. Jung; Royce A. Levien; Robert W. Lord; Mark A. Malamud; William H. Mangione-Smith; John D. Rinaldo, Jr. and Clarence T. Tegreene as inventors, filed Sep. 9, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/228,664, entitled SYSTEM AND METHOD FOR TRANSMITTING ILLUSORY IDENTIFICATION CHARACTERISTICS, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Aug. 14, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/228,873, entitled SYSTEM AND METHOD FOR TRANSMITTING ILLUSORY AND NON-ILLUSORY IDENTIFICATION CHARACTERISTICS, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Aug. 15, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/287,268, entitled SYSTEM AND METHOD FOR TRANSMITTING ILLUSORY IDENTIFICATION CHARACTERISTICS, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Oct. 7, 2008 now U.S. Pat. No. 8,224,907, which is currently, or is an application of which a currently co-pending application is entitled to the benefit of the filing date.

For purposes of the USPTO extra-statutory requirements, the present application constitutes a continuation-in-part of U.S. patent application Ser. No. 12/454,113, entitled SYSTEM AND METHOD FOR MODIFYING ILLUSORY USER IDENTIFICATION CHARACTERISTICS, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed May 12, 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/799,794, entitled SYSTEM AND METHOD FOR CONDITIONALLY TRANSMITTING ONE OR MORE LOCUM TENENTES, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Apr. 29, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/802,139, entitled OBFUSCATING IDENTITY OF A SOURCE ENTITY AFFILIATED WITH A COMMUNIQUÉ IN ACCORDANCE WITH CONDITIONAL DIRECTIVE PROVIDED BY A RECEIVING ENTITY, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed May 27, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/802,136, entitled OBFUSCATING IDENTITY OF A SOURCE ENTITY AFFILIATED WITH A COMMUNIQUÉ IN ACCORDANCE WITH CONDITIONAL DIRECTIVE PROVIDED BY A RECEIVING ENTITY, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed May 28, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/802,863, entitled OBFUSCATING IDENTITY OF A SOURCE ENTITY AFFILIATED WITH A COMMUNIQUÉ DIRECTED TO A RECEIVING USER AND IN ACCORDANCE WITH CONDITIONAL DIRECTIVE PROVIDED BY THE RECEIVING USER, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Jun. 14, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/802,922, entitled OBFUSCATING IDENTITY OF A SOURCE ENTITY AFFILIATED WITH A COMMUNIQUÉ DIRECTED TO A RECEIVING USER AND IN ACCORDANCE WITH CONDITIONAL DIRECTIVE PROVIDED BY THE RECEIVING USER, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Jun. 15, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/804,765, entitled OBFUSCATING RECEPTION OF COMMUNIQUÉ AFFILIATED WITH A SOURCE ENTITY, naming Alexander J. Cohen; Edward K. Y. Jung; Royce A. Levien; Robert W. Lord; Mark A. Malamud; William H. Mangione-Smith;

John D. Rinaldo, Jr. and Clarence T. Tegreene as inventors, filed Jul. 27, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/804,832, entitled OBFUSCATING RECEPTION OF COMMUNIQUÉ AFFILIATED WITH A SOURCE ENTITY, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Jul. 28, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/806,677, entitled OBFUSCATING RECEPTION OF COMMUNIQUÉ AFFILIATED WITH A SOURCE ENTITY IN RESPONSE TO RECEIVING INFORMATION INDICATING RECEPTION OF THE COMMUNIQUÉ, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Aug. 17, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/806,738, entitled OBFUSCATING RECEPTION OF COMMUNIQUÉ AFFILIATED WITH A SOURCE ENTITY IN RESPONSE TO RECEIVING INFORMATION INDICATING RECEPTION OF THE COMMUNIQUÉ, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Aug. 18, 2010, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week 11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

SUMMARY

A computationally implemented method includes, but is not limited to intercepting communiqué aspect data that is directed to an end user entity and that indicates one or more aspects of a communiqué directed to the end user entity and that is affiliated with a particular source entity, the intercepting of the communiqué aspect data being in accordance with one or more conditional directives of the end user entity to conditionally obfuscate the communiqué affiliated with the source entity; and transmitting to the end user entity, in response to intercepting the communiqué aspect data and in lieu of transmitting direct indication of the communiqué to the end user entity, covert indicator data that upon reception by the end user entity covertly indicates the one or more aspects of the communiqué. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

A computationally implemented system includes, but is not limited to: means for intercepting communiqué aspect data that is directed to an end user entity and that indicates one or more aspects of a communiqué directed to the end user entity and that is affiliated with a particular source entity, the intercepting of the communiqué aspect data being in accordance with one or more conditional directives of the end user entity to conditionally obfuscate the communiqué affiliated with the source entity; and means for transmitting to the end user entity, in response to intercepting the communiqué aspect data and in lieu of transmitting direct indication of the communiqué to the end user entity, covert indicator data that upon reception by the end user entity covertly indicates the one or more aspects of the communiqué. In addition to the foregoing, other system aspects are described in the claims, drawings, and text forming a part of the present disclosure.

A computationally implemented system includes, but is not limited to: circuitry for intercepting communiqué aspect data that is directed to an end user entity and that indicates one or more aspects of a communiqué directed to the end user entity and that is affiliated with a particular source entity, the intercepting of the communiqué aspect data being in accordance with one or more conditional directives of the end user entity to conditionally obfuscate the communiqué affiliated with the source entity; and circuitry for transmitting to the end user entity, in response to intercepting the communiqué aspect data and in lieu of transmitting direct indication of the communiqué to the end user entity, covert indicator data that upon reception by the end user entity covertly indicates the one or more aspects of the communiqué. In addition to the foregoing, other system aspects are described in the claims, drawings, and text forming a part of the present disclosure.

A computer program product including a signal-bearing medium bearing one or more instructions for intercepting communiqué aspect data that is directed to an end user entity and that indicates one or more aspects of a communiqué directed to the end user entity and that is affiliated with a particular source entity, the intercepting of the communiqué aspect data being in accordance with one or more conditional directives of the end user entity to conditionally obfuscate the communiqué affiliated with the source entity; and one or more instructions for transmitting to the end user entity, in response to intercepting the communiqué aspect data and in lieu of transmitting direct indication of the communiqué to the end user entity, covert indicator data that upon reception by the end user entity covertly indicates the one or more aspects of the communiqué. In addition to the foregoing, other computer program product aspects are described in the claims, drawings, and text forming a part of the present disclosure.

A method for obfuscating a communiqué that is directed to an end user entity and that is affiliated with a particular source entity by at least intercepting communiqué aspect data directed to the end user entity that indicates one or more aspects of the communiqué in accordance with one or more conditional directives of the end user entity, the method includes intercepting, using one or more processors, communiqué aspect data that is directed to an end user entity and that indicates one or more aspects of a communiqué directed to the end user entity and that is affiliated with a particular source entity, the intercepting of the communiqué aspect data being in accordance with one or more conditional directives of the end user entity to conditionally obfuscate the communiqué affiliated with the source entity; and transmitting to the end user entity, in response to intercepting the communiqué aspect data and in lieu of transmitting direct indication of the communiqué to the end user entity, covert indicator data that upon reception by the end user entity covertly indicates the one or more aspects of the communiqué.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
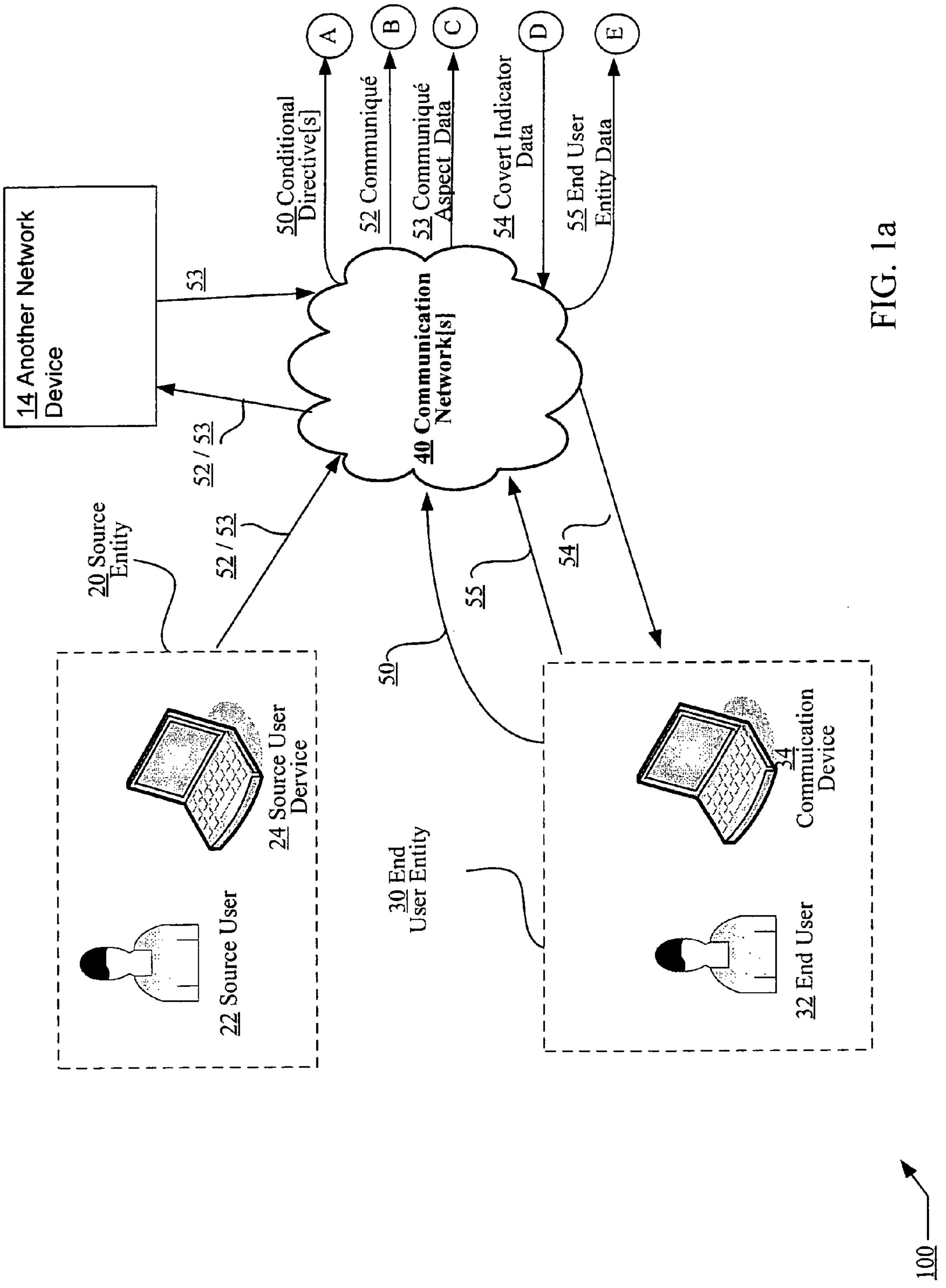
FIGS. 1*a* and 1*b* show a high-level block diagram of a network device 10 operating in a network environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

In recent years, the computing/communication industry has enjoyed dramatic technological advancement and spectacular commercial popularity, providing numerous benefits for those who choose to enjoy the fruits of technological developments in the computing/communication sectors. For example, with the rapid development of personal communication devices such as cellular telephones, personal digital assistants (PDAs), Smartphones, laptop computers, desktop computers, and so forth, users of such devices are now able to maintain 24/7 connectivity with other users at relatively low costs. Such connectivity may be via a variety of communication channels including, for example, telephone calls, emails, Voice over Internet Protocol (VoIP) calls, text messaging (e.g., short message service or SMS, or multimedia messaging service or MMS), instant messaging (IM), and so forth.

Unfortunately, in addition to providing significant benefits to users, users of such technologies must also deal with a whole new slate of issues and problems that have also arisen with these new technologies.

For example, users of such personal communication devices (e.g., cellular telephones, Smartphones, laptop and desktop computers, and so forth) face a number of privacy and security issues. One such issue that has surfaced with respect to users of personal communication devices is that communiqués (e.g., electronic communications including, for example, telephone calls, VoIP, emails, text messages, IMs, and so forth) received through these personal communication devices are often easily accessible by those other than the primary users (e.g., owners) of such devices. As a result, highly sensitive communiqués (e.g., confidential personal or business communiqués) that are directed to the primary users of such devices, as well as information that indicates various aspects of such communiqués, may often be accessed by others potentially causing embarrassing if not devastating consequences.

For example, it was extensively reported recently that a well-known and well-admired professional athlete was discovered having an extramarital affair by his spouse. It was widely reported that the spouse discovered this affair when she found a voice message from her husband's mistress on her husband's cellular telephone. Because the husband (i.e., famous professional athlete) in that incident had not erased or was not able to hide or disguise the voice message from his mistress, the husband had to endure considerable public humiliation and substantial financial loss due to loss of commercial endorsement income.

Of course the need for maintaining communication or communiquésecrecy is not just limited to personal situations, but may also be necessary in professional/business context. For example, it may be inappropriate for a person to receive certain sensitive communiqués from particular parties (e.g., communiqués from certain clients or competitors, or communiqués from a particular website or business) while at work or while at other locations (e.g., when meeting with clients).

According to various embodiments, methods, systems, and computer program products are provided for obfuscating one or more aspects of a communiqué affiliated with a particular source entity and that is directed to an end user entity by at least intercepting (e.g., diverting or withholding) communiqué aspect data that indicates one or more aspects (e.g., identifying a source) of the communiqué and that is directed to the end user entity (e.g., an end user and/or a communication device), the interception of the communiqué aspect data being based on one or more conditional directives provided by the end user entity. More particularly, the methods, systems, and computer program products may be designed to intercept (e.g., to hold without releasing) communiqué aspect data that indicates one or more aspects of a communiqué (e.g., an email, an instant message (IM), a text message, a telephone call, a Voice over Internet Protocol (VoIP) call, a video message, and so forth) that is affiliated with a particular source entity and that is directed to an end user entity, the interception of the communiqué aspect data being in accordance with one or more conditional directives of the end user entity; and to transmit to the end user entity, in response to intercepting the communiqué aspect data and in lieu of transmitting (any) direct indication of the communiqué to the end user entity, covert indicator data that upon reception by the end user entity covertly indicates one or more aspects of the communiqué. As will be further described herein, the methods, systems, and computer program products may be implemented at a network device, which may comprise of one or more network servers. Note that for purposes of this description, and unless indicated otherwise, the term "network server" may be broadly interpreted and may be in reference to wide variety of network devices designed to facilitate in the transmission/directing/routing/storing of communiqués including, for example, routers, switches, telephone exchanges, and so forth.

In some embodiments, the methods, systems, and computer program products may be particularly useful when there exists information or data (herein "communiqué aspect data") that indicates one or more relevant aspects of the communiqué (e.g., an email, a text message, a telephone call, a video message, and so forth) that is directed to the particular end user entity and that is affiliated with the particular source entity that the end user of the end user entity may wish to obfuscate. Such communiqué aspect data may indicate, for example, the telephone number or email address associated with the source for the communiqué, the destination telephone number or email address, the reception time stamp, and so forth.

There are at least two scenarios in which such information (e.g., communiqué aspect data) may be generated and/or disseminated. The first scenario relates to situations where there is an "unsuccessful" or "missed" communiqué (e.g., a missed telephone call) because the recipient's (e.g., end user's) communication device is off-line or is "out-of-signal-range," certain information (e.g., communiqué aspect data) related to the missed communiqué may be generated (e.g., by extracting it from the missed communiqué) and kept at a server to be subsequently transmitted to the communication device once the communication device is back "on-line." This commonly occurs with missed telephone calls. Upon the communication device (e.g., cellular telephone or Smartphone) coming back on-line or within signal range, a server will transmit to the communication device information (e.g., in the form of communiqué aspect data) to indicate the missed communiqué.

In contrast, the second scenario relates to situations that occur with pull-type communication systems (e.g., systems where communiqués are pulled rather than pushed to the end user's devices). For example, emails in pull technology email systems are typically stored at one or more network servers. By storing the emails at one or more network servers, recipients of the emails may access the emails from any computing device. In such pull-type systems, there may be situations where only certain selective information (e.g., communiqué aspect data) are disseminated to the communication device of the end user (e.g., recipient). For example, in some cases, a listing of received emails that may include communiqué aspect data indicating one or more aspects of a communiqué affiliated with a particular source entity may be presented to the communication device of the end user.

In order to obfuscate a communiqué that is affiliated with the particular source entity in either of the above two scenarios, the methods, systems, and computer program products in accordance with various embodiments may be designed to intercept communiqué aspect data that indicates one or more aspects of the communiqué and that is directed to a particular end user entity in order to prevent the communiqué aspect data from reaching the end user entity, the intercepting of the communiqué aspect data being in accordance with one or more conditional directives of the end user entity (e.g., one or more conditional directives of an end user of the end user entity). As described earlier, the methods, systems, and computer program products in accordance with various embodiments, may also be designed to transmit to the end user entity, in response to intercepting the communiqué aspect data and in lieu of transmitting any direct indication of the communiqué to the end user entity, transmit covert indicator data that upon reception by the end user entity covertly indicates one or more aspects of the communiqué.

For purposes of the following description, a "communiqué" may be in reference to any one of a variety of electronic communication means including, for example, a visual textual communiqué such as an email message, a text message (e.g., short message service "SMS" or multimedia messaging service "MMS"), an instant message (IM), and so forth, or an audio communiquésuch as telephone call, a Voice over Internet Protocol (VoIP) call, a voice message, a video message, and so forth. In contrast, references to "communiqué aspect data" may be in reference to any data or information that indicates one or more aspects related to a communiqué. In some cases, communiqué aspect data may be header information (i.e., header data) of a communiqué, or may include or indicate at least header-type data of a communiqué. For example, in some embodiments, such communiqué aspect data may indicate the name, telephone number, or address (e.g., email address, internet protocol or IP address, uniform resource locator or URL) of a sender or source for a communiqué, the subject heading of the communiqué if there is one, reception time stamp, and so forth. In some cases, a communiqué aspect data may be in the form of a header data or information that may be provided separately in connection with a corresponding communiqué, or may be provided embedded in or integrated in the communiqué itself.

As will be further described herein, a "source entity" may be in reference to any entity affiliated with a communiqué that an end user, for example, wishes to obfuscate the identity of. In some instances, a source entity may be the original or an intermediate source for the communiqué. In some cases, a source entity may include, for example, a source user who may be a human or robotic user and/or a source user device such as a cellular telephone, Smartphone, laptop or desktop computer, and so forth. In some cases, a source entity may be an organization such as a business or a trade or interest group. In some instances, a source entity may be a website.

An "end user" may be a human or robotic user that is designated to receive one or more communiqués. In some cases where the end user is a robotic user, the robotic user may be a network device such as a network server for, for example, a voicemail service, a text messaging service, or a web-based application service. In some cases, an end user may receive one or more communiqués through a "communication device" (which may also be referred to as a "receiving device"). A communication device may be any type of computing device that is designed to transmit/receive communiqués including, for example, a cellular telephone, a Smartphone, a personal digital assistant (PDA), a landline telephone, a laptop or desktop computer, a tablet computer, a workstation, and so forth.

A "conditional directive," as will be discussed herein, relates to a command or instruction to execute one or more actions when one or more conditions have occurred and/or detected. Thus, for purposes of this description, a conditional directive may identify the one or more actions that are to be executed in order to achieve a particular result (e.g., obfuscate reception of a communiqué affiliated with a particular source entity) and/or identify the necessary (e.g., requisite) conditions that may trigger the one or more actions to be executed. For example, in some cases, a conditional directive may be a command to intercept (e.g., hold without releasing or "withholding") a communiqué aspect data that is being transmitted to an end user entity (e.g., an end user and/or a communication device belonging to the end user) when the communiqué aspect data indicates one or more aspects of a communiqué that is determined to be affiliated with a particular source entity, and to transmit, in lieu of transmitting any direct indication of the communiqué, a covert indicator data that covertly (e.g., indirectly) indicates one or more aspects of the communiqué.

The phrase "covert indicator data," as will be described herein, may be in reference to any form of data that may be transmitted to, for example, a communication device of an end user, and upon reception by the communication device (e.g., cellular phone, Smartphone, PDA, laptop computer, etc.) causes the communication device to covertly indicate one or more aspects of a communiqué that is affiliated with a particular source user. As will be further described herein, in some cases, the covert indicator data that may be transmitted to and received by the communication device of the end user may merely be a simple "ping" with very little content, or may contain more extensive content including data indicating one or more locum tenentes (e.g., Latin term for placeholders or substitutes) for one or more aspects of the communiqué. A more detailed discussion related to the covert indicator data will be described herein.

Figure 1B:
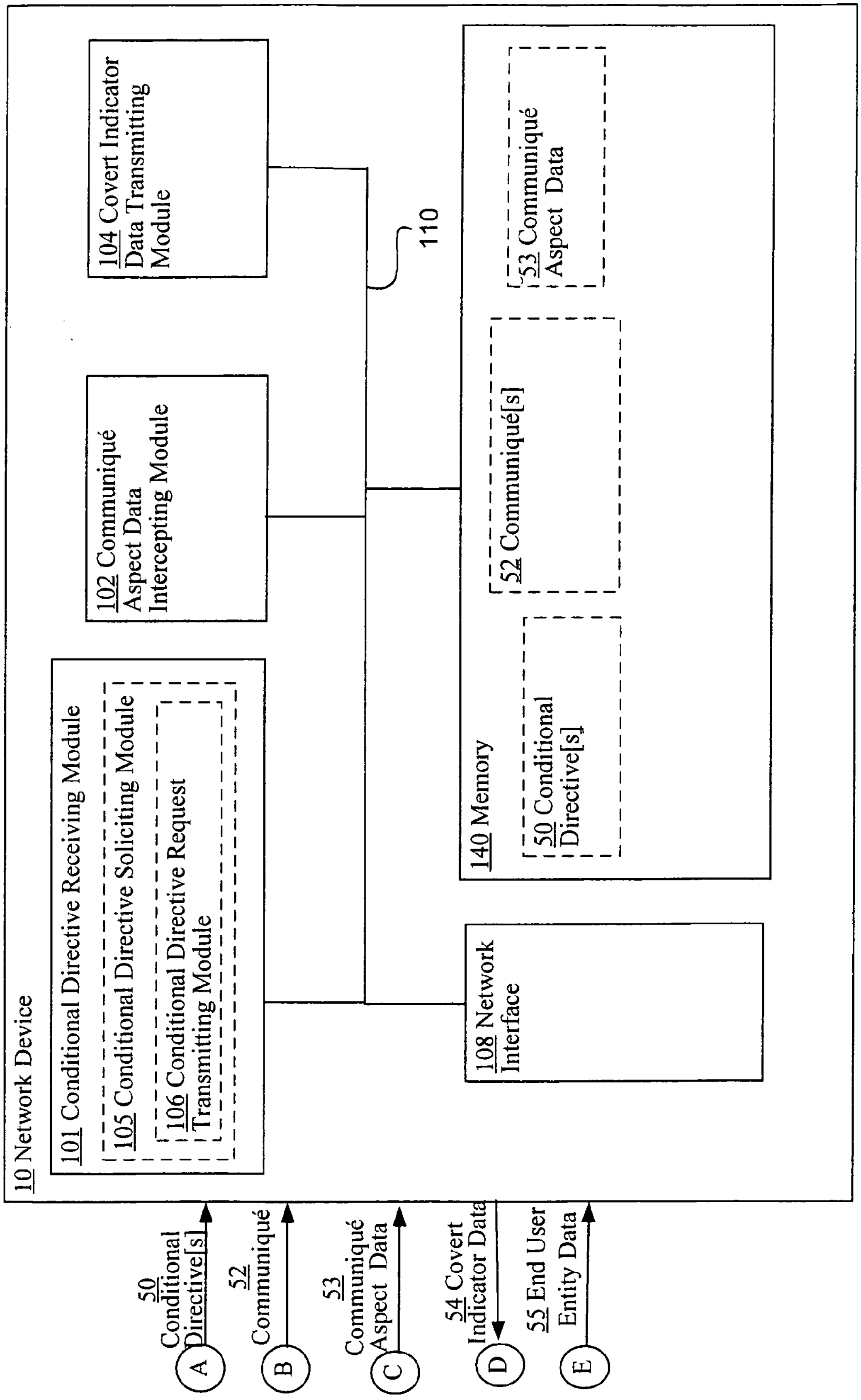

Turning now to FIGS. 1*a*, and 1*b* illustrating an example environment 100 in which the methods, systems, circuitry, and computer program products in accordance with various embodiments may be implemented by or at a network device 10. Among other things, the methods, systems, circuitry, and computer program products implemented by the network device 10 may be designed to intercept (e.g., hold without releasing or "withholding") communiqué aspect data 53 that is directed to an end user entity 30 (e.g., directed to an end user 32 of the end user entity 30) and that indicates one or more aspects of a communiqué 52 directed to the end user entity 30 (e.g., directed to the end user 32) and that is affiliated with a particular source entity 20, the intercepting of the communiqué aspect data 53 being in accordance with one or more conditional directives 50 of the end user entity 30 (e.g., the end user 32) to conditionally obfuscate the communiqué 52 affiliated with the source entity 20; and to transmit to the end user entity 30, in response to intercepting the communiqué aspect data 53 and in lieu of transmitting direct indication of the communiqué 52 to the end user entity 30, covert indicator data 54 that upon reception by the end user entity 30 (e.g., reception by a communication device 34 of the end user entity 30) covertly indicates one or more aspects of the communiqué 52. In some embodiments, the network device 10 may be a network system located at a single network site or located at multiple network sites such as in the case of cloud computing. In various embodiments, the network device 10 may include one or more network servers including one or more telephone switches, one or more telephone exchanges, and/or one or more routers. In some embodiments, the network device 10 may comprise of multiple network components such as in the case of cloud computing.

In some embodiments, the network device 10 may be designed to facilitate communication between different entities. For example, in some cases, the network device 10 may be designed to relay communiqués 52 (e.g., visual textual communiqués such as emails, text messages, or IMs, or audio communiqués such as telephone calls, VoIP calls, voice message, and video messages) between, for example, a source entity 20 and an end user entity 30 via one or more communication networks 40. A source entity 20 may comprise of a human or robotic source user 22 and/or a source user device 24 (e.g., a laptop computer, a desktop computer, a workstation, a Smartphone, a cellular telephone, a personal digital assistant (PDA), or other computing/communication devices). From another perspective, the source entity 20 may be a website or an organization such as a business, a social group, a trade/technical group, or an interest group. In some cases, the source entity 20 may include a global positioning system (GPS), which may be part of the source user device 24.

Similarly, an end user entity 30 may comprise an end user 32 who may be a human or robotic user and/or a communication device 34 (e.g., a laptop computer, a workstation, a Smartphone, a PDA, a desktop computer, a cellular telephone, and so forth). In some cases, the end user entity 30 may be a voicemail service, a text messaging service, a web-based application service, and so forth that may be associated with, for example, an end user 32.

As briefly described above, the network device 10 may be designed to facilitate the relay of one or more communiqués 52 between the source entity 20 and the end user entity 30 via one or more communication networks 40. The one or more communication networks 40 may include one or more of a local area network (LAN), metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, a Client/Server network, a virtual private network (VPN), and so forth.

Referring back to the example environment 100 of FIGS. 1*a* and 1*b*, in various embodiments, the network device 10 may be designed to receive one or more conditional directives 50 from an end user entity 30 (e.g., from an end user 32 of the end user entity 30) via one or more communication networks 40. The one or more conditional directives 50 to be received may indicate the specific conditions that are required and/or the specific acts that may be executed in order to obfuscate a communiqué 52 that is affiliated with a particular source entity 20 and that is directed to the end user entity 30. In some cases, the one or more conditional directives 50 may be solicited from the end user 32.

As further illustrated in FIGS. 1*a* and 1*b*, the network device 10 may also be designed to receive and to intercept, in accordance with the one or more conditional directives 50, communiqué aspect data 53 that indicate one or more aspects of a communiqué 52 that is directed to an end user entity 30 (e.g., an end user 32 of the end user entity 30) and affiliated with a particular source entity 20. In various implementations, the communiqué aspect data 53 may be intercepted in order to prevent the communiqué aspect data 53 from reaching the end user entity 30. In some cases, the intercepting of the communiqué aspect data 53 may involve holding, at least temporally, and without releasing the communiqué aspect data 53 to the end user entity 30, the communiqué aspect data 53. The interception of the communiqué aspect data 53 may further include diverting the communiqué aspect data 53 into a memory 140 (e.g., volatile memory, non-volatile memory, cache memory, and so forth). In some implementations, and as will be further described herein, the interception of the communiqué aspect data 53 may require the holding without releasing (e.g., withholding) of the communiqué aspect data 53 at least until occurrence of one or more triggering events (e.g., the end user 32 has possession of the communication device 34 of the end user entity 30, a particular, third party is not in the proximate vicinity of the communication device 34, the communication device 34 is within or outside one or more locations, and so forth) associated with the end user entity 30 as specified by, for example, the one or more conditional directives 50 of the end user entity 30 (e.g., end user 32).

In some cases, the communiqué aspect data 53 that is intercepted by the network device 10 may be provided by the source entity 20 that is affiliated with the communiqué 52 or may be provided by another network device 14. In some implementations, the communiqué aspect data 53 may be embedded or included in the communiqué 52 itself, which may also be received by the network device 10. Thus, in some cases, the network device 10 may be designed to intercept the communiqué aspect data 53 by at least receiving the communiqué 52 and extracting the communiqué aspect data 53 from the communiqué 52. For these implementations, the communiqué aspect data 53 may be in the form of header data (e.g., header information). Alternatively the network device 10 may be designed to intercept the communiqué aspect data 53 by receiving the communiqué aspect data 53 independent of or without receiving the communiqué 52. That is, for these implementations, the communiqué aspect data 53 may exist independent of the communiqué 52 and may be acquired independently from, for example, another network device 14.

In various embodiments, the communiqué aspect data 53 that is received by the network device 10 and that is directed to the end user entity 30 may be intercepted (e.g., withheld or held without releasing) to prevent the communiqué aspect data 53 from reaching the end user entity 30 (e.g., communication device 34) in order to obfuscate the communiqué 52. In various embodiments, the interception of the communiqué aspect data 53 may be in accordance with the one or more conditional directives 50 of the end user entity 30. In some cases, this may mean that the interception of the communiqué aspect data 52 may only occur if certain specified conditions, as specified by the one or more conditional directives 50, have occurred or have been detected. For example, in some cases the network device 10 may only intercept the communiqué aspect data 53 only if it is determined that the communication device 34 is not in the possession of the end user 32 or if a particular third party is determined to be in the proximate vicinity of communication device 34 or if other conditions exists (e.g., the communication device 34 is within or outside one or more locations) as will be further described herein.

One way that the network device 10 may be able to determine whether these conditions (e.g., "triggering events") exists is by receiving, for example, end user entity data 55 from the end user entity 30 (e.g., from the communication device 34 of the end user entity 30) that may indicate various environmental conditions of the communication device 34. Examples of the types of data that may be included in the end user entity data 55 include, for example, data that verifies that the communication device 34 is in the possession of the end user 32. In some cases, such data may include, for example, password verification data or biometric verification (e.g., sensor data such as digital image of a face, digital image of a fingerprint, digital voice recording and so forth) that verifies that the end user 32 has possession of the communication device 34. Another type of data that may be included in the end user entity data 55 that may be provided to the network device 10 is data that indicate whether a particular third party is in the proximate vicinity of the communication device 34. "Proximate vicinity" in this context may be in reference to within three feet, within five feet, within eight feet, within ten feet, or within some other distance from the communication device 34 from which a third party may be able to see/hear/sense a communiqué 52 being presented through the communication device 34. Other types of data indicating other types of environmental conditions related to the end user entity 30 (e.g., communication device 34) may also be included with the end user entity data 55 in various alternative embodiments.

Note that the end user entity data 55 that may be received by the network device 10 may be used by the network device 10 in at least two ways. The first use for the end user entity data 55 may be for detecting occurrence of one or more triggering events (e.g., the communication device 34 is not in the possession of the end user 32) that would cause the network device 10 to intercept the communiqué aspect data 53. The second use for the end user entity data 55 may be for detecting occurrence of another set of triggering events (e.g., verification that the communication device 34 is in the possession of the end user 32) that would cause the network device 10 to release the communiqué aspect data 53 to the end user entity 30.

The network device 10, in addition to being designed to intercept the communiqué aspect data 53, may be designed to transmit covert indicator data 54 that is designed to, upon reception by the end user entity 30, covertly indicate one or more aspects of the communiqué 52 (e.g., indirectly indicate existence or reception of the communiqué 52), the transmitting of the covert indicator data 54 being in response to the intercepting the communiqué aspect data 53 and in lieu of transmitting any direct indication of the communiqué 52 to the end user entity 30. The covert indicator data 54 that may be transmitted may be in accordance with the one or more conditional directives 50 of the end user entity 30 (e.g., end user 32). As a result, and as will be further described herein, the covert indicator data 54 may come in a variety of different forms containing small or large amounts of data. As will also be further described herein, the covert indicator data 54 that may be transmitted to the end user entity 30 when received by the communication device 34 of the end user entity 30 may cause the communication device 34 to present one or more audio/visual/vibrating covert indicators to covertly indicate (e.g., indirectly indicate) one or more aspects (e.g., existence or reception) of the communiqué 52. In some cases, the covert indicator data 54 that may be transmitted may include one or more locum tenentes (e.g., Latin term for placeholders or substitutes) for one or more aspects of the communiqué 52. For example, the covert indicator data 54 may include one or more "secret" code names for the particular source entity 20 affiliated with the communiqué 52. Alternatively or additionally, the covert indicator data 54 may include one or more code words and/or symbols that covertly indicate the existence or reception of the communiqué 52 affiliated with the source entity 20.

Turning specifically now to the network device 10 of FIG. 1*b*. The network device 10, as depicted, may include a variety of modules, sub-modules, and various other components. The network device 10, in some embodiments, may be a single network device such as a single server, which may be a single router, a single telephone switch, or some other device located at a single network site. Alternatively, the network device 10 may be a collection of network component devices including a collection of multiple servers located at one network site or located at multiple network sites such as the case in cloud computing. Thus, the network device 10 may be implemented at a single network site or at multiple network sites using a single server or multiple servers. Note that for ease of illustration and explanation, the network device 10 that is illustrated in FIG. 1*b* depicted as a single server. However, and as indicated earlier, the network device 10 may be a network system that may be implemented using, for example, multiple network servers such as in the case of cloud computing.

Figure 2A:
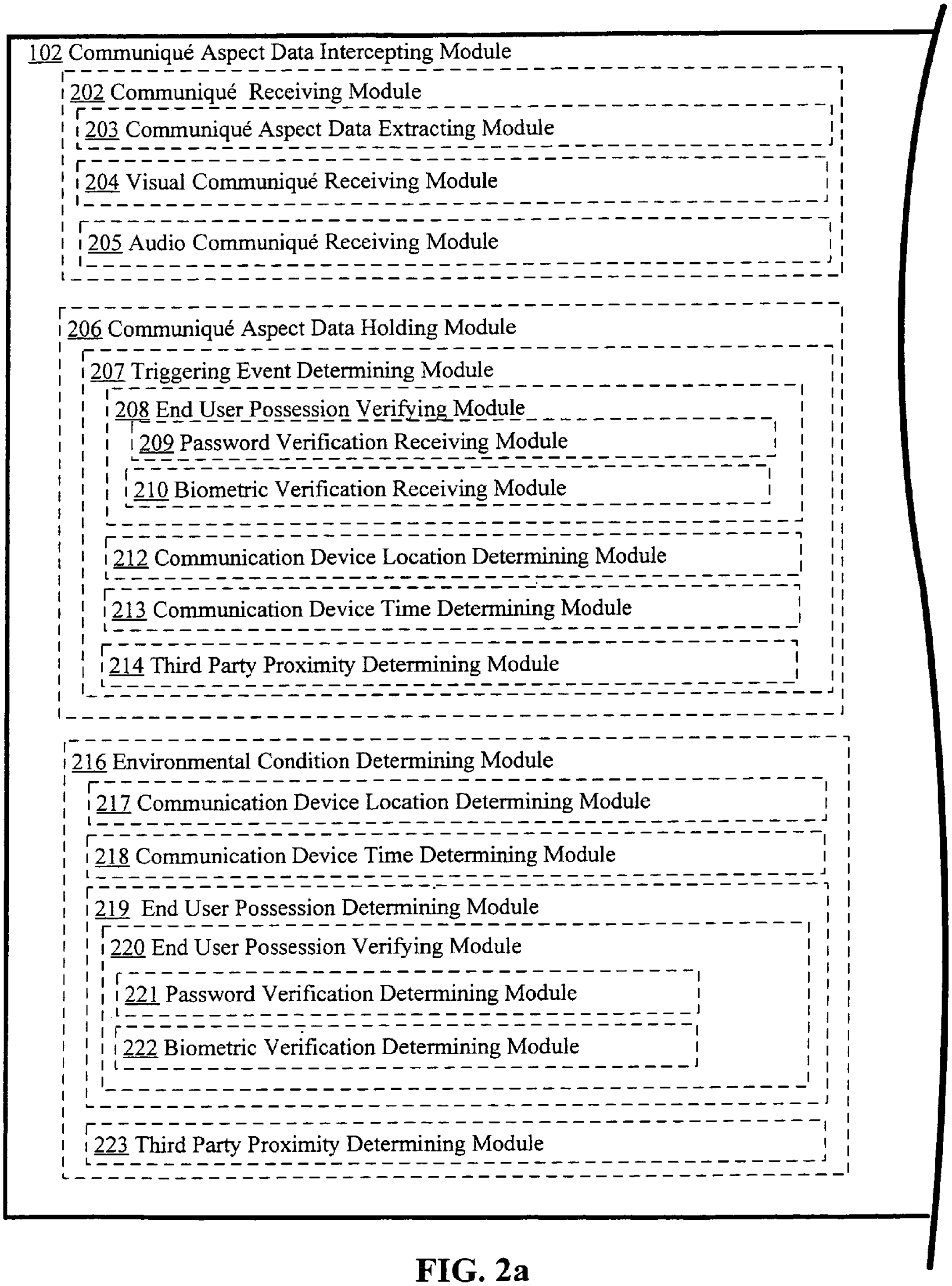
FIGS. 2*a* and 2*b* show another perspective of the communiqué aspect data intercepting module 102 of the network device 10 of FIG. 1*b*.
Figure 2B:
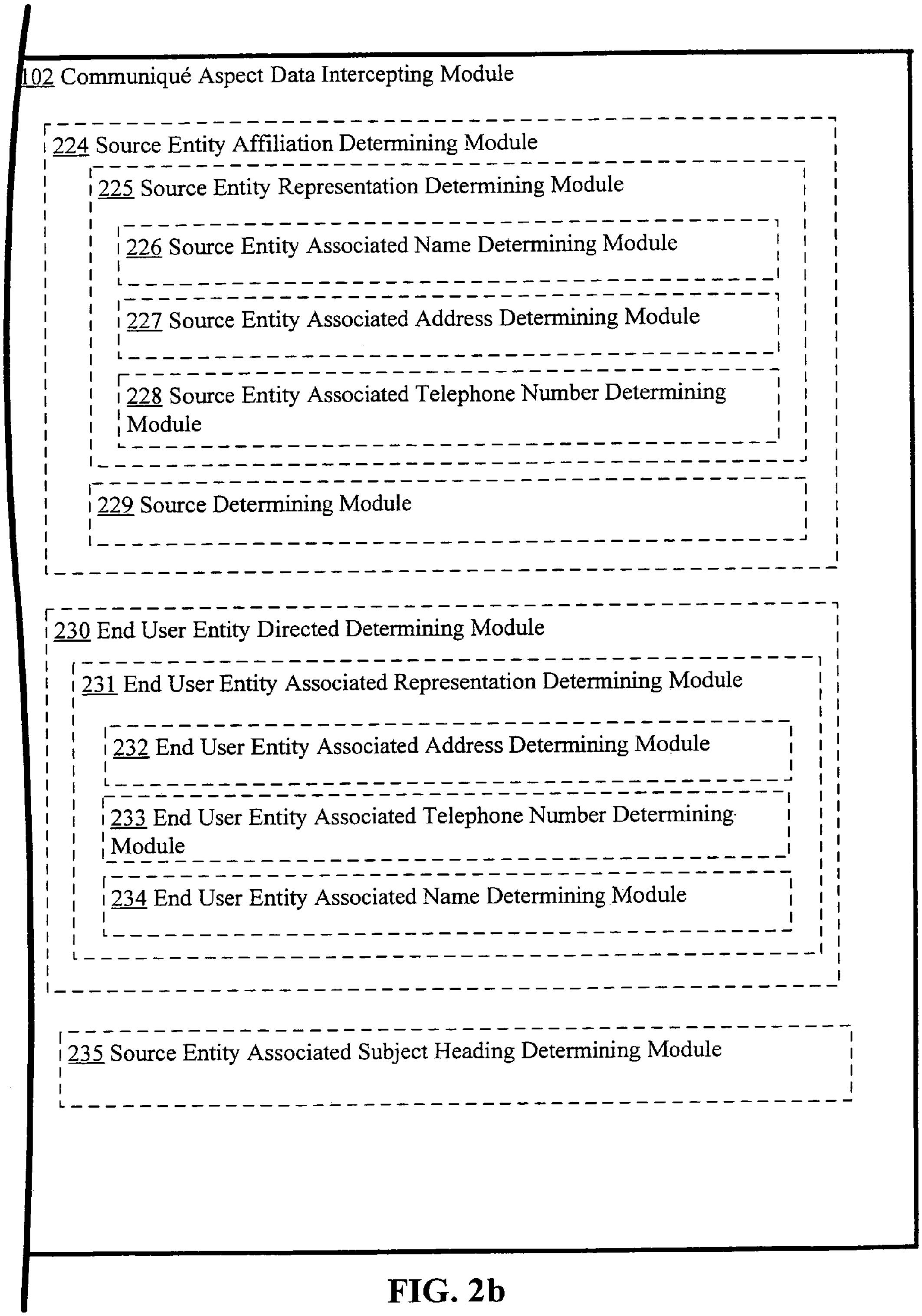
Figure 2C:
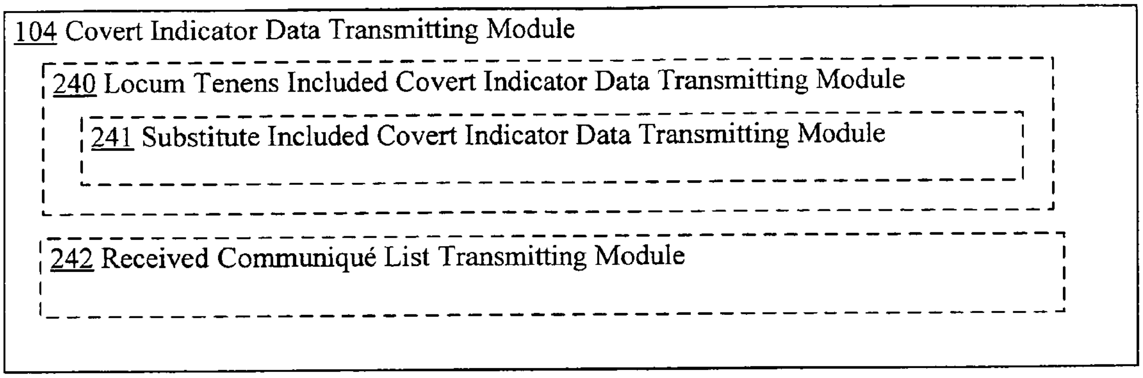
FIG. 2*c* shows another perspective of the covert indicator data transmitting module 104 of the network device 10 of FIG. 1*b*.

As shown, the network device 10 may include at least a communiqué aspect data intercepting module 102 (which may further include one or more sub-modules as illustrated in FIGS. 2*a* and 2*b*) and a covert indicator data transmitting module 104 (which may further include one or more sub-modules as illustrated in FIG. 2*c*). As further illustrated, in some embodiments, the network device 10 may include a conditional directive receiving module 101 (which may further include a conditional directive soliciting module 105 that may further comprise of a conditional directive request transmitting module 106).

In brief, the conditional directive receiving module 101 may be configured to receive one or more conditional directives 50 from an end user entity 30 (e.g. end user 32 of the end user entity 30). In contrast, the communiqué aspect data intercepting module 102 may be configured to intercept communiqué aspect data 53 that is directed to an end user entity 30 and that indicates one or more aspects of a communiqué 52 that is also directed to the end user entity 30 and that is affiliated with a particular source entity 20, the intercepting of the communiqué aspect data 53 being in accordance with the one or more conditional directives 50 to conditionally obfuscate the communiqué 52 affiliated with the source entity 20. The covert indicator data transmitting module 104 may be configured to transmit to the end user entity 30 covert indicator data 54 that upon reception by the end user entity 30 covertly indicates one or more aspects of the communiqué 52, the transmitting of the covert indicator data 54 being in response to intercepting the communiqué aspect data 53 and in lieu of transmitting (any and all) direct indication of the communiqué 52 to the end user entity 30. Note that a more detailed discussion related to the communiqué aspect data intercepting module 102, the covert indicator data transmitting module 104, the conditional directive receiving module 101, and all their sub-modules will be provided below with respect to the operations and processes to be described herein.

In various embodiments, the network device 10 may include a network interface 108 (e.g., network interface card or NIC) and/or a memory 140. Although not depicted, the network device 10 may also include other components such as one or more processors (e.g., microprocessors) and one or more user interfaces. In various embodiments, the various modules included in the network device 10 including the communiqué aspect data intercepting module 102, the covert indicator data transmitting module 104, and their sub-modules (as depicted in FIGS. 2*a*, 2*b*, and 2*c*), may be implemented using hardware (e.g., circuitry), software, firmware, or any combination thereof.

For example, in some embodiments, the communiqué aspect data intercepting module 102, the covert indicator data transmitting module 104, and the conditional directive receiving module 101 (and their sub-modules) may be implemented using hardware such as specially designed circuitry including, for example, application specific integrated circuit or ASIC. Alternatively, the communiqué aspect data intercepting module 102, the covert indicator data transmitting module 104, and the conditional directive receiving module 101 (and their sub-modules) may be implemented using software in the form of computer readable instructions that is executed by one or more processors as will be further described below with respect to FIG. 6. In still other embodiments, the communiqué aspect data intercepting module 102, the covert indicator data transmitting module 104, and/or the conditional directive receiving module 101 (and their sub-modules) may be implemented using a combination of hardware and software such as when the communiqué aspect data intercepting module 102, the covert indicator data transmitting module 104, and the conditional directive receiving module 101 (and their sub-modules) are implemented using Field Programmable Gate Arrays or FPGAs. Note that FIG. 1*b* depicts the hardware implementation of the network device 10. That is, the communiqué aspect data intercepting module 102, the covert indicator data transmitting module 104, and the conditional directive receiving module 101 that are illustrated in FIG. 1*b* are each depicted as being implemented by circuits that along with the network interface 108 and the memory 140 that may be coupled together by, for example, a bus 110.

Again, note that for ease of illustration and understanding, FIG. 1*b* illustrates a single device embodiment of the network device 10 (e.g., meaning that the network device 10 that is depicted in FIG. 1*b* is depicted as being embodied in a single network component device such as a single server rather than being embodied by multiple servers as in the case of cloud computing). However, those having ordinary skill in the art will recognize that the network device 10 may be implemented using multiple network component devices (e.g., multiple servers) located at multiple network sites such as in the case in cloud computing.

Further note that again that although FIG. 1*b* illustrates only the hardware embodiment of the network device 10, those having ordinary skill in the art will recognize that the communiqué aspect data intercepting module 102, the covert indicator data transmitting module 104, and the conditional directive receiving module 101 (and their sub-modules as illustrated in FIGS. 1*b*, 2*a*, 2*b*, and 2*c*) may also be implemented using software, firmware, or any combination of hardware, software, and firmware. Further, one or more of the modules of the network device 10 including the communiqué aspect data intercepting module 102, the covert indicator data transmitting module 104, and the conditional directive receiving module 101 (and their sub-modules) may be located at different network sites as is the case in cloud computing.

In various embodiments, the network device 10 may include a memory 140 for storing various types of data. For these embodiments, memory 140 may comprise of one or more of one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, memory 140 may be located at a single network site. Alternatively, memory 140 may be located at multiple network sites.

The memory 140 may store a variety of data in various alternative embodiments. For example, in some embodiments, memory 140 may store one or more conditional directives 50, one or more communiqués 52, and/or communiqué aspect data 53 that indicate one or more aspects of at least one communiqué 52 that is affiliated with at least a particular source entity 20.

Referring now to FIGS. 2*a* and 2*b* illustrating a particular implementation of communiqué aspect data intercepting module 102 of FIG. 1*b*. As illustrated, communiqué aspect data intercepting module 102 may include one or more sub-modules in various alternative implementations. For example, in various implementations, the communiqué aspect data intercepting module 102 may include a communiqué receiving module 202 (which may further include a communiqué aspect data extracting module 203, a visual communiqué receiving module 204, and/or an audio communiqué receiving module 205), a communiqué aspect data holding module 206 that may further include a triggering event determining module 207 (which may further include an end user possession verifying module 208 that may also include a password verification receiving module 209 and/or a biometric verification receiving module 210, a communication device location determining module 212, a communication device time determining module 213, and/or a third party proximity determining module 214), and/or an environmental condition determining module 216 that may further include a communication device location determining module 217, a communication device time determining module 218, an end user possession determining module 219 (which may further include an end user possession verifying module 220 that may include a password verification determining module 221 and/or a biometric verification determining module 222), and/or a third party proximity determining module 223 as depicted in FIG. 2*a*.

As further illustrated in FIG. 2*b*, the communiqué aspect data intercepting module 102 may alternatively or additionally include, in various implementations, a source entity affiliation determining module 224 that may further include a source entity representation determining module 225 (which may further include a source entity associated name determining module 226, a source entity associated address determining module 227, and/or a source entity associated telephone number determining module 228) and/or a source determining module 229, an end user entity directed determining module 230 that may further include an end user entity associated representation determining module 231 (which may also include an end user entity associated address determining module 232, an end user entity associated telephone number determining module 233, and/or an end user entity associated name determining module 234), and/or a source entity associated subject heading determining module 235. As indicated earlier, each of the sub-modules of the communiqué aspect data intercepting module 102 may be implemented using hardware (e.g., circuitry), software (e.g., computer readable instructions executed by one or more processors), firmware, or any combination thereof. Specific details related to the communiqué aspect data intercepting module 102 as well as the above-described sub-modules of the communiqué aspect data intercepting module 102 will be provided below in reference to the operations and processes to be described herein.

Referring now to FIG. 2*c* illustrating a particular implementation of the covert indicator data transmitting module 104 of FIG. 1*b*. As illustrated, the covert indicator data transmitting module 104 may also include one or more sub-modules in various alternative implementations. For example, in some implementations, the covert indicator data transmitting module 104 may include a locum tenens included covert indicator data transmitting module 240 (which may further include a substitute included covert indicator data transmitting module 241) and/or a received communiqué list transmitting module 242. Note that locum tenens is merely the singular version of locum tenentes. As previously indicated, each of the sub-modules of the covert indicator data transmitting module 104 may be implemented using hardware (e.g., circuitry), software (e.g., computer readable instructions executed by one or more processors), firmware, or any combination thereof. Specific details related to the above-described sub-modules of the covert indicator data transmitting module 104 will be provided below in reference to the operations and processes to be described herein.

Figure 3:
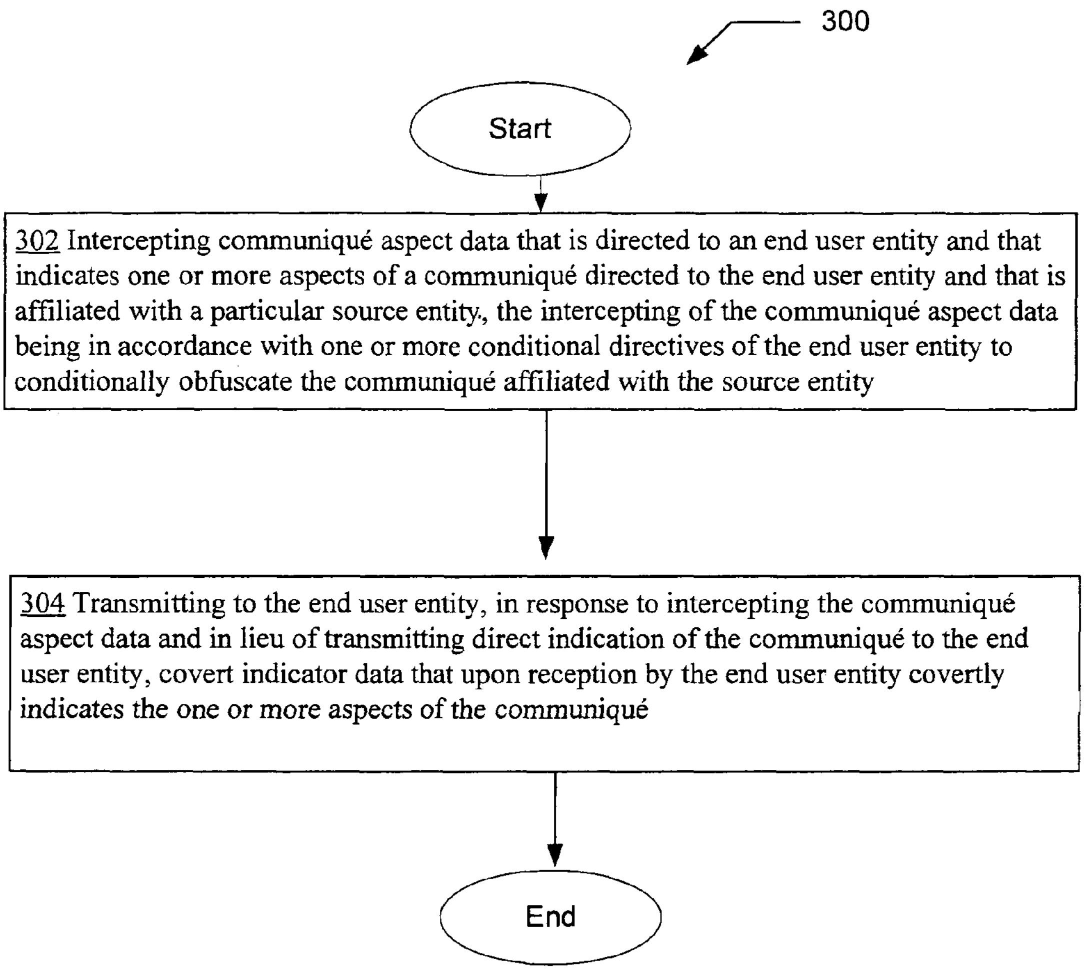
FIG. 3 is a high-level logic flowchart of a process.

A more detailed discussion related to the network device 10 of FIG. 1*b* will now be provided with respect to the processes and operations to be described herein. FIG. 3 illustrates an operational flow 300 representing example operations for, among other things, obfuscating a communiqué that is affiliated with a particular source entity and that is directed to a particular end user entity by intercepting (diverting and holding in a memory) communiqué aspect data that indicates one or more aspects of the communiqué and that is being directed to (e.g., destined for or being sent to) the end user entity, the obfuscation being in accordance with one or more conditional directives provided by the end user entity. In FIG. 3 and in the following figures that include various examples of operational flows, discussions and explanations will be provided with respect to the exemplary environment 100 described above and as illustrated in FIGS. 1*a* and 1*b*, and/or with respect to other examples (e.g., as provided in FIGS. 2*a*, 2*b*, 2*c* and 7) and contexts. However, it should be understood that the operational flows may be executed in a number of other environments and contexts, and/or in modified versions of FIGS. 1*a*, 1*b*, 2*a*, 2*b*, 2*c*, and 7. Also, although the various operational flows are presented in the sequence(s) illustrated, it should be understood that the various operations may be performed in other orders other than those which are illustrated, or may be performed concurrently.

Further, in FIG. 3 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 3 as well as the other operations to be described herein may be performed by at least one of a machine, an article of manufacture, or a composition of matter.

In any event, after a start operation, the operational flow 300 of FIG. 3 may move to a communiqué aspect data intercepting operation 302 for intercepting communiqué aspect data that is directed to an end user entity and that indicates one or more aspects of a communiqué directed to the end user entity and that is affiliated with a particular source entity, the intercepting of the communiqué aspect data being in accordance with one or more conditional directives of the end user entity to conditionally obfuscate the communiqué affiliated with the source entity. For instance, and as an illustration, the communiqué aspect data intercepting module 102 of the network device 10 of the example environment 100 of FIGS. 1*a* and 1*b* intercepting (e.g., diverting, capturing, and/or holding) communiqué aspect data 53 that is directed to (e.g., sent to or transmitted to) an end user entity 30 and that indicates one or more aspects (e.g., telephone number or address of the source for the communiqué 52, subject heading for the communiqué 52 if there is one, reception time, and so forth) of a communiqué 52 directed to the end user entity 30 and that is affiliated with a particular source entity 20, the intercepting of the communiqué aspect data 53 being in accordance with one or more conditional directives 50 of the end user entity 30 (e.g., one or more conditional directives of an end user 32 of the end user entity 30) to conditionally obfuscate the communiqué 52 affiliated with the source entity 20. In some embodiments, by intercepting the communiqué aspect data 53 and preventing the communiqué aspect data 53 from reaching the end user entity 30, the existence of the communiqué 52 affiliated with the source entity 20 and/or the affiliation between the communiqué 52 and the particular source entity 20 may be obfuscated.

In addition to the communiqué aspect data intercepting operation 302, operational flow 300 may also include a covert indicator data transmitting operation 304 for transmitting to the end user entity, in response to intercepting the communiqué aspect data and in lieu of transmitting direct indication of the communiqué to the end user entity, covert indicator data that upon reception by the end user entity covertly indicates the one or more aspects of the communiqué as further illustrated in FIG. 3. For instance, the covert indicator data transmitting module 104 of the network device 10 of FIG. 1*b* transmitting to the end user entity 30, in response to intercepting the communiqué aspect data 53 and in lieu of transmitting direct indication of the communiqué 52 to the end user entity 30, covert indicator data 54 that upon reception by the end user entity 30 covertly indicates the one or more aspects (e.g., reception of a communiqué 52 affiliated with the particular source entity 20) of the communiqué 52. As briefly described earlier, and as will be further described herein, the covert indicator data 54 to be transmitted may be transmitted in a variety of forms that when received by the end user entity 30 (e.g., received by the communication device 34 of the end user entity 30) may covertly indicate one aspect or multiple aspects of the communiqué 52. Thus, in some respect, what the content of the covert indicator data 54 includes may not be as relevant as how the communication device 34 of the end user entity 30 behaves in response to receiving the covert indicator data 54. That is, it may be more relevant to define the covert indicator data 54 by how the communication device 34 of the end user entity 30 reacts to the covert indicator data 54 once it received the covert indicator data 54 rather than by defining the covert indicator data 54 by its content.

Figure 4A:
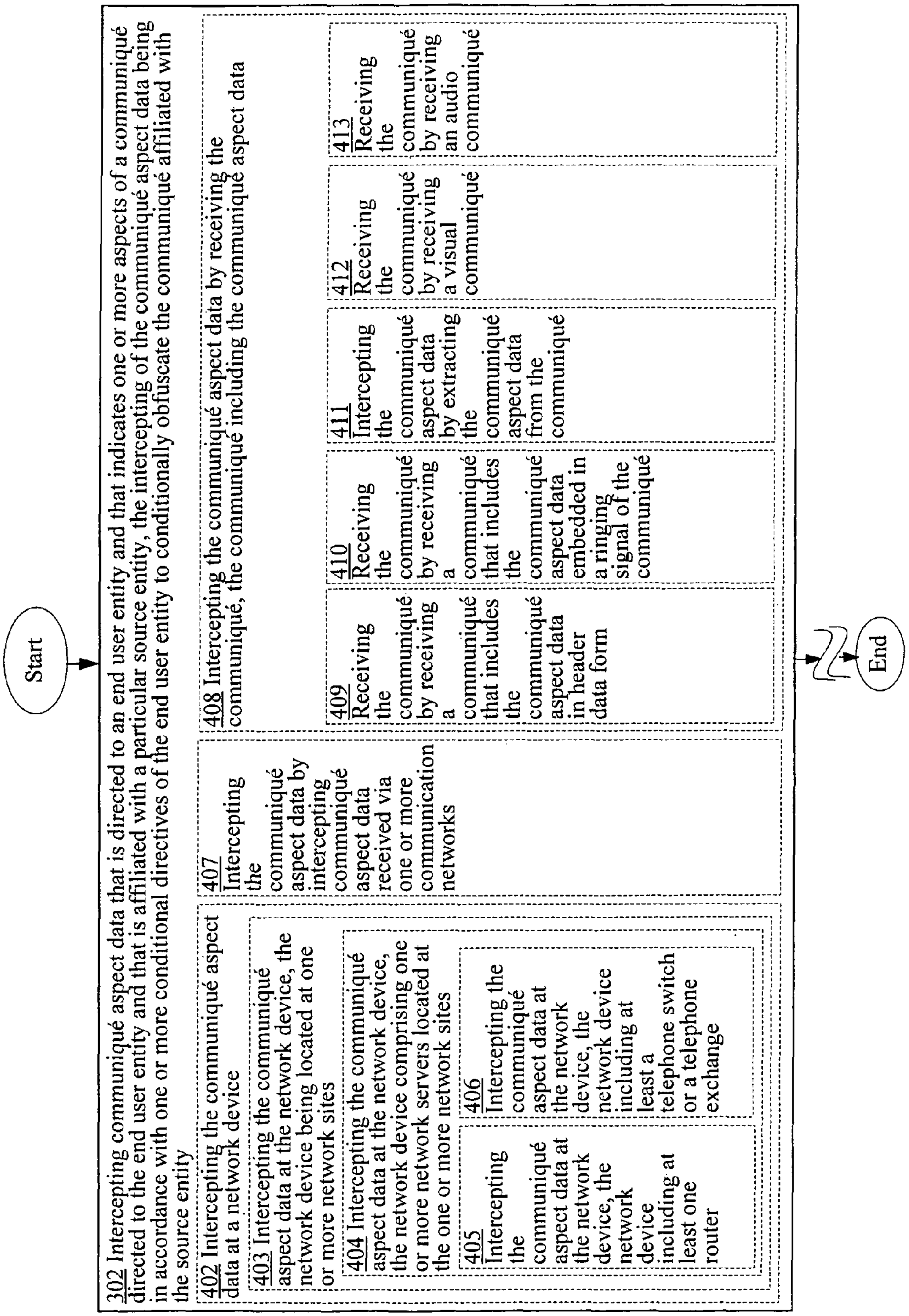
FIG. 4*a* is a high-level logic flowchart of a process depicting alternate implementations of the communiqué aspect data intercepting operation 302 of FIG. 3.

As will be further described herein, the communiqué aspect data intercepting operation 302 and the covert indicator data transmitting operation 304 of FIG. 3 may be executed in a variety of different ways in various alternative implementations. FIGS. 4*a*, 4*b*, 4*c*, 4*d*, 4*e*, 4*f*, and 4*g*, for example, illustrate some of the alternative ways that the communiqué aspect data intercepting operation 302 of FIG. 3 may be executed in various alternative implementations. For example, in various implementations, the communiqué aspect data intercepting operation 302 of FIG. 3 may include an operation 402 for intercepting the communiqué aspect data at a network device as depicted in FIG. 4*a*. For instance, the communiqué aspect data intercepting module 102 of the network device 10 of FIG. 1*b* intercepting the communiqué aspect data at a network device 10 (e.g., a server or a plurality of servers located at a single or multiple network sites).

In some implementations, operation 402 may further include an operation 403 for intercepting the communiqué aspect data at the network device, the network device being located at one or more network sites as further depicted in FIG. 4*a*. For instance, the communiqué aspect data intercepting module 102 of the network device 10 of FIG. 1*b* intercepting the communiqué aspect data 53 at the network device 10, the network device 10 being located at one or more network sites (e.g., in the case of cloud computing, the network device 10 may comprise of multiple servers located at multiple sites).

As further illustrated in FIG. 4*a*, operation 403 may further include one or more additional operations. For example, in some implementations, operation 403 may include an operation 404 for intercepting the communiqué aspect data at the network device, the network device comprising one or more network servers located at the one or more network sites as further depicted in FIG. 4*a*. For instance, the communiqué aspect data intercepting module 102 of the network device 10 of FIG. 1*b* intercepting the communiqué aspect data 53 at the network device 10, the network device 10 comprising one or more network servers located at the one or more network sites.

Operation 404, in turn, may further include an operation 405 for intercepting the communiqué aspect data at the network device, the network device including at least one router as further depicted in FIG. 4*a*. For instance, the communiqué aspect data intercepting module 102 of the network device 10 of FIG. 1*b* intercepting the communiqué aspect data 53 at the network device 10, the network device 10 including at least one router.

In the same or different implementations, operation 404 may include an operation 406 for intercepting the communiqué aspect data at the network device, the network device including at least a telephone switch or a telephone exchange as further depicted in FIG. 4*a*. For instance, the communiqué aspect data intercepting module 102 of the network device 10 of FIG. 1*b* intercepting the communiqué aspect data 53 at the network device 10, the network device 10 including at least a telephone switch or a telephone exchange.

In some cases, the communiqué aspect data intercepting operation 302 of FIG. 3 may include an operation 407 for intercepting the communiqué aspect data by intercepting communiqué aspect data received via one or more communication networks as further depicted in FIG. 4*a*. For instance, the communiqué aspect data intercepting module 102 of the network device 10 of FIG. 1*b* intercepting the communiqué aspect data 53 by intercepting communiqué aspect data 53 that is received via one or more communication networks 40 (e.g., one or more of a WLAN, a WMAN, a WiMAX, a PTSN, a cellular network, a Client/Server Network, a VPN, and/or other types of networks).

In some cases, the communiqué aspect data 53 that is intercepted through the communiqué aspect data intercepting operation 302 may be included or embedded in the communiqué 52. For example, in some implementations, the communiqué aspect data intercepting operation 302 may include an operation 408 for intercepting the communiqué aspect data by receiving the communiqué, the communiqué including the communiqué aspect data as further depicted in FIG. 4*a*. For instance, the communiqué aspect data intercepting module 102 including the communiqué receiving module 202 (see FIG. 2*a*) of the network device 10 of FIG. 1*b* intercepting the communiqué aspect data 53 by having the communiqué receiving module 202 receive the communiqué 52, the communiqué 52 (e.g., an email, a text message, an IM, a telephone call, a voice message, a video message, and so forth) including the communiqué aspect data 53 (e.g., may be header data or data imbedded in the ringing signal of a telephone call). Note that in other implementations, the communiqué aspect data 53 may not be included in the communiqué 52.

As further illustrated in FIG. 4*a*, operation 408 may further include one or more additional operations including, for example, an operation 409 for receiving the communiqué by receiving a communiqué that includes the communiqué aspect data in header data form in various alternative implementations. For instance, the communiqué receiving module 202 of the network device 10 of FIG. 1*b* receiving the communiqué 52 by receiving a communiqué 52 that includes the communiqué aspect data 53 in header data form.

In the same or different implementations, operation 408 may include an operation 410 for receiving the communiqué by receiving a communiqué that includes the communiqué aspect data embedded in a ringing signal of the communiqué as further depicted in FIG. 4*a*. For instance, the communiqué receiving module 202 of the network device 10 of FIG. 1*b* receiving the communiqué 52 by receiving a communiqué 52 that includes the communiqué aspect data 53 embedded in a ringing signal of the communiqué 52 (e.g., such as ringing signal of a missed or unsuccessful telephone call).

In the same or different implementations, operation 408 may include an operation 411 for intercepting the communiqué aspect data by extracting the communiqué aspect data from the communiqué as further depicted in FIG. 4*a*. For instance, the communiqué aspect data intercepting module 102 including the communiqué aspect data extracting module 203 (see FIG. 2*a*) of the network device 10 of FIG. 1*b* receiving the communiqué 52 by having the communiqué aspect data extracting module 203 extract the communiqué aspect data 53 from the communiqué 52.

In the same or different implementations, operation 408 may include an operation 412 for receiving the communiqué by receiving a visual communiqué as further depicted in FIG. 4*a*. For instance, the communiqué receiving module 202 including the visual communiqué receiving module 204 (see FIG. 2*a*) of the network device 10 of FIG. 1*b* receiving the communiqué 52 by having the visual communiqué receiving module 204 receive a visual communiqué 52 (e.g., a visual textual message such as an email, a text message, an instant message or IM, and so forth).

In the same or different implementations, operation 408 may include an operation 413 for receiving the communiqué by receiving an audio communiqué as further depicted in FIG. 4*a*. For instance, the communiqué receiving module 202 including the audio communiqué receiving module 205 (see FIG. 2*a*) of the network device 10 of FIG. 1*b* receiving the communiqué 52 by having the audio communiqué receiving module 205 receiving an audio communiqué 52 (e.g., a missed or unsuccessful telephone call including a missed VoIP call, a video message, a voice message, or other audio communications).

Figure 4B:
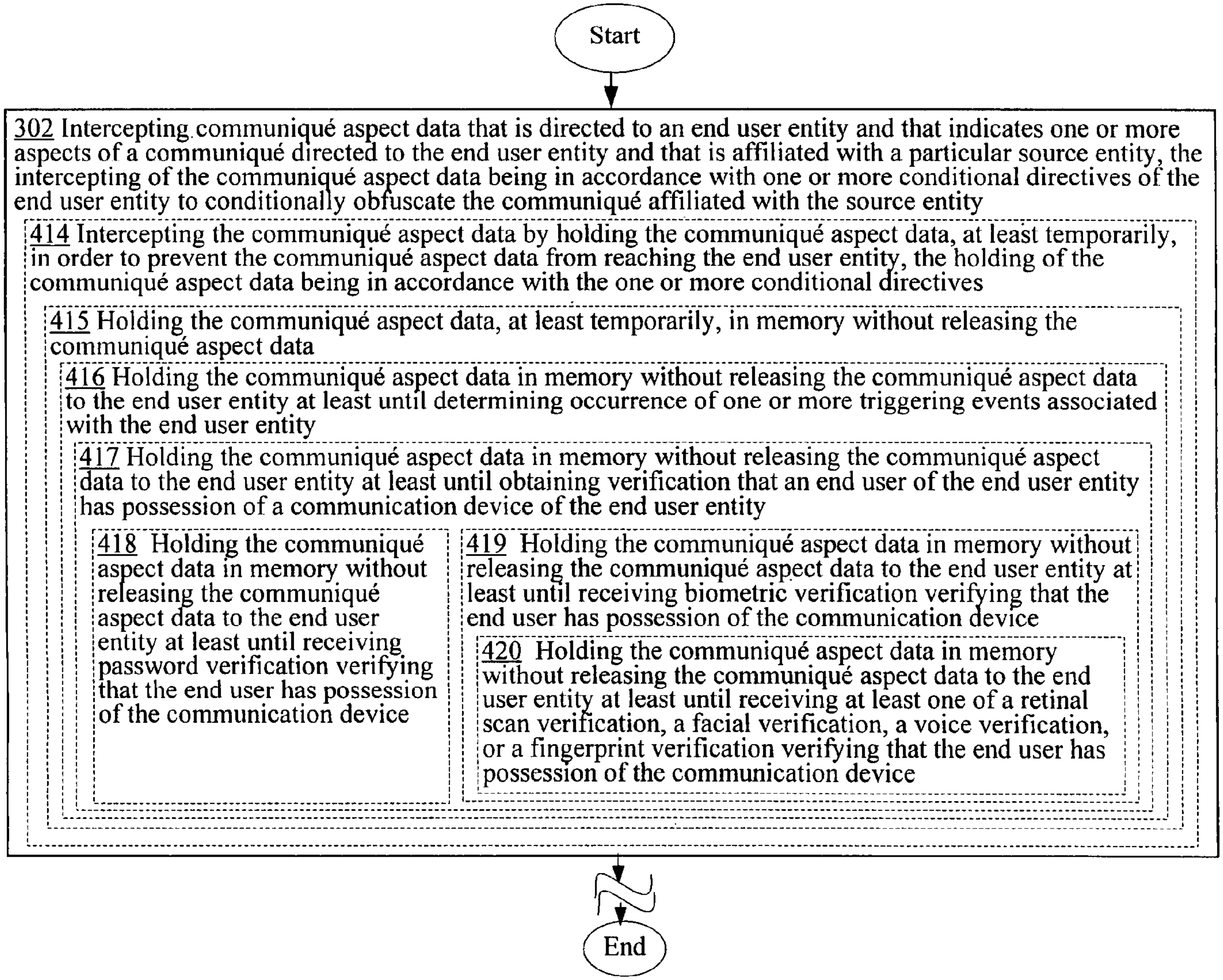
FIG. 4*b* is a high-level logic flowchart of a process depicting alternate implementations of the communiqué aspect data intercepting operation 302 of FIG. 3.
Figure 4C:
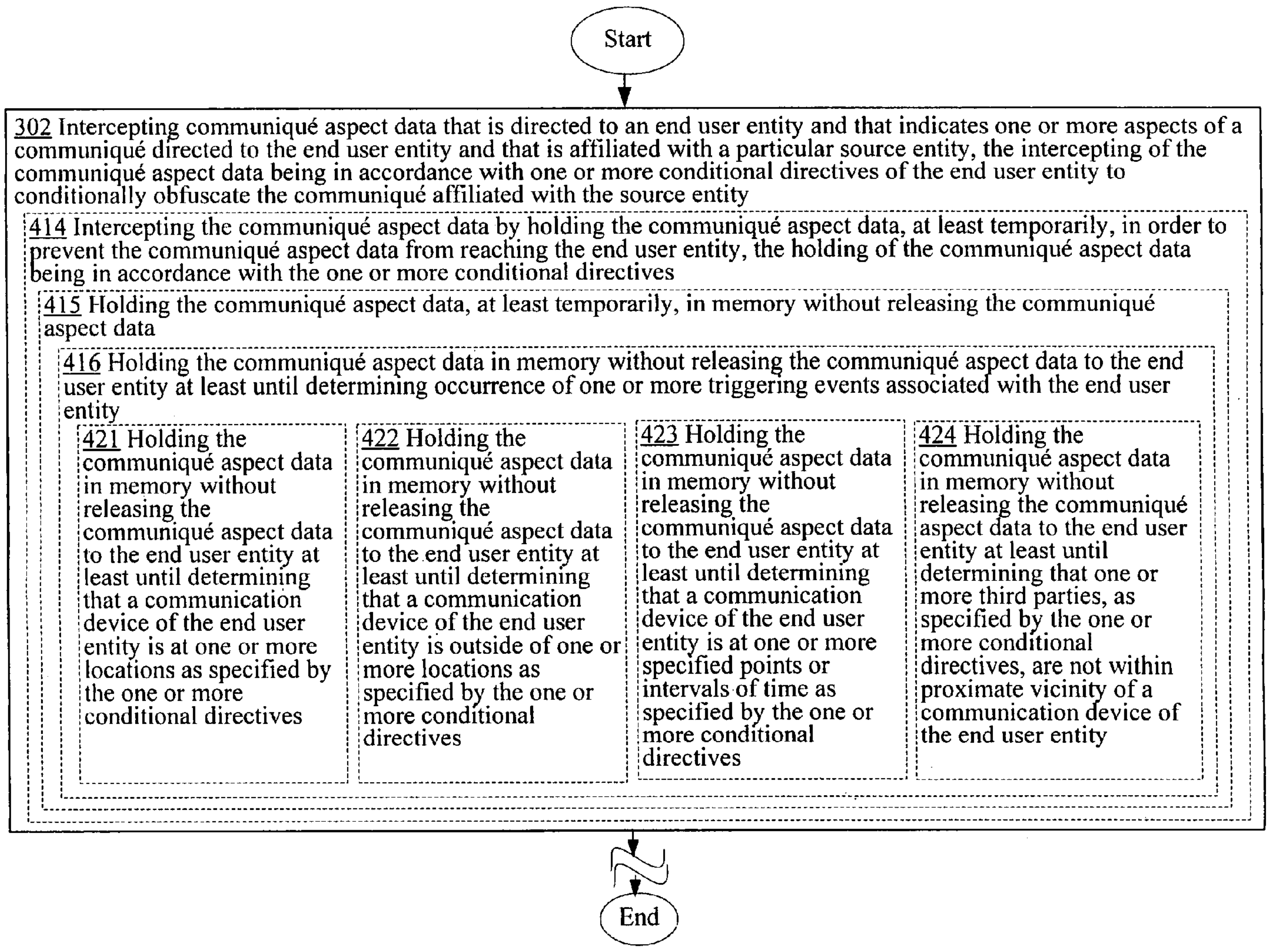
FIG. 4*c* is a high-level logic flowchart of a process depicting alternate implementations of the communiqué aspect data intercepting operation 302 of FIG. 3.

In various implementations, the communiqué aspect data intercepting operation 302 of FIG. 3 for intercepting the communiqué aspect data 53 may involve withholding the communiqué aspect data 53, at least temporarily, in order to prevent the communiqué aspect data 53 from reaching the end user entity 30 as illustrated in FIGS. 4*b* and 4*c*. In some implementations, for example, the communiqué aspect data intercepting operation 302 may further include an operation 414 for intercepting the communiqué aspect data by holding the communiqué aspect data, at least temporarily, in order to prevent the communiqué aspect data from reaching the end user entity, the holding of the communiqué aspect data being in accordance with the one or more conditional directives as depicted in FIG. 4*b*. For instance, the communiqué aspect data intercepting module 102 including the communiqué aspect data holding module 206 (see FIG. 2*a*) of the network device 10 of FIG. 1*b* intercepting the communiqué aspect data 53 by having the communiqué aspect data holding module 206 hold (e.g., withhold or hold without releasing) the communiqué aspect data 53, at least temporarily (e.g., hold temporarily at least until detecting occurrence of one or more triggering events as will be further described below), in order to prevent the communiqué aspect data 53 from reaching the end user entity 30, the holding of the communiqué aspect data 53 being in accordance with the one or more conditional directives 50.

As further depicted in FIG. 4*b*, operation 414 may further include an operation 415 for holding the communiqué aspect data, at least temporarily, in memory without releasing the communiqué aspect data. For instance, the communiqué aspect data holding module 206 of the network device 10 of FIG. 1*b* holding the communiqué aspect data 53, at least temporarily, in memory 140 (e.g., volatile memory, non-volatile memory, cache memory, and so forth) without releasing the communiqué aspect data 53.

In various implementations, the operation 415 for holding the communiqué aspect data, at least temporarily, in memory without releasing the communiqué aspect data may further include one or more additional operations. For example, in some implementations, operation 415 may include an operation 416 for holding the communiqué aspect data in memory without releasing the communiqué aspect data to the end user entity at least until determining occurrence of one or more triggering events associated with the end user entity as further depicted in FIG. 4*b*. For instance, the communiqué aspect data holding module 206 including the triggering event determining module 207 (see FIG. 2*a*) of the network device 10 of FIG. 1*b* holding the communiqué aspect data 53 in memory 140 without releasing (e.g., transmitting) the communiqué aspect data 53 to the end user entity 30 at least until the triggering event determining module 207, for example, determines occurrence of one or more triggering events associated with the end user entity 30.

Operation 416, in turn, may further include an operation 417 for holding the communiqué aspect data in memory without releasing the communiqué aspect data to the end user entity at least until obtaining verification that an end user of the end user entity has possession of a communication device of the end user entity in various implementations. For instance, the communiqué aspect data holding module 206 including the end user possession verifying module 208 (see FIG. 2*a*) of the network device 10 of FIG. 1*b* holding the communiqué aspect data 53 in memory 140 without releasing the communiqué aspect data 53 to the end user entity 30 at least until the end user possession verifying module 208 obtains verification that an end user 32 of the end user entity 30 has possession of a communication device 34 (e.g., a cellular telephone, a Smartphone, a PDA, a laptop or desktop computer, a workstation, or another type of communication/computing device) of the end user entity 30.

In some cases, operation 417 may further include an operation 418 for holding the communiqué aspect data in memory without releasing the communiqué aspect data to the end user entity at least until receiving password verification verifying that the end user has possession of the communication device as further depicted in FIG. 4*b*. For instance, the communiqué aspect data holding module 206 including the password verification receiving module 209 (see FIG. 2*a*) of the network device 10 of FIG. 1*b* holding the communiqué aspect data 53 in memory 140 without releasing the communiqué aspect data 53 to the end user entity 30 at least until the password verification receiving module 209 receives a password verification verifying that the end user 32 has possession of the communication device 34.

In the same or different implementations, operation 417 may also include an operation 419 for holding the communiqué aspect data in memory without releasing the communiqué aspect data to the end user entity at least until receiving biometric verification verifying that the end user has possession of the communication device as further depicted in FIG. 4*b*. For instance, the communiqué aspect data holding module 206 including the biometric verification receiving module 210 (see FIG. 2*a*) of the network device 10 of FIG. 1*b* holding the communiqué aspect data 53 in memory 140 without releasing the communiqué aspect data 53 to the end user entity 30 at least until the biometric verification receiving module 210 receives biometric verification (e.g., digital image of a face, digital voice recording, retinal scan results, and so forth) verifying that the end user 32 has possession of the communication device 34.

In some cases, operation 419 may further include an operation 420 for holding the communiqué aspect data in memory without releasing the communiqué aspect data to the end user entity at least until receiving at least one of a retinal scan verification, a facial verification, a voice verification, or a fingerprint verification verifying that the end user has possession of the communication device as further depicted in FIG. 4*b*. For instance, the communiqué aspect data holding module 206 including the biometric verification receiving module 210 of the network device 10 of FIG. 1*b* holding the communiqué aspect data 53 in memory 140 without releasing the communiqué aspect data 53 to the end user entity 30 at least until the biometric verification receiving module 210 receives at least one of a retinal scan verification (e.g., digitized image of a retina), a facial verification (e.g., a digitized image of a face), a voice verification (e.g., a digital voice recording), or a fingerprint verification (e.g., digital image of a fingerprint) verifying that the end user 32 has possession of the communication device 34. That is, by receiving a digitized image of a retina, a digitized image of a face, a digitized voice recording, or a digitized image of a fingerprint, and using the appropriate software (e.g., a retina recognition application, a facial recognition application, a voice recognition application, or a fingerprint recognition application) for example, a verification made be made that the end user 32 has possession of the communication device 10.

In some implementations, operation 416 for holding the communiqué aspect data in memory without releasing the communiqué aspect data to the end user entity at least until determining occurrence of one or more triggering events associated with the end user entity may include an operation 421 for holding the communiqué aspect data in memory without releasing the communiqué aspect data to the end user entity at least until determining that a communication device of the end user entity is at one or more locations as specified by the one or more conditional directives as depicted in FIG. 4*c*. For instance, the communiqué aspect data holding module 206 including the communication device location determining module 212 (see FIG. 2*a*) of the network device 10 of FIG. 1*b* holding the communiqué aspect data 53 in memory 140 without releasing the communiqué aspect data 53 to the end user entity 30 at least until the communication device location determining module 212 determines that a communication device 34 (e.g., a mobile device with a GPS such as a Smartphone) of the end user entity 30 is at one or more locations as specified by the one or more conditional directives 50. For these implementations, the communication device location determining module 212 may determine the location of the communication device 34 based on end user entity data 55 (e.g., GPS data) provided by the communication device 34.

In the same or different implementations, operation 416 may alternatively or additionally include an operation 422 for holding the communiqué aspect data in memory without releasing the communiqué aspect data to the end user entity at least until determining that a communication device of the end user entity is outside of one or more locations as specified by the one or more conditional directives as depicted in FIG. 4*c*. For instance, the communiqué aspect data holding module 206 including the communication device location determining module 212 (see FIG. 2*a*) of the network device 10 of FIG. 1*b* holding the communiqué aspect data 53 in memory 140 without releasing the communiqué aspect data 53 to the end user entity 30 at least until the communication device location determining module 212 determines that a communication device 34 of the end user entity 30 is outside of one or more locations as specified by the one or more conditional directives 50 and as determined by the communication device location determining module 212.

In the same or different implementations, operation 416 may alternatively or additionally include an operation 423 for holding the communiqué aspect data in memory without releasing the communiqué aspect data to the end user entity at least until determining that a communication device of the end user entity is at one or more specified points or intervals of time as specified by the one or more conditional directives as further depicted in FIG. 4*c*. For instance, the communiqué aspect data holding module 206 including the communication device time determining module 213 (see FIG. 2*a*) of the network device 10 of FIG. 1*b* holding the communiqué aspect data 53 in memory 140 without releasing the communiqué aspect data 53 to the end user entity 30 at least until the communication device time determining module 213 determines (e.g., based on end user entity data 55 provided by the end user entity 30) that a communication device 34 of the end user entity 30 is at one or more specified points or intervals of time as specified by the one or more conditional directives 50.

In the same or different implementations, operation 416 may alternatively or additionally include an operation 424 for holding the communiqué aspect data in memory without releasing the communiqué aspect data to the end user entity at least until determining that one or more third parties, as specified by the one or more conditional directives, are not within proximate vicinity of a communication device of the end user entity as depicted in FIG. 4*c*. For instance, the communiqué aspect data holding module 206 including the third party proximity determining module 214 (see FIG. 2*a*) of the network device 10 of FIG. 1*b* holding the communiqué aspect data 53 in memory 140 without releasing the communiqué aspect data 53 to the end user entity 30 at least until the third party proximity determining module 214 determines that one or more third parties, as specified by the one or more conditional directives 50, are not within proximate vicinity of a communication device 34 of the end user entity 30.

Figure 4D:
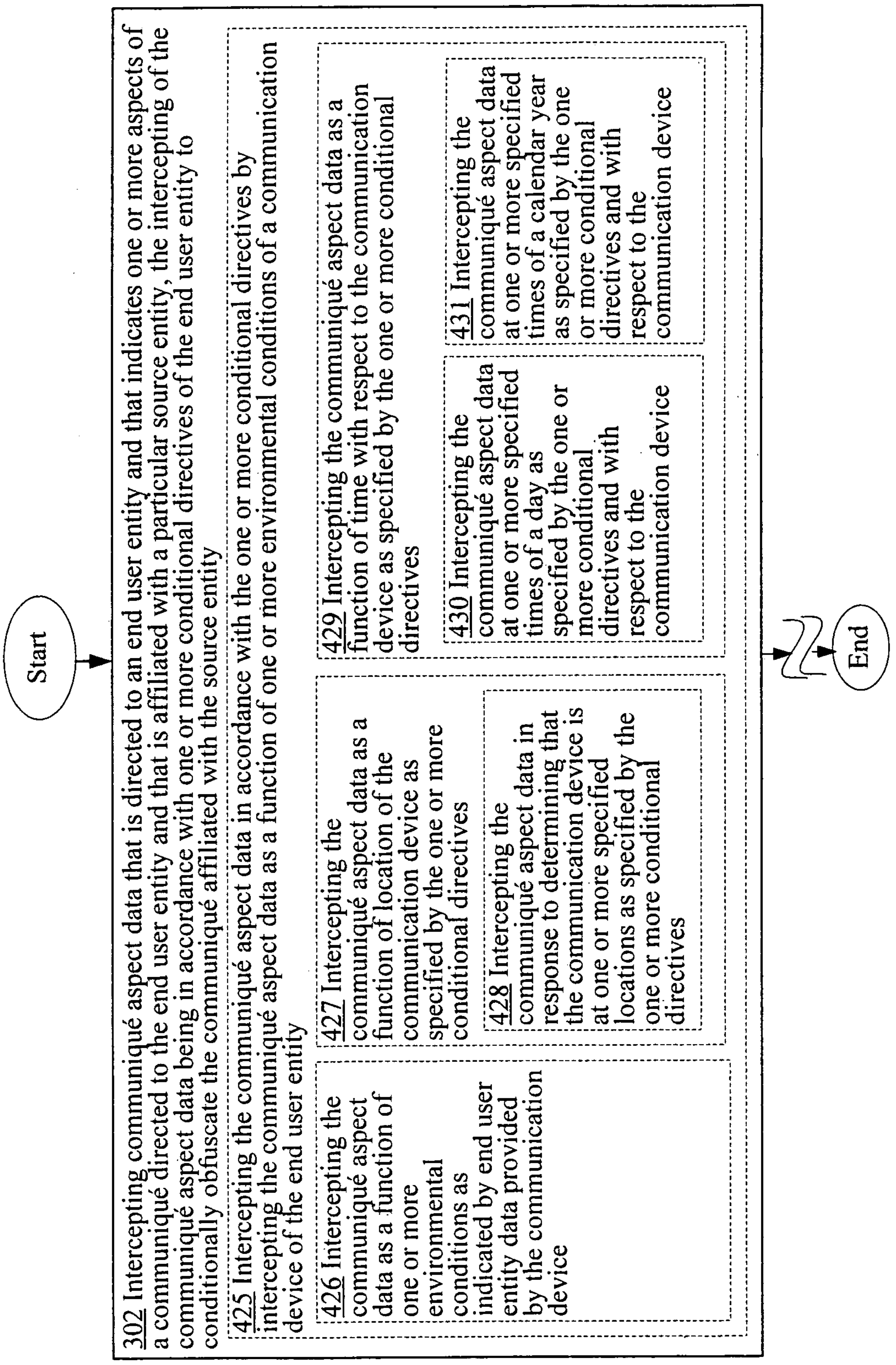
FIG. 4*d* is a high-level logic flowchart of a process depicting alternate implementations of the communiqué aspect data intercepting operation 302 of FIG. 3.

The interception of the communiqué aspect data 53 in the communiqué aspect data intercepting operation 302 of FIG. 3 may be in response to one or more environmental conditions of the end user entity 30. For example, in various implementations, the communiqué aspect data intercepting operation 302 of FIG. 3 may include an operation 425 for intercepting the communiqué aspect data in accordance with the one or more conditional directives by intercepting the communiqué aspect data as a function of one or more environmental conditions of a communication device of the end user entity as depicted in FIG. 4*d*. For instance, the communiqué aspect data intercepting module 102 including the environmental condition determining module 216 (see FIG. 2*a*) of the network device 10 of FIG. 1*b* intercepting the communiqué aspect data 53 in accordance with the one or more conditional directives 50 by intercepting (e.g., holding without releasing at least until detecting occurrence of a triggering event associated with the end user entity 30) the communiqué aspect data 53 as a function of one or more environmental conditions (e.g., as determined by the environmental condition determining module 216) of a communication device 34 of the end user entity 30.

As further illustrated in FIG. 4*d*, in various implementations, operation 425 may also include an operation 426 for intercepting the communiqué aspect data as a function of one or more environmental conditions as indicated by end user entity data provided by the communication device. For instance, the communiqué aspect data intercepting module 102 including the environmental condition determining module 216 of the network device 10 of FIG. 1*b* intercepting the communiqué aspect data 53 as a function of one or more environmental conditions (e.g., presence or absence of a third party in the proximate vicinity of the communication device 34) as determined by the environmental condition determining module 216 and as indicated by end user entity data 55 (e.g., data entered by the end user 32 through, for example, microblogs or personal management application or data provided by one or more sensors including image data, audio data, or other types of data) provided by the communication device 34.

In the same or different implementations, operation 425 may include an operation 427 for intercepting the communiqué aspect data as a function of location of the communication device as specified by the one or more conditional directives as further depicted in FIG. 4*d*. For instance, the communiqué aspect data intercepting module 102 including the communication device location determining module 217 (see FIG. 2*a*) of the network device 10 of FIG. 1*b* intercepting (e.g., withholding) the communiqué aspect data 53 as a function of location of the communication device 34 as specified by the one or more conditional directives 50, the location of the communication device 34 being determined by the communication device location determining module 217. Note that the communication device location determining module 217 and the communication device location determining module 212 in FIG. 2*a* essentially perform the same functions. Thus in some implementations, they may be the same modules.

Operation 427, in turn, may further include an operation 428 for intercepting the communiqué aspect data in response to determining that the communication device is at one or more specified locations as specified by the one or more conditional directives as further depicted in FIG. 4*d*. For instance, the communiqué aspect data intercepting module 102 including the communication device location determining module 217 of the network device 10 of FIG. 1*b* intercepting (e.g., withholding) the communiqué aspect data 53 in response to the communication device location determining module 217 determining (e.g., determining based on GPS data provided through end user entity data 55) that the communication device 34 is at one or more specified locations as specified by the one or more conditional directives 50.

In the same or different implementations, operation 425 for intercepting the communiqué aspect data as a function of one or more environmental conditions of the communication device of the end user entity may include an operation 429 for intercepting the communiqué aspect data as a function of time with respect to the communication device as specified by the one or more conditional directives as further depicted in FIG. 4*d*. For instance, the communiqué aspect data intercepting module 102 including the communication device time determining module 218 (see FIG. 2*a*) of the network device 10 of FIG. 1*b* intercepting (e.g., withholding) the communiqué aspect data 53 as a function of time with respect to the communication device 34 as specified by the one or more conditional directives 50, the time with respect to the communication device 34 being determined by the communication device time determining module 218 based on the end user entity data 55 provided by the communication device 34. Note that the communication device time determining module 218 and communication device time determining module 213 of FIG. 2*a* may perform essentially the same functions and therefore may be the same module in various alternative implementations.

In some cases, operation 429 may include an operation 430 for intercepting the communiqué aspect data at one or more specified times of a day as specified by the one or more conditional directives and with respect to the communication device as further depicted in FIG. 4*d*. For instance, the communiqué aspect data intercepting module 102 including the communication device time determining module 218 of the network device 10 of FIG. 1*b* intercepting (e.g., withholding) the communiqué aspect data 53 at one or more specified times of a day (e.g., between 6 PM and 8 AM) as specified by the one or more conditional directives 50 and with respect to the communication device 34, the time with respect to the communication device 34 being determined by the communication device time determining module 218 based on, for example, the end user entity data 55 provided by the communication device 34.

In the same or different implementations, operation 429 may include an operation 431 for intercepting the communiqué aspect data at one or more specified times of a calendar year as specified by the one or more conditional directives and with respect to the communication device as further depicted in FIG. 4*d*. For instance, the communiqué aspect data intercepting module 102 including the communication device time determining module 218 of the network device 10 of FIG. 1*b* intercepting (e.g., withholding) the communiqué aspect data 53 at one or more specified times of a calendar year (e.g., Christmas day) as specified by the one or more conditional directives 50 and with respect to the communication device 34, the time with respect to the communication device 34 being determined by the communication device time determining module 218 based on, for example, the end user entity data 55 provided by the communication device 34.

Figure 4E:
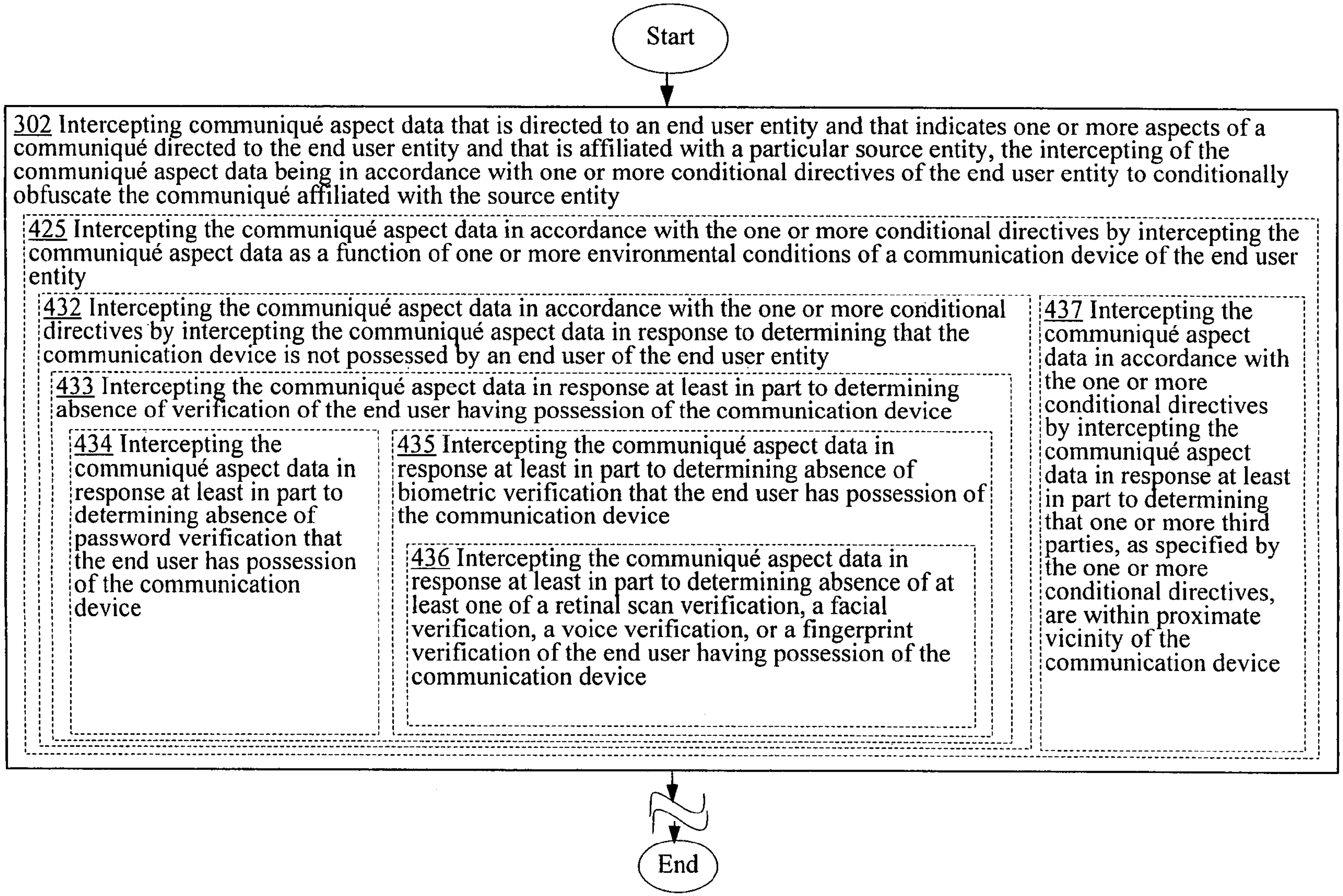
FIG. 4*e* is a high-level logic flowchart of a process depicting alternate implementations of the communiqué aspect data intercepting operation 302 of FIG. 3.

In the same or different implementations, operation 425 for intercepting the communiqué aspect data as a function of one or more environmental conditions of the communication device of the end user entity may include an operation 432 for intercepting the communiqué aspect data in accordance with the one or more conditional directives by intercepting the communiqué aspect data in response to determining that the communication device is not possessed by an end user of the end user entity as depicted in FIG. 4*e*. For instance, the communiqué aspect data intercepting module 102 including the end user possession determining module 219 (see FIG. 2*a*) of the network device 10 of FIG. 1*b* intercepting (e.g., withholding) the communiqué aspect data 53 in accordance with the one or more conditional directives 50 by intercepting the communiqué aspect data 53 in response to the end user possession determining module 219 determining that the communication device 34 is not possessed by an end user 32 of the end user entity 30 based at least in part on, for example, end user entity data 55 provided by the communication device 34.

In some cases, operation 432 may, in turn, include an operation 433 for intercepting the communiqué aspect data in response at least in part to determining absence of verification of the end user having possession of the communication device as depicted in FIG. 4*e*. For instance, the communiqué aspect data intercepting module 102 including the end user possession verifying module 220 (see FIG. 2*a*) of the network device 10 of FIG. 1*b* intercepting (e.g., withholding) the communiqué aspect data 53 in response at least in part to the end user possession verifying module 220 determining absence of verification of the end user 32 having possession of the communication device 34. Note that in various alternative implementations, the end user possession verifying module 220 and the end user possession verifying module 208 of FIG. 2*a* may perform essentially the same functions and therefore may be the same module.

As further illustrated in FIG. 4*e*, operation 433 may further include one or more additional operations in various alternative implementations. For example, in some implementations, operation 433 may further include an operation 434 for intercepting the communiqué aspect data in response at least in part to determining absence of password verification that the end user has possession of the communication device as depicted in FIG. 4*e*. For instance, the communiqué aspect data intercepting module 102 including the password verification determining module 221 (see FIG. 2*a*) of the network device 10 of FIG. 1*b* intercepting (e.g., withholding) the communiqué aspect data 53 in response at least in part to the password verification determining module 221 determining absence of password verification that the end user has possession of the communication device 10. Note that in some implementations the password verification determining module 221 and the password verification receiving module 209 of FIG. 2*a* may perform essentially the same functions and therefore may be the same module.

In the same or different implementations, operation 433 may include an operation 435 for intercepting the communiqué aspect data in response at least in part to determining absence of biometric verification that the end user has possession of the communication device as further depicted in FIG. 4*e*. For instance, the communiqué aspect data intercepting module 102 including the biometric verification determining module 222 (see FIG. 2*a*) of the network device 10 of FIG. 1*b* intercepting (e.g., withholding) the communiqué aspect data 53 in response at least in part to the biometric verification determining module 222 determining absence of biometric verification that the end user 32 having possession of the communication device 34. Note that in some implementations, the biometric verification determining module 222 and the biometric verification receiving module 210 of FIG. 2*a* may perform similar functions and therefore may be the same module.

In some cases, operation 435 may further include an operation 436 for intercepting the communiqué aspect data in response at least in part to determining absence of at least one of a retinal scan verification, a facial verification, a voice verification, or a fingerprint verification of the end user having possession of the communication device as further depicted in FIG. 4*e*. For instance, the communiqué aspect data intercepting module 102 including the biometric verification determining module 222 of the network device 10 of FIG. 1*b* intercepting (e.g., withholding) the communiqué aspect data 53 in response at least in part to the biometric verification determining module 222 determining absence of at least one of a retinal scan verification, a facial verification, a voice verification, or a fingerprint verification of the end user 32 having possession of the communication device 34.

In the same or different implementations, operation 425 for intercepting the communiqué aspect data as a function of one or more environmental conditions of the communication device of the end user entity may include an operation 437 for intercepting the communiqué aspect data in accordance with the one or more conditional directives by intercepting the communiqué aspect data in response at least in part to determining that one or more third parties, as specified by the one or more conditional directives, are within proximate vicinity of the communication device as further depicted in FIG. 4*e*. For instance, the communiqué aspect data intercepting module 102 including the third party proximity determining module 223 (see FIG. 2*a*) of the network device 10 of FIG. 1*b* intercepting (e.g., withholding) the communiqué aspect data 53 in accordance with the one or more conditional directives 50 by intercepting the communiqué aspect data 53 in response at least in part to the third party proximity determining module 223 determining that one or more third parties, as specified (e.g., identified) by the one or more conditional directives 50, are within proximate vicinity of the communication device 34. In various implementations, the one or more specified third parties may be determined to be within the "proximate vicinity" of the communication device 34 if the one or more third parties are within three feet, within five feet, within eight feet, within ten feet, or within some other distance from the communication device 34 from which the one or more third parties may hear/see/sense communiqués 52 that are presented through the communication device 34. Note that in some implementations, the third party proximity determining module 223 and the third party proximity determining module 214 of FIG. 2*a* may perform essentially the same functions and therefore may be the same module.

Figure 4F:
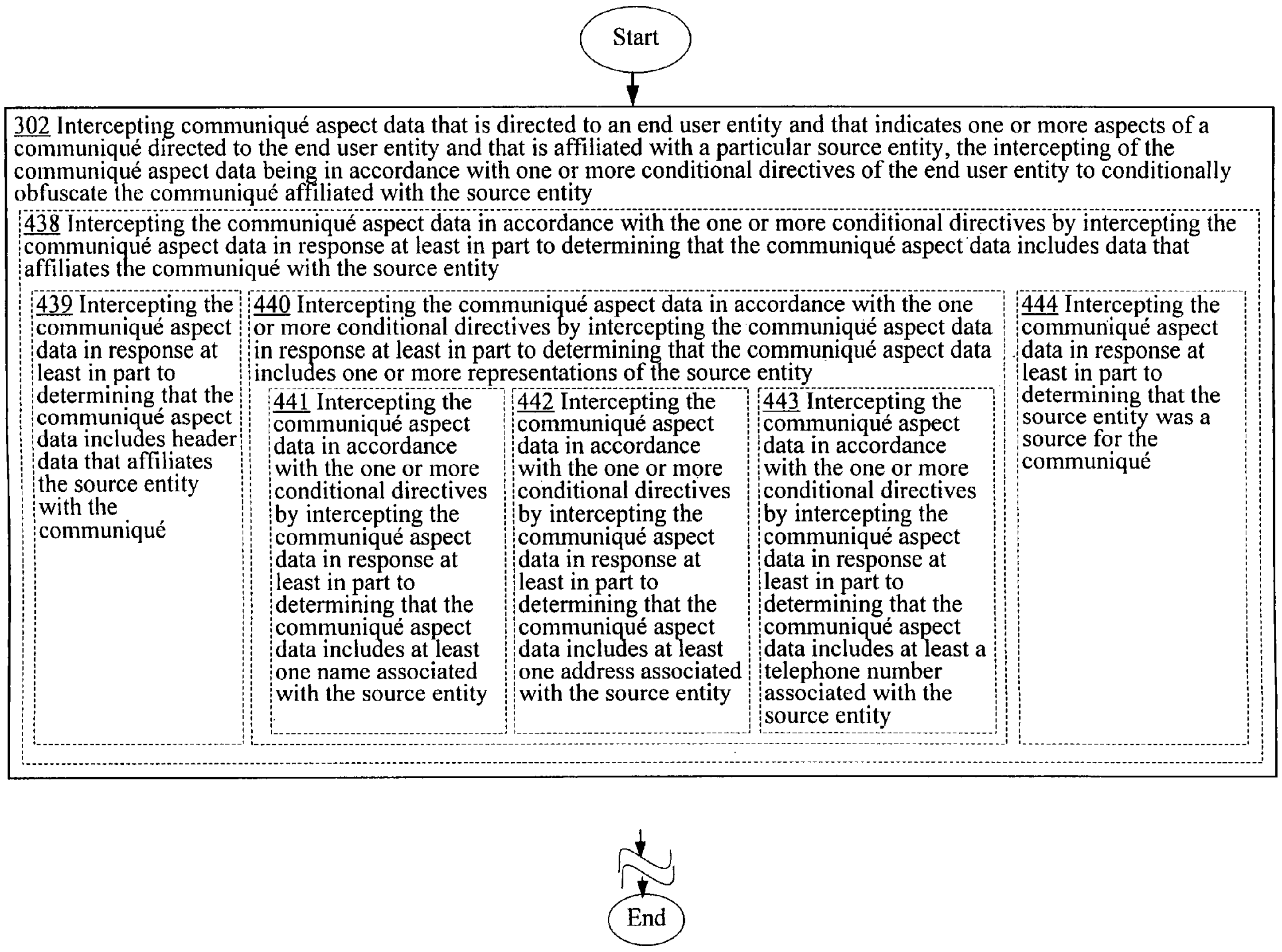
FIG. 4*f* is a high-level logic flowchart of a process depicting alternate implementations of the communiqué aspect data intercepting operation 302 of FIG. 3.

In various implementations, the communiqué aspect data intercepting operation 302 of FIG. 3 may be executed only when a determination is made that the communiqué 52 is affiliated with the source entity 20. For example, in some implementations, the communiqué aspect data intercepting operation 302 may include an operation 438 for intercepting the communiqué aspect data in accordance with the one or more conditional directives by intercepting the communiqué aspect data in response at least in part to determining that the communiqué aspect data includes data that affiliates the communiqué with the source entity as depicted in FIG. 4*f*. For instance, the communiqué aspect data intercepting module 102 including the source entity affiliation determining module 224 (see FIG. 2*b*) of the network device 10 of FIG. 1*b* intercepting (e.g., withholding) the communiqué aspect data 53 in accordance with the one or more conditional directives 50 by intercepting the communiqué aspect data 53 in response at least in part to the source entity affiliation determining module 224 determining that the communiqué aspect data 53 includes data that affiliates the communiqué 52 with the source entity 20.

As further illustrated in FIG. 4*f*, operation 438 may include one or more additional operations in various alternative implementations. For example, in some implementations, operation 438 may include an operation 439 for intercepting the communiqué aspect data in response at least in part to determining that the communiqué aspect data includes header data that affiliates the source entity with the communiqué as depicted in FIG. 4*f*. For instance, the communiqué aspect data intercepting module 102 including the source entity affiliation determining module 224 of the network device 10 of FIG. 1*b* intercepting (e.g., withholding) the communiqué aspect data 53 in response at least in part to the source entity affiliation determining module 224 determining that the communiqué aspect data 53 includes header data (e.g., message header information that indicate certain aspects of a communiqué 52 such as the address or telephone number of the source for the communiqué 52 and the subject heading if there is one) that affiliates the source entity 20 with the communiqué 52.

In the same or different implementations, operation 338 may additionally or alternatively include an operation 440 for intercepting the communiqué aspect data in accordance with the one or more conditional directives by intercepting the communiqué aspect data in response at least in part to determining that the communiqué aspect data includes one or more representations of the source entity as further depicted in FIG. 4*f*. For instance, the communiqué aspect data intercepting module 102 including the source entity representation determining module 225 (see FIG. 2*ab*) of the network device 10 of FIG. 1*b* intercepting (e.g., withholding) the communiqué aspect data 53 in accordance with the one or more conditional directives 50 by intercepting the communiqué aspect data 53 in response at least in part to the source entity representation determining module 225 determining that the communiqué aspect data 53 includes one or more representations (e.g., one or more identifiers such as one or more names, email addresses, IP addresses, telephone numbers, and/or other identifiers) of the source entity 20.

In some cases, operation 440 may include an operation 441 for intercepting the communiqué aspect data in accordance with the one or more conditional directives by intercepting the communiqué aspect data in response at least in part to determining that the communiqué aspect data includes at least one name associated with the source entity as further depicted in FIG. 4*f*. For instance, the communiqué aspect data intercepting module 102 including the source entity associated name determining module 226 (see FIG. 2*b*) of the network device 10 of FIG. 1*b* intercepting (e.g., withholding) the communiqué aspect data 53 in accordance with the one or more conditional directives 50 by intercepting the communiqué aspect data 53 in response at least in part to the source entity associated name determining module 226 determining that the communiqué aspect data 53 includes at least one name (e.g., username) associated with the source entity 20.

In the same or different implementations, operation 440 may include an operation 442 for intercepting the communiqué aspect data in accordance with the one or more conditional directives by intercepting the communiqué aspect data in response at least in part to determining that the communiqué aspect data includes at least one address associated with the source entity as further depicted in FIG. 4*f*. For instance, the communiqué aspect data intercepting module 102 including the source entity associated address determining module 227 (see FIG. 2*b*) of the network device 10 of FIG. 1*b* intercepting (e.g., withholding) the communiqué aspect data 53 in accordance with the one or more conditional directives 50 by intercepting the communiqué aspect data 53 in response at least in part to the source entity associated address determining module 227 determining that the communiqué aspect data 53 includes at least one address (e.g., email address, IP address, or a URL) associated with the source entity 20.

In the same or different implementations, operation 440 may include an operation 443 for intercepting the communiqué aspect data in accordance with the one or more conditional directives by intercepting the communiqué aspect data in response at least in part to determining that the communiqué aspect data includes at least a telephone number associated with the source entity as further depicted in FIG. 4*f*. For instance, the communiqué aspect data intercepting module 102 including the source entity associated telephone number determining module 228 (see FIG. 2*b*) of the network device 10 of FIG. 1*b* intercepting (e.g., withholding) the communiqué aspect data 53 in accordance with the one or more conditional directives 50 by intercepting the communiqué aspect data 53 in response at least in part to the source entity associated telephone number determining module 228 determining that the communiqué aspect data 53 includes at least a telephone number associated with the source entity 20.

In some implementations, operation 438 for intercepting the communiqué aspect data in accordance with the one or more conditional directives by intercepting the communiqué aspect data in response at least in part to determining that the communiqué aspect data includes data that affiliates the communiqué with the source entity may include an operation 444 for intercepting the communiqué aspect data in response at least in part to determining that the source entity was a source for the communiqué as depicted in FIG. 4*f*. For instance, the communiqué aspect data intercepting module 102 including the source determining module 229 (see FIG. 2*b*) of the network device 10 of FIG. 1*b* intercepting (e.g., withholding) the communiqué aspect data 53 in response at least in part to the source determining module 229 determining that the source entity 20 was a source (e.g., the sender or caller) for the communiqué 53.

Figure 4G:
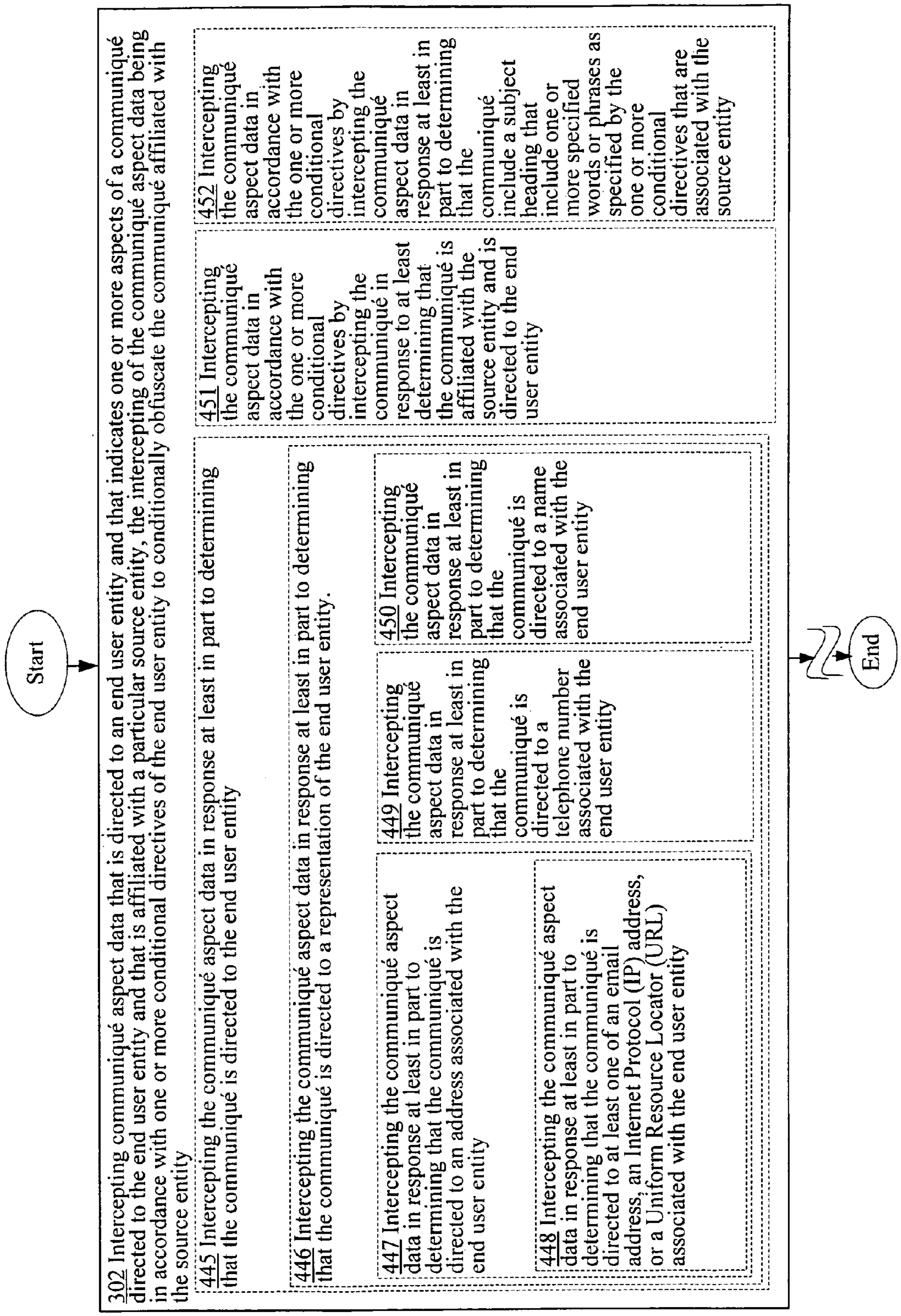
FIG. 4*g* is a high-level logic flowchart of a process depicting alternate implementations of the communiqué aspect data intercepting operation 302 of FIG. 3

In some cases, the communiqué aspect data intercepting operation 302 of FIG. 3 may include an operation 445 for intercepting the communiqué aspect data in response at least in part to determining that the communiqué is directed to the end user entity as depicted in FIG. 4*g*. For instance, the communiqué aspect data intercepting module 102 including the end user entity directed determining module 230 (see FIG. 2*b*) of the network device 10 of FIG. 1*b* intercepting (e.g., withholding) the communiqué aspect data 53 in response at least in part to the end user entity directed determining module 230 determining that the communiqué 52 is directed to (e.g., being sent to or transmitted to) the end user entity 30.

As illustrated in FIG. 4*g*, operation 445 may further include one or more additional operations in some implementations. For example, in various implementations, operation 445 may further include an operation 446 for intercepting the communiqué aspect data in response at least in part to determining that the communiqué is directed to a representation of the end user entity as depicted in FIG. 4*g*. For instance, the communiqué aspect data intercepting module 102 including the end user entity associated representation determining module 231 (see FIG. 2*b*) of the network device 10 of FIG. 1*b* intercepting (e.g., withholding) the communiqué aspect data 53 in response at least in part to the end user entity associated representation determining module 231 determining that the communiqué is directed to a representation (e.g., an identifier such as a name, address, or a telephone number) of the end user entity 30.

In some cases, operation 446 may, in turn, include an operation 447 for intercepting the communiqué aspect data in response at least in part to determining that the communiqué is directed to an address associated with the end user entity as further depicted in FIG. 4*g*. For instance, the communiqué aspect data intercepting module 102 including the end user entity associated address determining module 232 (see FIG. 2*b*) of the network device 10 of FIG. 1*b* intercepting (e.g., withholding) the communiqué aspect data 53 in response at least in part to the end user entity associated address determining module 232 determining that the communiqué 52 is directed to an address (e.g., an email address) associated with the end user entity 30.

In some implementations, operation 447 may further include an operation 448 for intercepting the communiqué aspect data in response at least in part to determining that the communiqué is directed to at least one of an email address, an Internet Protocol (IP) address, or a Uniform Resource Locator (URL) associated with the end user entity as further depicted in FIG. 4*g*. For instance, the communiqué aspect data intercepting module 102 including the end user entity associated address determining module 232 (see FIG. 2*b*) of the network device 10 of FIG. 1*b* intercepting (e.g., withholding) the communiqué aspect data 53 in response at least in part to the end user entity associated address determining module 232 determining that the communiqué 52 is directed to at least one of an email address, an Internet Protocol (IP) address, or a Uniform Resource Locator (URL) associated with the end user entity 30.

In the same or different implementations, operation 446 for intercepting the communiqué aspect data in response at least in part to determining that the communiqué is directed to a representation of the end user entity may include an operation 449 for intercepting the communiqué aspect data in response at least in part to determining that the communiqué is directed to a telephone number associated with the end user entity as further depicted in FIG. 4*g*. For instance, the communiqué aspect data intercepting module 102 including the end user entity associated telephone number determining module 233 (see FIG. 2*b*) of the network device 10 of FIG. 1*b* intercepting (e.g., withholding) the communiqué aspect data 53 in response at least in part to the end user entity associated telephone number determining module 233 determining that the communiqué 52 is directed to a telephone number associated with the end user entity 30.

In the same or different implementations, operation 446 may include an operation 450 for intercepting the communiqué aspect data in response at least in part to determining that the communiqué is directed to a name associated with the end user entity as further depicted in FIG. 4*g*. For instance, the communiqué aspect data intercepting module 102 including the end user entity associated name determining module 234 (see FIG. 2*b*) of the network device 10 of FIG. 1*b* intercepting (e.g., withholding) the communiqué aspect data 53 in response at least in part to the end user entity associated name determining module 234 determining that the communiqué 52 is directed to a name associated with the end user entity 30.

In some cases, the communiqué aspect data intercepting operation 302 of FIG. 3 may further include an operation 451 for intercepting the communiqué aspect data in accordance with the one or more conditional directives by intercepting the communiqué in response to at least determining that the communiqué is affiliated with the source entity and is directed to the end user entity as further depicted in FIG. 4*g*. For instance, the communiqué aspect data intercepting module 102 including the source entity affiliation determining module 224 and the end user entity directed determining module 230 of the network device 10 of FIG. 1*b* intercepting (e.g., withholding) the communiqué aspect data 53 in accordance with the one or more conditional directives 50 by intercepting the communiqué 52 in response to the source entity affiliation determining module 224 and the end user entity directed determining module 230 at least determining, respectively, that the communiqué 52 is affiliated with the source entity 20 and is directed to the end user entity 30.

In the same or different implementations, the communiqué aspect data intercepting operation 302 of FIG. 3 may additionally or alternatively include an operation 452 for intercepting the communiqué aspect data in accordance with the one or more conditional directives by intercepting the communiqué aspect data in response at least in part to determining that the communiqué include a subject heading that include one or more specified words or phrases as specified by the one or more conditional directives that are associated with the source entity as depicted in FIG. 4*g*. For instance, the communiqué aspect data intercepting module 102 including the source entity associated subject heading determining module 235 (see FIG. 2*b*) of the network device 10 of FIG. 1*b* intercepting (e.g., withholding) the communiqué aspect data 53 in accordance with the one or more conditional directives 50 by intercepting the communiqué in response at least in part to the source entity associated subject heading determining module 235 determining that the communiqué 52 include a subject heading that include one or more specified words or phrases as specified by the one or more conditional directives 50 as being associated with the source entity 20. The determination as to whether the communiqué 52 includes the subject heading that include one or more specified words or phrase associated with the source entity 20 may be based on the communiqué aspect data 53, which may indicate the subject heading of the communiqué 52.

Figure 5A:
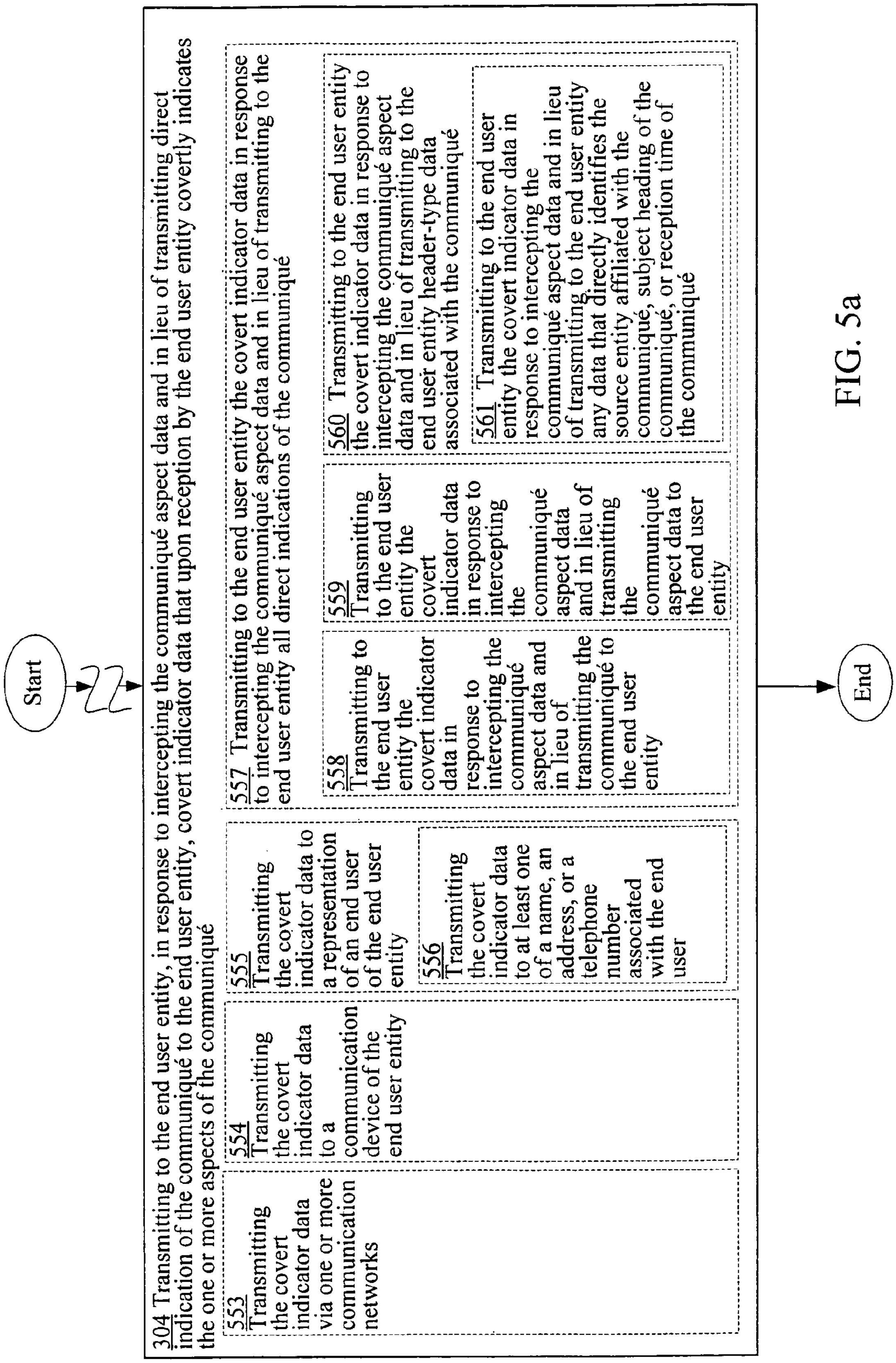
FIG. 5*a* is a high-level logic flowchart of a process depicting alternate implementations of the covert indicator data transmitting operation 304 of FIG. 3.

Referring back to the covert indicator data transmitting operation 304 of FIG. 3, the covert indicator data transmitting operation 304 similar to the communiqué aspect data intercepting operation 302 of FIG. 3 may be executed in a number of different ways in various alternative implementations as illustrated in FIGS. 5*a*, 5*b*, 5*c*, 5*d*, 5*e*, 5*f*, and 5*g*. For example, in some implementations, the covert indicator data transmitting operation 304 of FIG. 3 may further include an operation 553 for transmitting the covert indicator data via one or more communication networks as depicted in FIG. 5*a*. For instance, the covert indicator data transmitting module 104 of the network device 10 of FIG. 1*b* transmitting the covert indicator data 54 via one or more communication networks 40 e.g., WLAN, WMAN, WiMAX, PTSN, VoIP network, cellular network, Client/Server Network, virtual private network, and so forth).

In the same or different implementations, the covert indicator data transmitting operation 304 of FIG. 3 may include an operation 554 for transmitting the covert indicator data to a communication device of the end user entity as further depicted in FIG. 5*a*. For instance, the covert indicator data transmitting module 104 of the network device 10 of FIG. 1*b* transmitting the covert indicator data 54 to a communication device 34 (e.g., a cellular telephone, a PDA, a Smartphone, a computer tablet, a laptop or desktop computer, and so forth) of the end user entity 30.

In the same or different implementations, the covert indicator data transmitting operation 304 may include an operation 555 for transmitting the covert indicator data to a representation of an end user of the end user entity as further depicted in FIG. 5*a*. For instance, the covert indicator data transmitting module 104 of the network device 10 of FIG. 1*b* transmitting the covert indicator data 54 to a representation (e.g., identifier) of an end user 32 of the end user entity 30.

More particularly, operation 555 may, in some cases, include an operation 556 for transmitting the covert indicator data to at least one of a name, an address, or a telephone number associated with the end user as further depicted in FIG. 5*a*. For instance, the covert indicator data transmitting module 104 of the network device 10 of FIG. 1*b* transmitting the covert indicator data 54 to at least one of a name (e.g., username), an address (e.g., email address, IP address, or URL address), or a telephone number associated with the end user 32.

In the same or different implementations, the covert indicator data transmitting operation 304 may include an operation 557 for transmitting to the end user entity the covert indicator data in response to intercepting the communiqué aspect data and in lieu of transmitting to the end user entity all direct indications of the communiqué as further depicted in FIG. 5*a*. For instance, the covert indicator data transmitting module 104 of the network device 10 of FIG. 1*b* transmitting to the end user entity 30 the covert indicator data 54 in response to intercepting the communiqué aspect data 53 and in lieu of transmitting to the end user entity 30 all (e.g., any and all) direct indications of the communiqué 52. Examples of direct indications of the communiqué 52 include, for example, indications that identify the source entity 20 affiliated with the communiqué 52 such as indications in the form of an email address, an IP address, a name, or a telephone number affiliated with the source entity 20, indications that indicate a subject heading for the communiqué 52 if there is one, indications that indicate reception time of the communiqué 52 (e.g., an email or a voice message) such as the point in time when the communiqué 52 was received by the network device 10, and so forth.

As further illustrated in FIG. 5*a*, operation 557 for transmitting the communiqué aspect data in lieu of transmitting direct indication of the communiqué 52 may be executed in a number of different ways. For example, in some implementations, operation 557 may include an operation 558 for transmitting to the end user entity the covert indicator data in response to intercepting the communiqué aspect data and in lieu of transmitting the communiqué to the end user entity as further depicted in FIG. 5*a*. For instance, the covert indicator data transmitting module 104 of the network device 10 of FIG. 1*b* transmitting to the end user entity 30 the covert indicator data 54 in response to intercepting the communiqué aspect data 53 and in lieu of transmitting the communiqué 52 (e.g., an electronic copy of the communiqué 52, which may be a textual message such as an email, an audio message such as a voice message, a video message, or other types of communications) to the end user entity 30.

In the same or different implementations, operation 557 may include an operation 559 for transmitting to the end user entity the covert indicator data in response to intercepting the communiqué aspect data and in lieu of transmitting the communiqué aspect data to the end user entity as depicted in FIG. 5*a*. For instance, the covert indicator data transmitting module 104 of the network device 10 of FIG. 1*b* transmitting to the end user entity 30 the covert indicator data 54 in response to intercepting the communiqué aspect data 53 and in lieu of transmitting the communiqué aspect data 53 to the end user entity 30.

In the same or different implementations, operation 557 may include an operation 560 for transmitting to the end user entity the covert indicator data in response to intercepting the communiqué aspect data and in lieu of transmitting to the end user entity header-type data associated with the communiqué as depicted in FIG. 5*a*. For instance, the covert indicator data transmitting module 104 of the network device 10 of FIG. 1*b* transmitting to the end user entity 30 the covert indicator data 54 in response to intercepting the communiqué aspect data 53 and in lieu of transmitting to the end user entity 30 header-type data (e.g., data that includes header-type information including the telephone number, name, or address of the source for the communiqué 52, subject heading for the communiqué 52 if there is one, reception time, and so forth) associated with the communiqué 52.

In some cases, operation 560 may further include an operation 561 for transmitting to the end user entity the covert indicator data in response to intercepting the communiqué aspect data and in lieu of transmitting to the end user entity any data that directly identifies the source entity affiliated with the communiqué, subject heading of the communiqué, or reception time of the communiqué as further depicted in FIG. 5*a*. For instance, the covert indicator data transmitting module 104 of the network device 10 of FIG. 1*b* transmitting to the end user entity 30 the covert indicator data 54 in response to intercepting the communiqué aspect data 53 and in lieu of transmitting to the end user entity 30 any data that directly identifies the source entity 20 affiliated with the communiqué 52, subject heading of the communiqué 52, or reception time of the communiqué 52.

The covert indicator data 54 that may be transmitted to the end user entity 30 in the covert indicator data transmitting operation 304 of FIG. 3 may take on a wide variety of forms containing a wide variety of content. For example, in some cases, the covert indicator data 54 that is transmitted may merely be a simple "ping" with very little content that prompt the receiving device (e.g., communication device 34) to present, for example, one or more covert indicators to covertly indicate one or more aspects of the communiqué 52. In other cases, however, the covert indicator data 54 may be a bit more complex containing a bit more content. For example, in some cases, the covert indicator data 54 may include one or more locum tenentes (e.g., substitutes or placeholders) for one or more aspects (e.g., email address or telephone number of the source entity 20 affiliated with the communiqué 52, subject heading of the communiqué 52 if there is one, and/or other aspects) of the communiqué 52. The content of the covert indicator data 54 may vary widely since it may be possible for the end user entity 30 (e.g., end user 32) in collaboration with the network device 10 may determine what may be included in the covert indicator data 54.

Figure 5B:
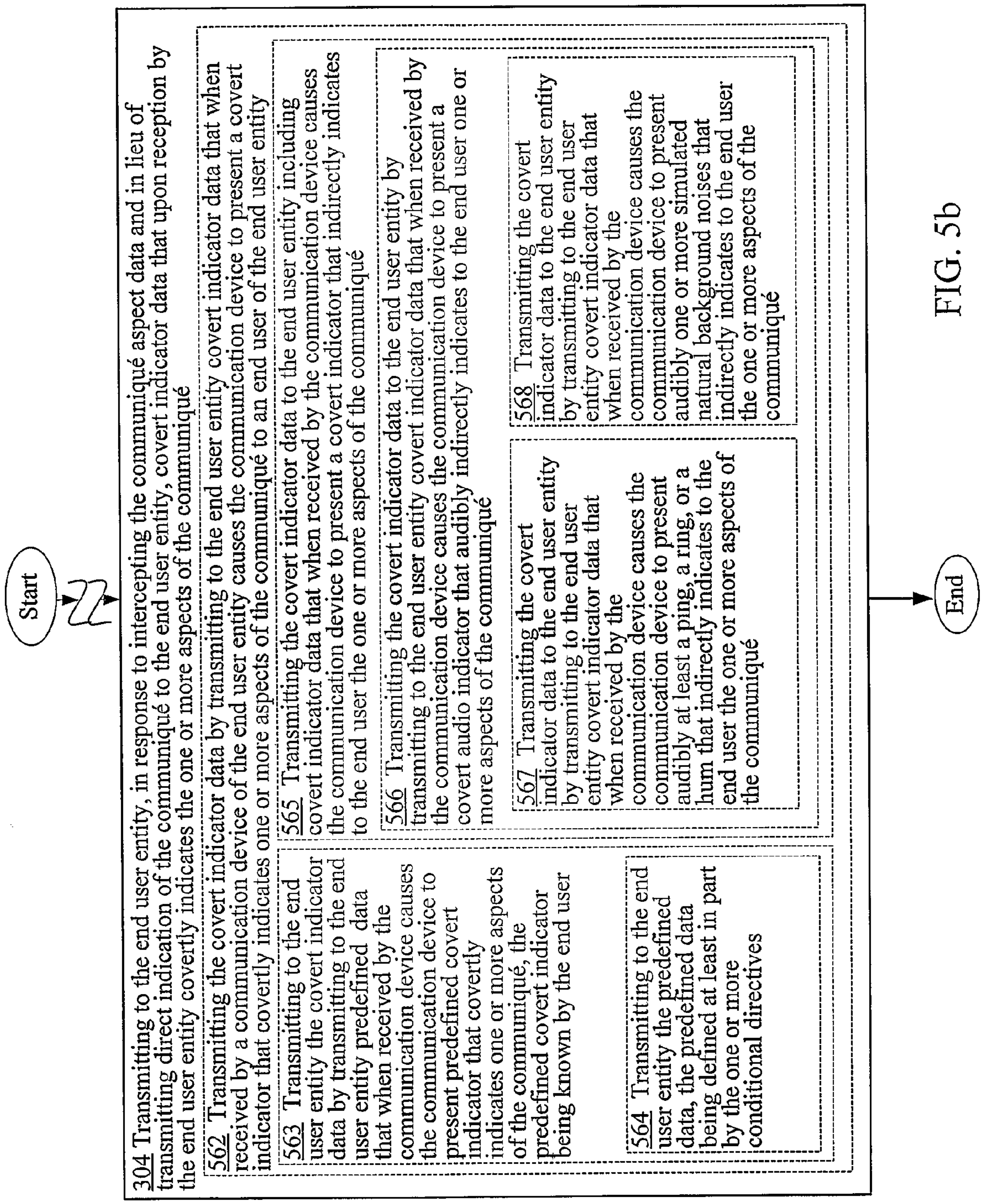
FIG. 5*b* is a high-level logic flowchart of a process depicting alternate implementations of the covert indicator data transmitting operation 304 of FIG. 3.

Thus, in order to define the covert indicator data 54, it may be more relevant to define the covert indicator data 54 by identifying how the end user entity 30 (e.g., communication device 34) responds to receiving the covert indicator data 54 rather than defining the covert indicator data 54 by its content. That is, the actual content of the covert indicator data 54 may not be as important as how the covert indicator data 54 impacts, for example, the communication device 34 of the end user entity 30 once the communication device 34 received the covert indicator data 54. For example, in some implementations, the covert indicator data transmitting operation 304 of FIG. 3 may include an operation 562 for transmitting the covert indicator data by transmitting to the end user entity covert indicator data that when received by a communication device of the end user entity causes the communication device to present a covert indicator that covertly indicates one or more aspects of the communiqué to an end user of the end user entity as depicted in FIG. 5*b*. For instance, the covert indicator data transmitting module 104 of the network device 10 of FIG. 1*b* transmitting the covert indicator data 54 by transmitting to the end user entity 30 covert indicator data 54 that when received by a communication device 34 of the end user entity 30 causes the communication device 34 to present (e.g., visually display and/or audibly indicate) a covert indicator (e.g., indirect indicator) that covertly indicates one or more aspects (e.g., covertly indicating the source entity 20, the subject heading of the communiqué 52 if there is one, the reception time of the communiqué 52, and/or other aspects associated with the communiqué 52) of the communiqué 52 to an end user 32 of the end user entity 30.

As further illustrated in FIG. 5*b*, operation 562 may include one or more additional operations in various alternative implementations. For example, in some implementations, operation 562 may include an operation 563 for transmitting to the end user entity the covert indicator data by transmitting to the end user entity predefined data that when received by the communication device causes the communication device to present predefined covert indicator that covertly indicates one or more aspects of the communiqué, the predefined covert indicator being known by the end user as further depicted in FIG. 5*b*. For instance, the covert indicator data transmitting module 104 of the network device 10 of FIG. 1*b* transmitting to the end user entity 30 the covert indicator data 54 by transmitting to the end user entity 30 predefined data that when received by the communication device 34 causes the communication device 34 to present predefined covert indicator (e.g., an image, a message, a particular font or color, a particular sound, and so forth that has specific meaning to, for example, the end user 32 when the predefined covert indicator is presented through the communication device 34) that covertly indicates one or more aspects of the communiqué 52, the predefined covert indicator being known by the end user 32.

In some cases, operation 563 may further include an operation 564 for transmitting to the end user entity the predefined data, the predefined data being defined at least in part by the one or more conditional directives as further depicted in FIG. 5*b*. For instance, the covert indicator data transmitting module 104 of the network device 10 of FIG. 1*b* transmitting to the end user entity 30 the predefined data, the predefined data, which may merely be a "ping" or may be data that includes more content, being defined at least in part by the one or more conditional directives 50.

As further illustrated in FIG. 5*b*, operation 562 in various implementations may include an operation 565 for transmitting the covert indicator data to the end user entity including covert indicator data that when received by the communication device causes the communication device to present a covert indicator that indirectly indicates to the end user the one or more aspects of the communiqué. For instance, the covert indicator data transmitting module 104 of the network device 10 of FIG. 1*b* transmitting the covert indicator data 54 to the end user entity 30 including covert indicator data 54 that when received by the communication device 34 causes the communication device 34 to present (e.g., visually display, audibly indicate, and/or via a vibration) a covert indicator that indirectly indicates to the end user 32 the one or more aspects of the communiqué 52 (e.g., indicate subtly the one or more aspects of the communiqué 52 to the end user 32 without explicitly identifying or indicating the one or more aspects).

Operation 565, in turn, may further include an operation 566 for transmitting the covert indicator data to the end user entity by transmitting to the end user entity covert indicator data that when received by the communication device causes the communication device to present a covert audio indicator that audibly indirectly indicates to the end user one or more aspects of the communiqué as further depicted in FIG. 5*b*. For instance, the,covert indicator data transmitting module 104 of the network device 10 of FIG. 1*b* transmitting the covert indicator data 54 to the end user entity 30 by transmitting to the end user entity 30 covert indicator data 54 that when received by the communication device 34 causes the communication device 34 to present a covert audio indicator that audibly indirectly indicates to the end user 32 one more aspects (e.g., reception of) of the communiqué 52.

In some implementations, operation 566 may include an operation 567 for transmitting the covert indicator data to the end user entity by transmitting to the end user entity covert indicator data that when received by the communication device causes the communication device to present audibly at least a ping, a ring, or a hum that indirectly indicates to the end user the one or more aspects of the communiqué as further depicted in FIG. 5*b*. For instance, the covert indicator data transmitting module 104 of the network device 10 of FIG. 1*b* transmitting the covert indicator data 54 to the end user entity 30 by transmitting to the end user entity 30 covert indicator data 54 that when received by the communication device 34 causes the communication device 34 to present audibly at least a ping, a ring, or a hum that indirectly indicates to the end user 32 the one or more aspects of the communiqué 52 (e.g., indicate the reception of the communiqué 52 or the affiliation of the communiqué 52 with the source entity 20).

In the same or different implementations, operation 566 may include an operation 568 for transmitting the covert indicator data to the end user entity by. , transmitting to the end user entity covert indicator data that when received by the communication device causes the communication device to present audioally audibly one or more simulated natural background noises that indirectly indicates to the end user the one or more aspects of the communiqué as further depicted in FIG. 5*b*. For instance, the covert indicator data transmitting module 104 of the network device 10 of FIG. 1*b* transmitting the covert indicator data 54 to the end user entity 30 by transmitting to the end user entity 30 covert indicator data 54 that when received by the communication device 34 causes the communication device 34 to present audioally audibly one or more simulated natural background noises (e.g., noise of a passing truck or a dog barking) that indirectly indicates to the end user 32 the one or more aspects of the communiqué 52 (e.g., indicate reception of the communiqué 52 from, for example, the source entity 20).

Figure 5C:
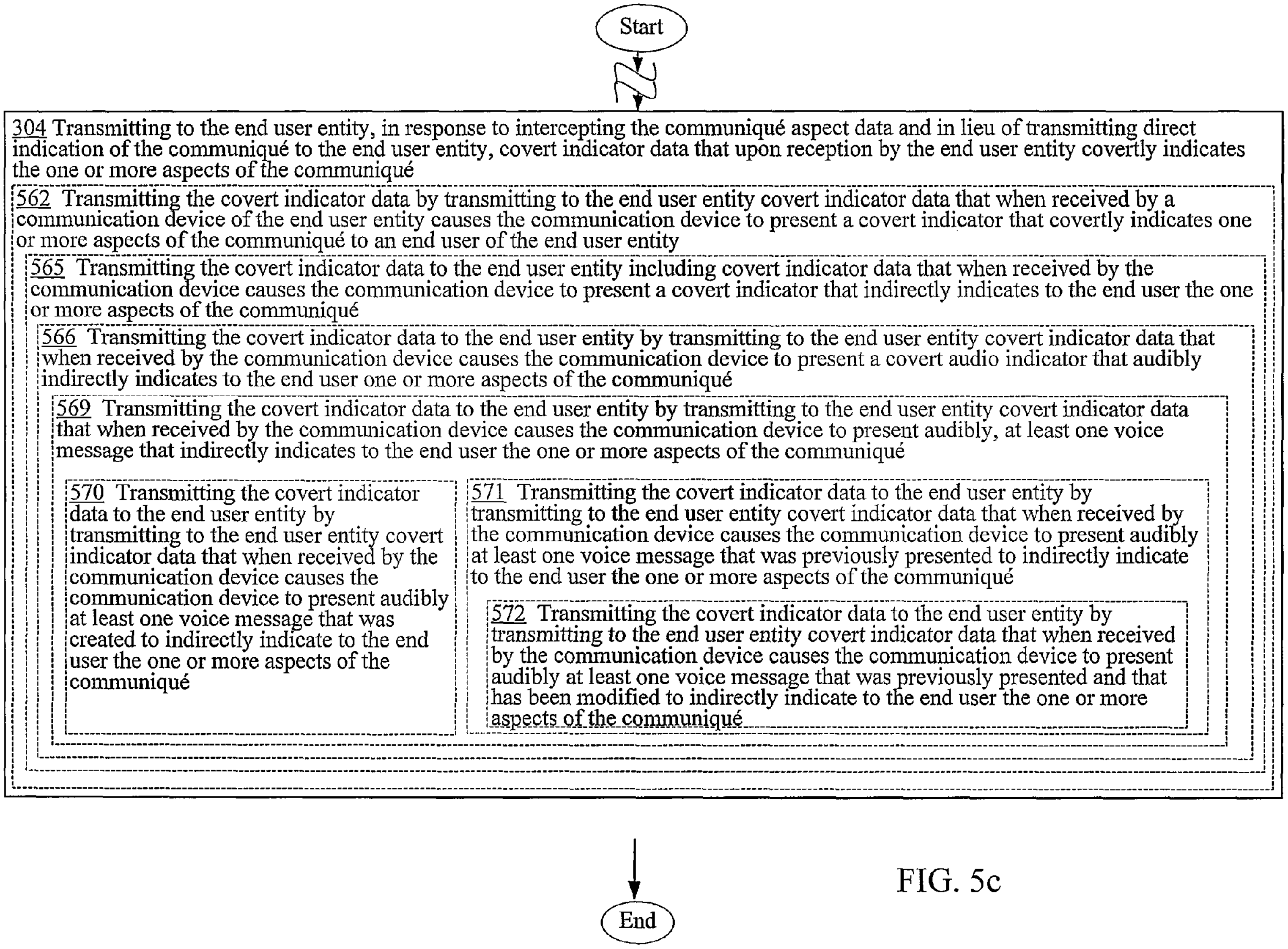
FIG. 5*c* is a high-level logic flowchart of a process depicting alternate implementations of the covert indicator data transmitting operation 304 of FIG. 3.

Turning now to FIG. 5*c*, in various implementations, operation 566 for transmitting to the end user entity the covert indicator data that when received by the communication device causes the communication device to present a covert audio indicator that audibly indirectly indicates to the end user one or more aspects of the communiqué may include an operation 569 for transmitting the covert indicator data to the end user entity by transmitting to the end user entity covert indicator data that when received by the communication device causes the communication device to present audibly, at least one voice message that indirectly indicates to the end user the one or more aspects of the communiqué . For instance, the covert indicator data transmitting module 104 of the network device 10 of FIG. 1*b* transmitting the covert indicator data 54 to the end user entity 30 by transmitting to the end user entity 30 covert indicator data 54 that when received by the communication device 34 causes the communication device 34 to present audibly, at least one voice message (e.g., may be a previously received voice message that may be unrelated to the communiqué 52 or a voice message that was created to indirectly indicate the one or more aspects of the communiqué 52) that indirectly indicates to the end user 32 the one or more aspects of the communiqué 52.

In some cases, operation 569 may include an operation 570 for transmitting the covert indicator data to the end user entity by transmitting to the end user entity covert indicator data that when received by the communication device causes the communication device to present audibly at least one voice message that was created to indirectly indicate to the end user the one or more aspects of the communiqué as further depicted in FIG. 5*c*. For instance, the covert indicator data transmitting module 104 of the network device 10 of FIG. 1*b* transmitting the covert indicator data 54 to the end user entity 30 by transmitting to the end user entity 30 covert indicator data 54 that when received by the communication device 34 causes the communication device 34 to present audibly at least one voice message that was created (e.g., created in accordance with the one or more conditional directives 50) to indirectly indicate to the end user 32 the one or more aspects of the communiqué 52.

In the same or different implementations, operation 569 may include an operation 571 for transmitting the covert indicator data to the end user entity by transmitting to the end user entity covert indicator data that when received by the communication device causes the communication device to present audibly at least one voice message that was previously presented to indirectly indicate to the end user the one or more aspects of the communiqué as further depicted in FIG. 5*c*. For instance, the covert indicator data transmitting module 104 of the network device 10 of FIG. 1*b* transmitting the covert indicator data 54 to the end user entity 30 by transmitting to the end user entity 30 covert indicator data 54 that when received by the communication device 34 causes the communication device 34 to present audibly at least one voice message that was previously presented to indirectly indicate to the end user 32 the one or more aspects of the communiqué 52.

In some cases, operation 571 may further include an operation 572 for transmitting the covert indicator data to the end user entity by transmitting to the end user entity covert indicator data that when received by the communication device causes the communication device to present audibly at least one voice message that was previously presented and that has been modified to indirectly indicate to the end user the one or more aspects of the communiqué as depicted in FIG. 5*c*. For instance, the covert indicator data transmitting module 104 of the network device 10 of FIG. 1*b* transmitting the covert indicator data 54 to the end user entity 30 by transmitting to the end user entity 30 covert indicator data 54 that when received by the communication device 34 causes the communication device 34 to present audibly at least one voice message that was previously presented (e.g., a previously presented audio communiqué 52 from a third party unrelated to the source entity 20) and that has been modified (e.g., modified tone) to indirectly indicate to the end user 32 the one or more aspects of the communiqué 52.

Figure 5D:
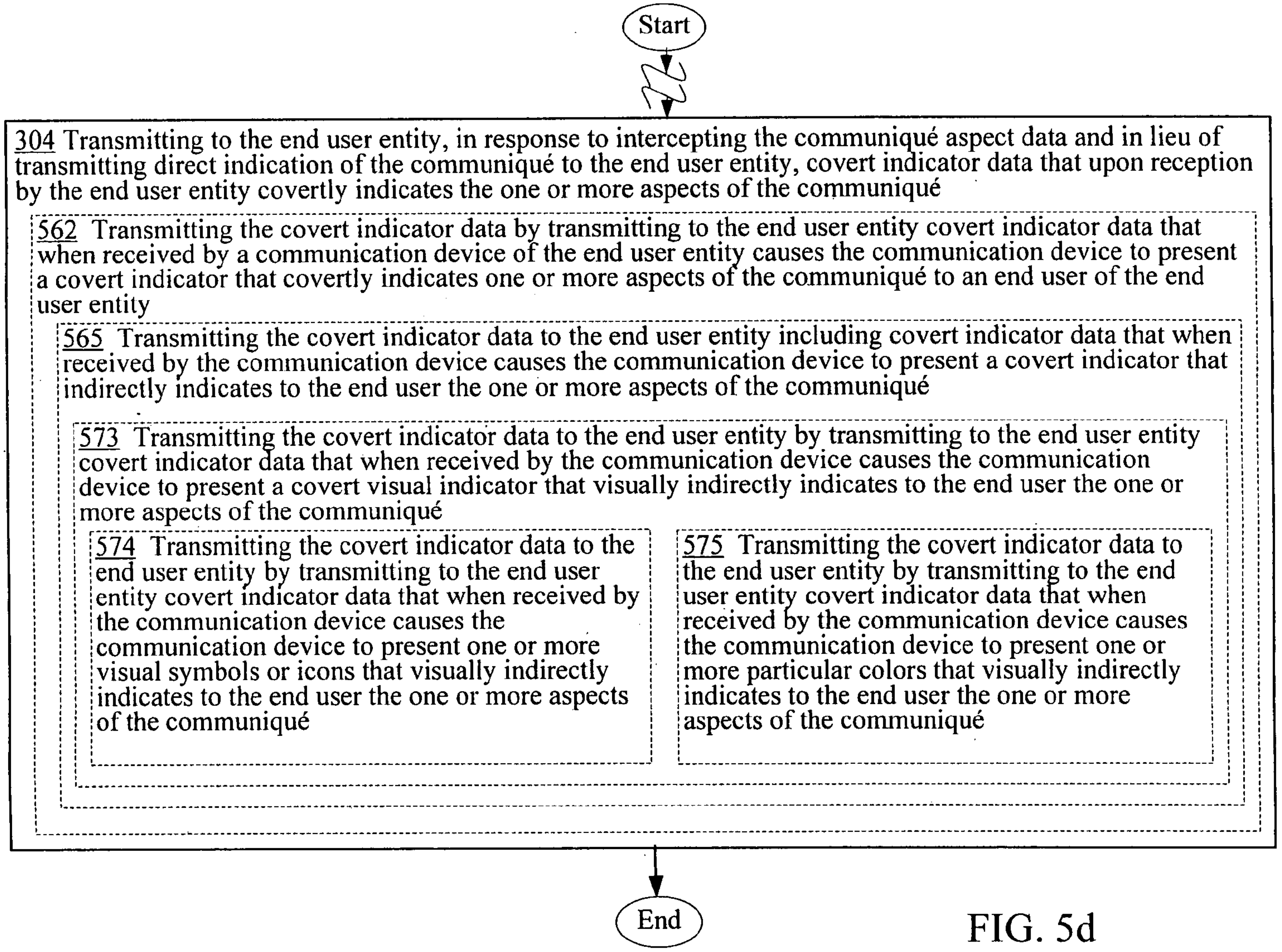
FIG. 5*d* is a high-level logic flowchart of a process depicting alternate implementations of the covert indicator data transmitting operation 304 of FIG. 3.

Turning now to FIG. 5*d*, in various implementations, operation 565 for transmitting the covert indicator data to the end user entity including covert indicator data that when received by the communication device causes the communication device to present a covert indicator that indirectly indicates to the end user the one or more aspects of the communiqué may include an operation 573 for transmitting the covert indicator data to the end user entity by transmitting to the end user entity covert indicator data that when received by the communication device causes the communication device to present a covert visual indicator that visually indirectly indicates to the end user the one or more aspects of the communiqué. For instance, the covert indicator data transmitting module 104 of the network device 10 of FIG. 1*b* transmitting the covert indicator data 54 to the end user entity 30 by transmitting to the end user entity 30 covert indicator data 54 that when received by the communication device 34 causes the communication device 34 to present a covert visual indicator that visually indirectly indicates (e.g., indirectly indicates via a communiqué application interface such as an email application interface or an operating system interface) to the end user 32 the one or more aspects of the communiqué 52.

In some implementations, operation 573 may further include an operation 574 for transmitting the covert indicator data to the end user entity by transmitting to the end user entity covert indicator data that when received by the communication device causes the communication device to present one or more visual symbols or icons that visually indirectly indicates to the end user the one or more aspects of the communiqué as further depicted in FIG. 5*d*. For instance, the covert indicator data transmitting module 104 of the network device 10 of FIG. 1*b* transmitting the covert indicator data 54 to the end user entity 30 by transmitting to the end user entity 30 covert indicator data 54 that when received by the communication device 34 causes the communication device 34 to present one or more visual symbols or icons that visually indirectly indicates to the end user 32 the one or more aspects of the communiqué 52.

In the same or different implementations, operation 573 may include an operation 575 for transmitting the covert indicator data to the end user entity by transmitting to the end user entity covert indicator data that when received by the communication device causes the communication device to present one or more particular colors that visually indirectly indicates to the end user the one or more aspects of the communiqué as further depicted in FIG. 5*d*. For instance, the covert indicator data transmitting module 104 of the network device 10 of FIG. 1*b* transmitting the covert indicator data 54 to the end user entity 30 by transmitting to the end user entity 30 covert indicator data 54 that when received by the communication device 34 causes the communication device 34 to present one or more particular colors (e.g., presenting a particular icon or image in a particular color) that visually indirectly indicates to the end user 32 the one or more aspects of the communiqué 52.

Figure 5E:
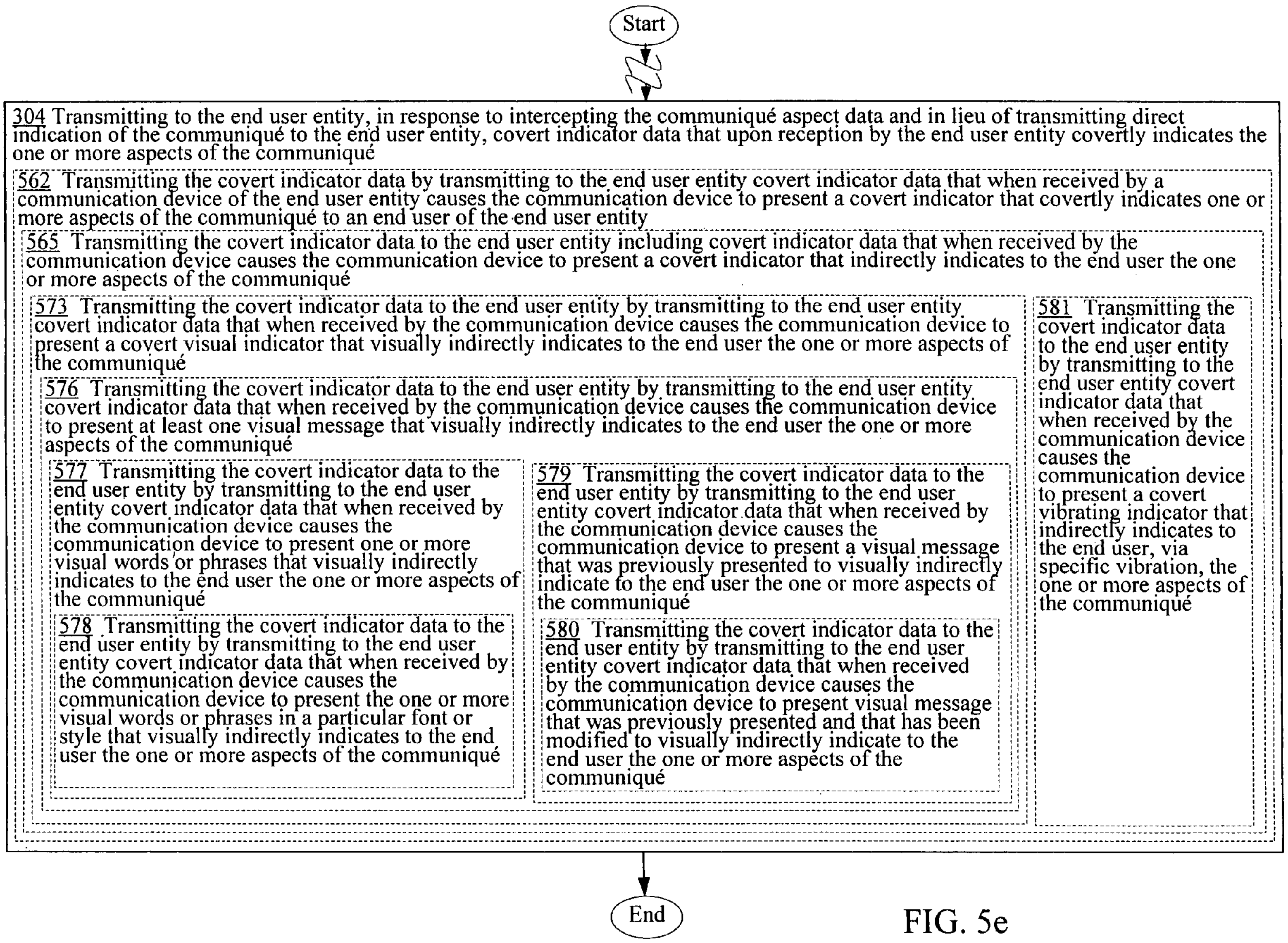
FIG. 5*e* is a high-level logic flowchart of a process depicting alternate implementations of the covert indicator data transmitting operation 304 of FIG. 3.

In the same or different implementations, operation 573 may include an operation 576 for transmitting the covert indicator data to the end user entity by transmitting to the end user entity covert indicator data that when received by the communication device causes the communication device to present at least one visual message that visually indirectly indicates to the end user the one or more aspects of the communiqué as depicted in FIG. 5*e*. For instance, the covert indicator data transmitting module 104 of the network device 10 of FIG. 1*b* transmitting the covert indicator data 54 to the end user entity 30 by transmitting to the end user entity 30 covert indicator data 54 that when received by the communication device 34 causes the communication device 34 to present at least one visual message (e.g., a textual message) that visually indirectly indicates to the end user 32 the one or more aspects of the communiqué 52.

As depicted in FIG. 5*e*, operation 576 may include one or more additional operations including an operation 577 for transmitting the covert indicator data to the end user entity by transmitting to the end user entity covert indicator data that when received by the communication device causes the communication device to present one or more visual words or phrases that visually indirectly indicates to the end user the one or more aspects of the communiqué. For instance, the covert indicator data transmitting module 104 of the network device 10 of FIG. 1*b* transmitting the covert indicator data 54 to the end user entity 30 by transmitting to the end user entity 30 covert indicator data 54 that when received by the communication device 34 causes the communication device 34 to present one or more visual words or phrases (e.g., one or more words or phrases that when presented to the end user 32 is recognized by the end user 32 as having a certain meaning) that visually indirectly indicates to the end user 32 the one or more aspects of the communiqué 52 (e.g., visually indirectly indicating that a communiqué 52 affiliated with the source entity 20 has been received).

In some implementations, operation 577 may further include an operation 578 for transmitting the covert indicator data to the end user entity by transmitting to the end user entity covert indicator data that when received by the communication device causes the communication device to present the one or more visual words or phrases in a particular font or style that visually indirectly indicates to the end user the one or more aspects of the communiqué as further depicted in FIG. 5*e*. For instance, the covert indicator data transmitting module 104 of the network device 10 of FIG. 1*b* transmitting the covert indicator data 54 to the end user entity 30 by transmitting to the end user entity 30 covert indicator data 54 that when received by the communication device 34 causes the communication device 34 to present the one or more visual words or phrases in a particular font or style that visually indirectly indicates to the end user 32 the one or more aspects of the communiqué 52.

In some cases, the operation 576 for transmitting the covert indicator data that when received by the communication device causes the communication device to present one or more visual words or phrases that visually indirectly indicates to the end user the one or more aspects of the communiqué may include an operation 579 for transmitting the covert indicator data to the end user entity by transmitting to the end user entity covert indicator data that when received by the communication device causes the communication device to present a visual message that was previously presented to visually indirectly indicate to the end user the one or more aspects of the communiqué as further depicted in FIG. 5*e*. For instance, the covert indicator data transmitting module 104 of the network device 10 of FIG. 1*b* transmitting the covert indicator data 54 to the end user entity 30 by transmitting to the end user entity 30 covert indicator data 54 that when received by the communication device 34 causes the communication device 34 to present a visual message (e.g., visual textual message) that was previously presented to visually indirectly indicate to the end user 32 the one or more aspects of the communiqué 52.

In some cases, operation 579 may further include an operation 580 for transmitting the covert indicator data to the end user entity by transmitting to the end user entity covert indicator data that when received by the communication device causes the communication device to present visual message that was previously presented and that has been modified to visually indirectly indicate to the end user the one or more aspects of the communiqué as further depicted in FIG. 5*e*. For instance, the covert indicator data transmitting module 104 of the network device 10 of FIG. 1*b* transmitting the covert indicator data 54 to the end user entity 30 by transmitting to the end user entity 30 covert indicator data 54 that when received by the communication device 34 causes the communication device 34 to present visual message that was previously presented (e.g., a previously received email or telephone message) and that has been modified to visually indirectly indicate to the end user 32 the one or more aspects of the communiqué 52.

As further illustrated in FIG. 5*e*, in various implementations, the operation 565 for transmitting the covert indicator data that when received by the communication device causes the communication device to present a covert indicator that indirectly indicates to the end user the one or more aspects of the communiqué may include an operation 581 for transmitting the covert indicator data to the end user entity by transmitting to the end user entity covert indicator data that when received by the communication device causes the communication device to present a covert vibrating indicator that indirectly indicates to the end user, via specific vibration, the one or more aspects of the communiqué. For instance, the covert indicator data transmitting module 104 of the network device 10 of FIG. 1*b* transmitting the covert indicator data 54 to the end user entity 30 by transmitting to the end user entity 30 covert indicator data 54 that when received by the communication device 34 causes the communication device 34 to present a covert vibrating indicator (e.g., generating a particular vibration having a particular vibration pattern) that indirectly indicates to the end user 32, via specific vibration, the one or more aspects of the communiqué 52.

Figure 5F:
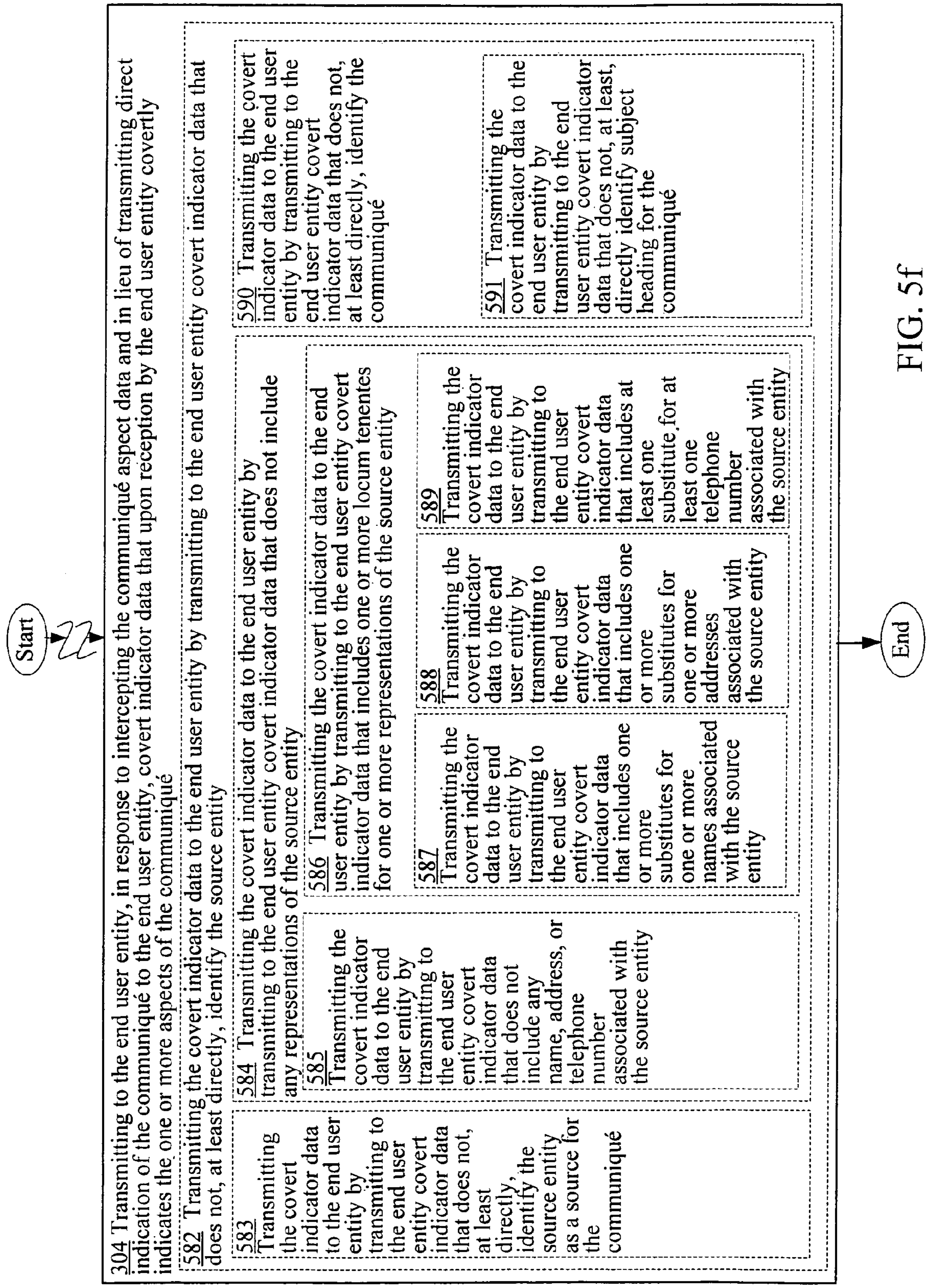
FIG. 5*f* is a high-level logic flowchart of a process depicting alternate implementations of the covert indicator data transmitting operation 304 of FIG. 3.

Referring now to FIG. 5*f*, the covert indicator data transmitting operation 304 of FIG. 3 may include an operation 582 for transmitting the covert indicator data to the end user entity by transmitting to the end user entity covert indicator data that does not, at least directly, identify the source entity in various alternative implementations. For instance, the covert indicator data transmitting module 104 of the network device 10 of FIG. 1*b* transmitting the covert indicator data 54 to the end user entity 30 by transmitting to the end user entity 30 covert indicator data 54 that does not, at least directly, identify the source entity 20. In other words, transmitting covert indicator data 54 that does include any data that identifies at least the relationship between the source entity 20 and the communiqué 52.

For example, in some implementations, operation 582 may include an operation 583 for transmitting the covert indicator data to the end user entity by transmitting to the end user entity covert indicator data that does not, at least directly, identify the source entity as a source for the communiqué as further depicted in FIG. 5*f*. For instance, the covert indicator data transmitting module 104 of the network device 10 of FIG. 1*b* transmitting the covert indicator data 54 to the end user entity 30 by transmitting to the end user entity 30 covert indicator data 54 that does not, at least directly, identify the source entity 20 as a source for the communiqué 52 (e.g., identify the source entity 20 as the sender or caller of the communiqué 52).

In the same or different implementations, operation 582 may include an operation 584 for transmitting the covert indicator data to the end user entity by transmitting to the end user entity covert indicator data that does not include any representations of the source entity as further depicted in FIG. 5*f*. For instance, the covert indicator data transmitting module 104 of the network device 10 of FIG. 1*b* transmitting the covert indicator data 54 to the end user entity 30 by transmitting to the end user entity 30 covert indicator data 54 that does not include any representations (e.g., identifiers) of the source entity 20.

In various implementations, operation 584 may further include an operation 585 for transmitting the covert indicator data to the end user entity by transmitting to the end user entity covert indicator data that does not include any name, address, or telephone number associated with the source entity as further depicted in FIG. 5*f*. For instance, the covert indicator data transmitting module 104 of the network device 10 of FIG. 1*b* transmitting the covert indicator data 54 to the end user entity 30 by transmitting to the end user entity 30 covert indicator data 54 that does not include any name (e.g., username, business name, website name, and so forth), address (e.g., email address, IP address, URL, and so forth), or telephone number associated with the source entity 20.

In the same or different implementations, operation 584 may include an operation 586 for transmitting the covert indicator data to the end user entity by transmitting to the end user entity covert indicator data that includes one or more locum tenentes for one or more representations of the source entity as depicted in FIG. 5*f*. For instance, the covert indicator data transmitting module 104 including the locum tenens included covert indicator data transmitting module 240 (see FIG. 2*c*) of the network device 10 of FIG. 1*b* transmitting the covert indicator data 54 to the end user entity 30 by having the locum tenens included covert indicator data transmitting module 240 transmit to the end user entity 30 covert indicator data 54 that includes one or more locum tenentes (e.g., substitutes or placeholders) for one or more representations (e.g., addresses, telephone numbers, names, etc.) of the source entity 20. In other words to transmit covert indicator data 54 to the end user entity 30 that includes one or more (fictional or non-fictional) substitute names, (fictional or non-fictional) substitute addresses, and/or (fictional or non-fictional) substitute telephone numbers for one or more actual names, addresses, and/or telephone numbers associated with the source entity 20 that may have been included in, for example, the communiqué aspect data 53.

As further illustrated in FIG. 5*f*, operation 586 may further include, in some implementations, an operation 587 for transmitting the covert indicator data to the end user entity by transmitting to the end user entity covert indicator data that includes one or more substitutes for one or more names associated with the source entity. For instance, the covert indicator data transmitting module 104 including the substitute included covert indicator data transmitting module 241 (see FIG. 2*c*) of the network device 10 of FIG. 1*b* transmitting the covert indicator data 54 to the end user entity 30 by having the substitute included covert indicator data transmitting module 241 transmit to the end user entity 30 covert indicator data 54 that includes one or more substitutes (e.g., substitute names or other types of substitutes to covertly represent the source entity 20) for one or more names associated with the source entity 20.

In the same or different implementations, operation 586 may include an operation 588 for transmitting the covert indicator data to the end user entity by transmitting to the end user entity covert indicator data that includes one or more substitutes for one or more addresses associated with the source entity as depicted in FIG. 5*f*. For instance, the covert indicator data transmitting module 104 including the substitute included covert indicator data transmitting module 241 (see FIG. 2*c*) of the network device 10 of FIG. 1*b* transmitting the covert indicator data 54 to the end user entity 30 by having the substitute included covert indicator data transmitting module 241 transmit to the end user entity 30 covert indicator data 54 that includes one or more substitutes (e.g. substitute addresses or other types of substitute to covertly represent the source entity 20) for one or more addresses (e.g., email address, IP address, URL, and so forth) associated with the source entity 20.

In the same or different implementations, operation 586 may include an operation 589 for transmitting the covert indicator data to the end user entity by transmitting to the end user entity covert indicator data that includes at least one substitute for at least one telephone number associated with the source entity as depicted in FIG. 5*f*. For instance, the covert indicator data transmitting module 104 including the substitute included covert indicator data transmitting module 241 (see FIG. 2*c*) of the network device 10 of FIG. 1*b* transmitting the covert indicator data 54 to the end user entity 30 by having the substitute included covert indicator data transmitting module 241 transmit to the end user entity 30 covert indicator data 54 that includes at least one substitute (e.g., a substitute telephone number or some other substitute to covertly represent the source entity 20) for at least one telephone number associated with the source entity 20.

As illustrated in FIG. 5*f*, operation 582 for transmitting the covert indicator data that does not, at least directly, identify the source entity may include, in various implementations, an operation 590 for transmitting the covert indicator data to the end user entity by transmitting to the end user entity covert indicator data that does not, at least directly, identify the communiqué. For instance, the covert indicator data transmitting module 104 of the network device 10 of FIG. 1*b* transmitting the covert indicator data 54 to the end user entity 30 by transmitting to the end user entity 30 covert indicator data 54 that does not, at least directly, identify the communiqué 52.

In some implementations, operation 590 may include an operation 591 for transmitting the covert indicator data to the end user entity by transmitting to the end user entity covert indicator data that does not, at least, directly identify subject heading for the communiqué as further depicted in FIG. 5*f*. For instance, the covert indicator data transmitting module 104 of the network device 10 of FIG. 1*b* transmitting the covert indicator data 54 to the end user entity 30 by transmitting to the end user entity 30 covert indicator data 54 that does not, at least, directly identify (e.g., indicate) subject heading for the communiqué 52 (e.g., email).

Figure 5G:
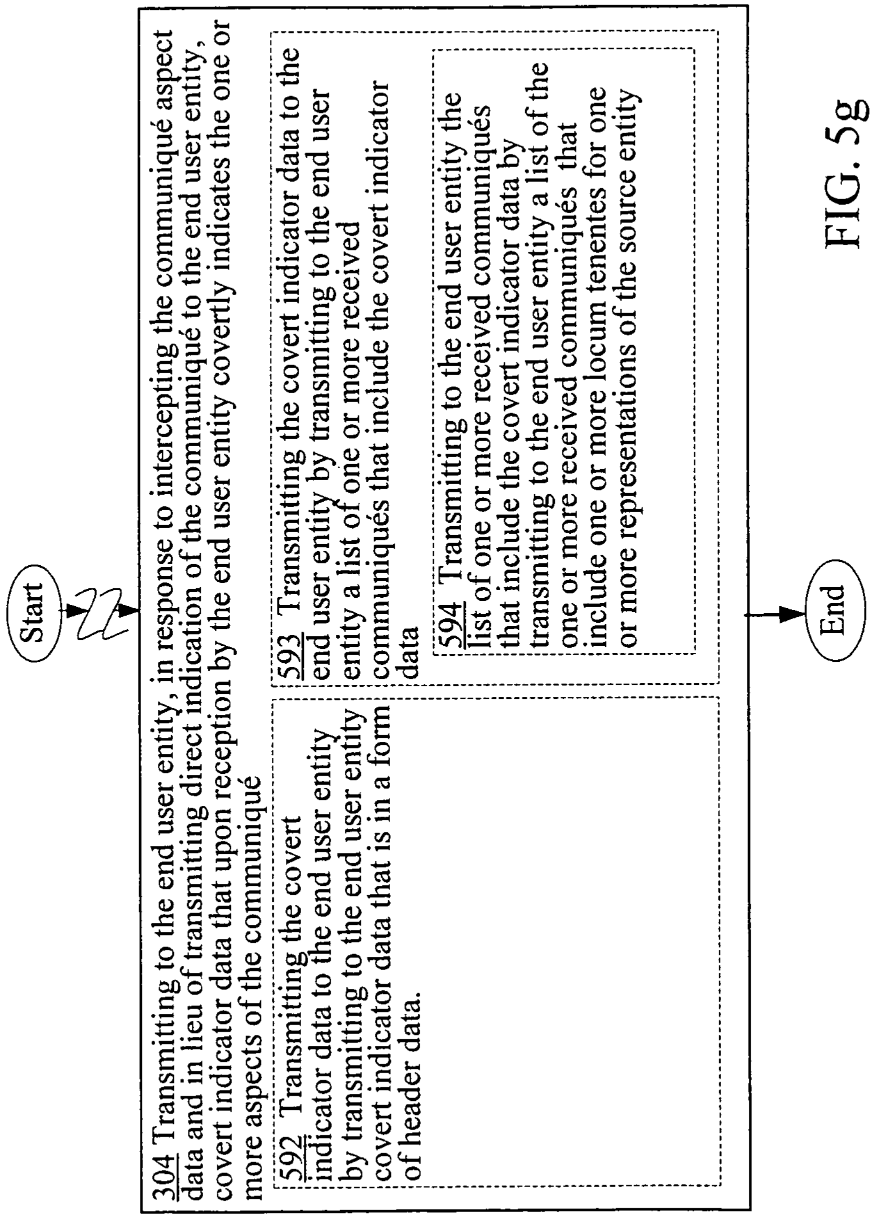
FIG. 5*g* is a high-level logic flowchart of a process depicting alternate implementations of the covert indicator data transmitting operation 304 of FIG. 3.

Turning now to FIG. 5*g*, in various implementations, the covert indicator data transmitting operation 304 of FIG. 3 may include an operation 592 for transmitting the covert indicator data to the end user entity by transmitting to the end user entity covert indicator data that is in a form of header data as further depicted in FIG. 5*g*. For instance, the covert indicator data transmitting module 104 of the network device 10 of FIG. 1*b* transmitting the covert indicator data 54 to the end user entity 30 by transmitting to the end user entity 30 covert indicator data 54 that is in a form of header data.

In the same or different implementations, the covert indicator data transmitting operation 304 of FIG. 3 may include an operation 593 for transmitting the covert indicator data to the end user entity by transmitting to the end user entity a list of one or more received communiqués that include the covert indicator data as further depicted in FIG. 5*g*. For instance, the covert indicator data transmitting module 104 including the received communiqué list transmitting module 242 (see FIG. 2*c*) of the network device 10 of FIG. 1*b* transmitting the covert indicator data 54 to the end user entity 30 by having the received communiqué list transmitting module 242 transmit to the end user entity 30 a list of one or more received communiqués 52 (e.g., emails) that include the covert indicator data 54. For example, transmitting a listing of received emails that include at least one listing of a fictional email (e.g., covert indicator data 54) to covertly indicate reception of the communiqué 52.

In some cases, operation 593 may further include an operation 594 for transmitting to the end user entity the list of one or more received communiqués that include the covert indicator data by transmitting to the end user entity a list of the one or more received communiqués that include one or more locum tenentes for one or more representations of the source entity as further depicted in FIG. 5*g*. For instance, the covert indicator data transmitting module 104 including the received communiqué list transmitting module 242 of the network device 10 of FIG. 1*b* transmitting to the end user entity 30 the list of one or more received communiqués 52 that include the covert indicator data 54 by having the received communiqué list transmitting module 242, transmit to the end user entity 30 a list of the one or more received communiqués 52 that include one or more locum tenentes (e.g., substitutes or placeholders) for one or more representations (e.g., identifiers such as an address, a name, a telephone number, or other types of identifiers) of the source entity 20.

Figure 6:
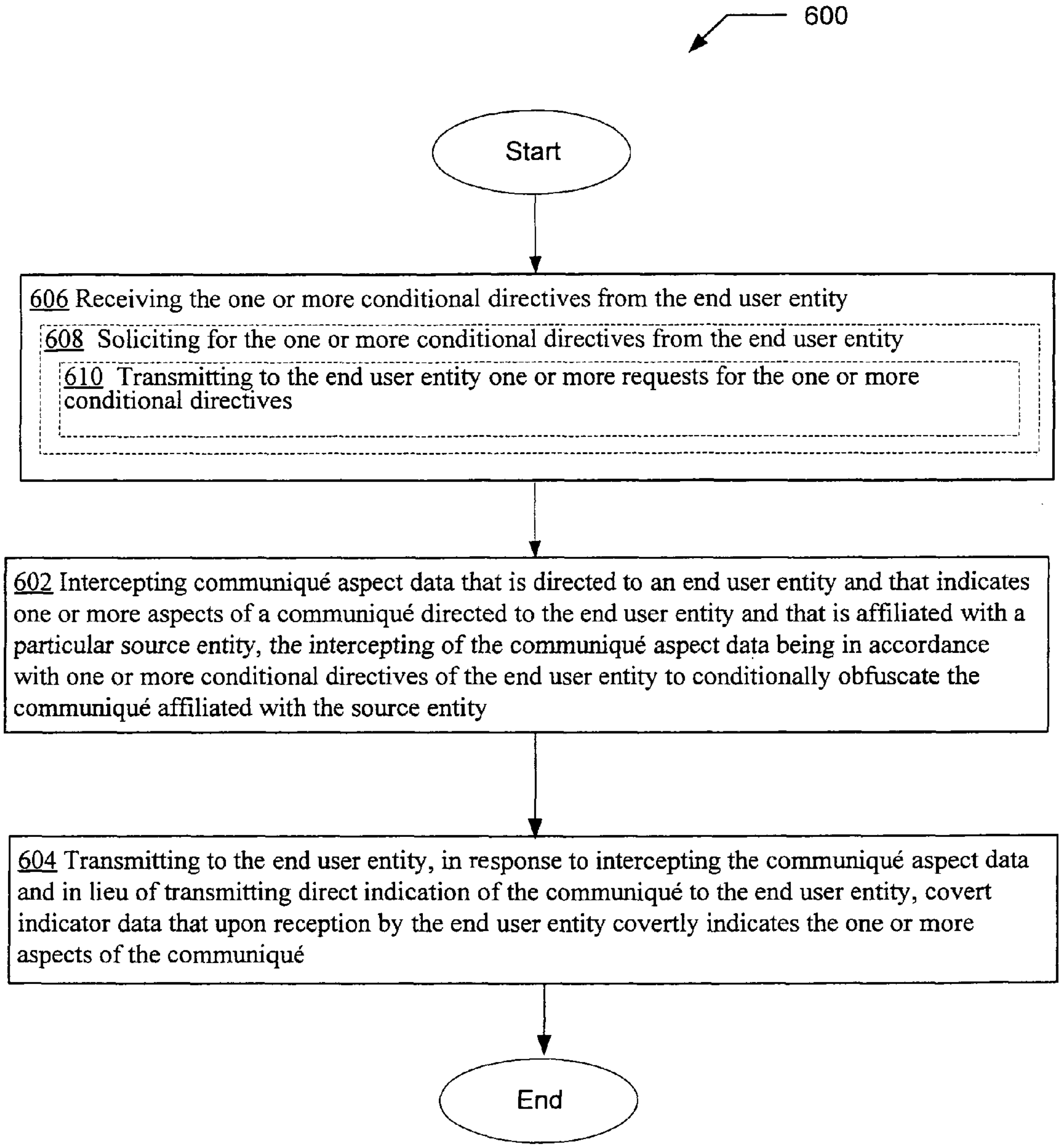
FIG. 6 is another high-level logic flowchart of another process.

Referring to FIG. 6 illustrating another operational flow 600 in accordance with various embodiments. Operational flow 600 includes certain operations that mirror the operations included in operational flow 300 of FIG. 3. These operations include a communiqué aspect data intercepting operation 602 and a covert indicator data transmitting operation 604 that corresponds to and mirror the communiqué aspect data intercepting operation 302 and the covert indicator data transmitting operation 304, respectively, of FIG. 3.

In addition, operational flow 600 may include a conditional directive receiving operation 606 for receiving the one or more conditional directives from the end user entity as depicted in FIG. 6. For instance, the conditional directive receiving module 101 of the network device 10 of FIG. 1*b* receiving the one or more conditional directives 50 from the end user entity 30.

In some implementations, the conditional directive receiving operation 606 may further include an operation 608 for soliciting for the one or more conditional directives from the end user entity as further depicted in FIG. 6. For instance, the conditional directive soliciting module 105 of the network device 10 of FIG. 1*b* soliciting for the one or more conditional directives 50 from the end user entity 30 (e.g., solicit the one or more conditional directives 50 from an end user 32 of the end user entity 30).

Operation 608, in turn, may further include, in various implementations, an operation 610 for transmitting to the end user entity one or more requests for the one or more conditional directives as depicted in FIG. 6. For instance, the conditional directive request transmitting module 106 of the network device 10 transmitting (e.g., via one or more communication networks 40) to the end user entity 30 one or more requests for the one or more conditional directives 50.

Figure 7:
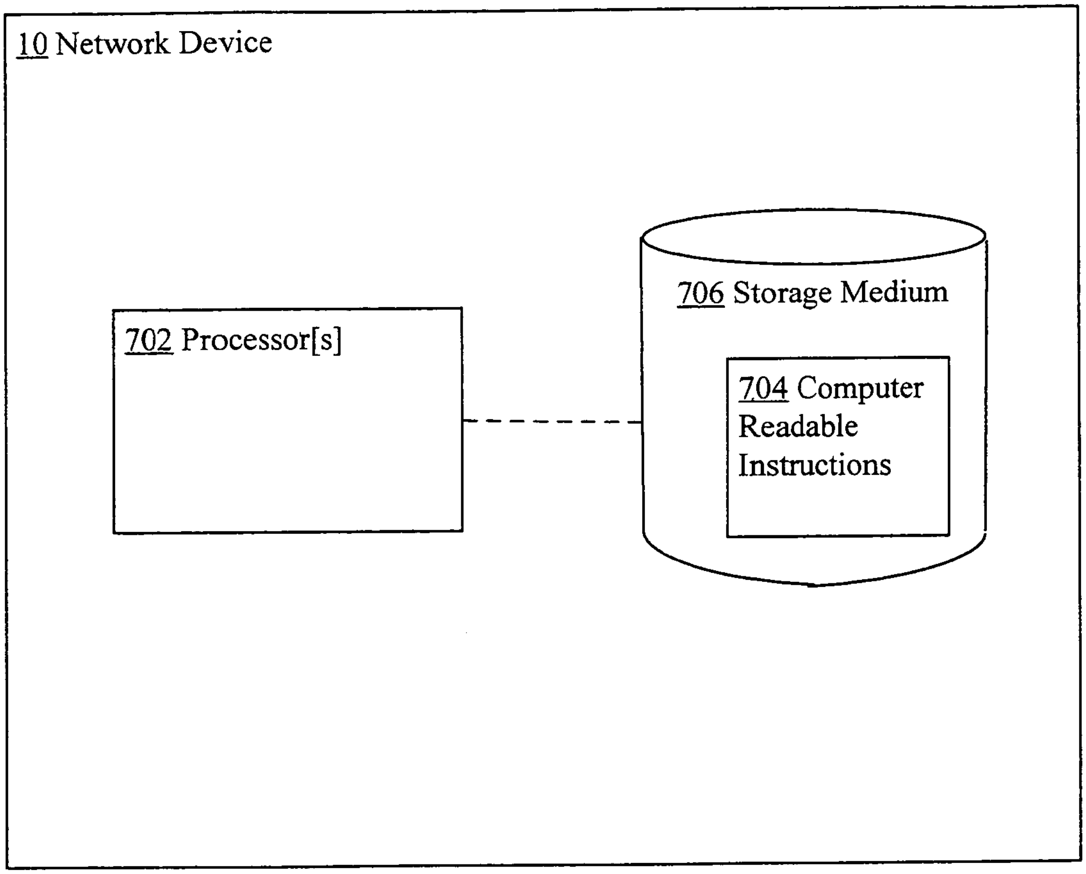
FIG. 7 is another high-level block diagram showing another implementation of the network device 10 of FIG. 1*b*.

Turning now to FIG. 7, which is a high-level block diagram illustrating a particular implementation of the network device 10 of FIG. 1*b*. As illustrated, the network device 10, which may comprise of one or more servers in some embodiments, may include one or more processors 702 (e.g., one or more microprocessors, one or more controllers, and so forth) linked to storage medium 706 (e.g., volatile and/or non-volatile memory). The storage medium 706 may store computer readable instructions 704 (e.g., computer program product). The one or more processors 702, in various implementations, may execute the computer readable instructions 704 in order to execute one or more operations described above and as illustrated in, for example, FIGS. 3, 4*a*, 4*b*, 4*c*, 4*d*, 4*e*, 4*f*, 4*g*, 5*a*, 5*b*, 5*c*, 5*d*, 5*e*, 5*f*, and 5*g*. From another perspective, FIG. 7 illustrates one implementation of the network device 10 in which the communiqué aspect data intercepting module 102, the covert indicator data transmitting module 104, and their sub-modules (e.g., as illustrated in FIGS. 2*a*, 2*b*, and 2*c*) of the network device 10 are implemented by the one or more processors 702 executing software (e.g., depicted as computer readable instructions 704 in FIG. 7) that may be stored in a memory (e.g., depicted as storage medium 706 in FIG. 7).

For example, the processor 702 may execute the computer readable instructions 704 in order to intercept communiqué aspect data 53 that is directed to an end user entity 30 and that indicates one or more aspects of a communiqué 52 directed to the end user entity 30 and that is affiliated with a particular source entity 20, the intercepting of the communiqué aspect data 53 being in accordance with one or more conditional directives 50 of the end user entity 30 to conditionally obfuscate the communiqué 52 affiliated with the source entity 20; and to transmit to the end user entity 30, in response to intercepting the communiqué aspect data 53 and in lieu of transmitting direct indication of the communiqué 52 to the end user entity 30, covert indicator data 54 that upon reception by the end user entity 30 covertly indicates one or more aspects of the communiqué 52 as illustrated by the operational flow 300 of FIG. 3.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk; a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A system, comprising:

(a) communiqué aspect data intercepting module configured to intercept communiqué aspect data transmitted to a communication device associated with an end user, the intercepting to prevent the communiqué aspect data from reaching at least temporarily the communication device, the communiqué aspect data to be intercepted indicating one or more aspects of a communiqué that is directed to the communication device and that is affiliated with a particular source entity, the intercepting of the communiqué aspect data being in accordance with one or more conditional directives received via the communication device, wherein the communiqué aspect data intercepting module is separate from the communication device; and (b) covert indicator data transmitting module configured to transmit to the communication device covert indicator data that upon reception by the communication device covertly indicates at least some of the one or more aspects and/or one or more other aspects of the communiqué, the transmission of the covert indicator data being in response to the intercepting of the communiqué aspect data and in lieu of transmitting direct indication of the communiqué to the communication device, wherein the covert indicator data transmitting module includes at least:

(i) a covert indicator data transmitting module configured to transmit to the communication device covert indicator data that when received by the communication device causes the communication device to present a covert indicator that covertly indicates one or more aspects of the communiqué and/or one or more other aspects of the communiqué, wherein the covert indicator data transmitting module configured to transmit to the communication device covert indicator data that when received by the communication device causes the communication device to present a covert indicator that covertly indicates one or more aspects of the communiqué and/or one or more other aspects of the communiquéincludes at least:

(A) a covert indicator data transmitting module configured to transmit to the communication device predefined data that when received by the communication device causes the communication device to present at least one predefined covert indicator that covertly indicates one or more aspects of the communiqué and/or one or more other aspects of the communiqué, wherein the at least one predefined covert indicator covertly indicates, without explicitly indicating, as the one or more covertly indicated aspects and/or one or more other aspects of the communiqué at least one of an identity of the source entity, a subject heading of the communiqué, or a reception time of the communiqué; and wherein at least one of the communiqué aspect data intercepting module or the covert indicator data transmitting module is implemented at least in part with hardware.

2. The system of claim 1, wherein said communiqué aspect data intercepting module comprises:

a communiqué aspect data holding module configured to hold the communiqué aspect data, at least temporarily in memory without releasing the communiqué aspect data, in order to prevent the communiqué aspect data from reaching the communication device, the holding of the communiqué aspect data being in accordance with the one or more conditional directives.

3. The system of claim 2, wherein said communiqué aspect data holding module comprises:

a communiqué aspect data holding module including a triggering event determining module configured to hold the communiqué aspect data without releasing the communiqué aspect data to the communication device at least until the triggering event determining module determines occurrence of one or more triggering events associated with the communication device.

4. The system of claim 3, wherein said communiqué aspect data holding module including a triggering event determining module comprises:

a communiqué aspect data holding module including a communication device location determining module configured to hold the communiqué aspect data without releasing the communiqué aspect data to the communication device at least until the communication device location determining module determines that the communication device is at one or more locations as specified by the one or more conditional directives.

5. The system of claim 3, wherein said communiqué aspect data holding module including a triggering event determining module comprises:

a communiqué aspect data holding module including a communication device location determining module configured to hold the communiqué aspect data without releasing the communiqué aspect data to the communication device at least until the communication device location determining module determines that the communication device is outside of one or more locations as specified by the one or more conditional directives.

6. The system of claim 3, wherein said communiqué aspect data holding module including a triggering event determining module comprises:

a communiqué aspect data holding module including a communication device time determining module configured to hold the communiqué aspect data without releasing the communiqué aspect data to the communication device at least until the communication device time determining module determines that the communication device is at one or more specified points and/or intervals of time as specified by the one or more conditional directives.

7. The system of claim 3, wherein said communiqué aspect data holding module including a triggering event determining module comprises:

a communiqué aspect data holding module including a third party proximity determining module configured to hold the communiqué aspect data without releasing the communiqué aspect data to the communication device at least until the third party proximity determining module determines that one or more third parties, as specified by the one or more conditional directives, are not within proximate vicinity of the communication device.

8. The system of claim 3, wherein said communiqué aspect data holding module including a triggering event determining module comprises:

a communiqué aspect data holding module including an end user possession verifying module configured to hold the communiqué aspect data without releasing the communiqué aspect data to the communication device at least until the end user possession verifying module obtains verification that the end user has possession of the communication device.

9. The system of claim 1, wherein said communiqué aspect data intercepting module comprises:

a communiqué aspect data intercepting module including an environmental condition determining module configured to intercept the communiqué aspect data as a function of one or more environmental conditions of the communication device, the one or more environmental conditions being determined by the environmental condition determining module.

10. The system of claim 9, wherein said communiqué aspect data intercepting module including an environmental condition determining module comprises:

a communiqué aspect data intercepting module including an environmental condition determining module configured to intercept the communiqué aspect data as a function of one or more environmental conditions as determined by the environmental condition determining module based at least in part on data provided by the communication device, the data including at least sensor data from one or more sensors, the sensor data including at least image data and/or audio data.

11. The system of claim 9, wherein said communiqué aspect data intercepting module including an environmental condition determining module comprises:

a communiqué aspect data intercepting module including a communication device location determining module configured to intercept the communiqué aspect data as a function of location of the communication device as specified by the one or more conditional directives, the location of the communication device being determined by the communication device location determining module.

12. The system of claim 9, wherein said communiqué aspect data intercepting module including an environmental condition determining module comprises:

a communiqué aspect data intercepting module including a communication device time determining module configured to intercept the communiqué aspect data as a function of time with respect to the communication device as specified by the one or more conditional directives, the time with respect to the communication device being determined by the communication device time determining module.

13. The system of claim 9, wherein said communiqué aspect data intercepting module including an environmental condition determining module comprises:

a communiqué aspect data intercepting module including a third party proximity determining module configured to intercept the communiqué aspect data in response at least in part to the third party proximity determining module determining that one or more third parties, as specified by the one or more conditional directives, are within proximate vicinity of the communication device.

14. The system of claim 1, wherein said covert indicator data transmitting module configured to transmit to the communication device covert indicator data that upon reception by the communication device covertly indicates at least some of the one or more aspects and/or one or more other aspects of the communiqué, the transmission of the covert indicator data being in response to the intercepting of the communiqué aspect data and in lieu of transmitting direct indication of the communiqué to the communication device comprises:

a covert indicator data transmitting module configured to transmit the covert indicator data to the communication device in response to intercepting the communiqué aspect data and in lieu of transmitting to the communication device all direct indications of the communiqué.

15. The system of claim 14, wherein said covert indicator data transmitting module comprises:

a covert indicator data transmitting module configured to transmit the covert indicator data to the communication device in response to intercepting the communiqué aspect data and in lieu of transmitting the communiqué to the communication device.

16. The system of claim 14, wherein said covert indicator data transmitting module comprises:

a covert indicator data transmitting module configured to transmit the covert indicator data to the communication device in response to intercepting the communiqué aspect data and in lieu of transmitting the communiqué aspect data to the communication device.

17. The system of claim 14, wherein said covert indicator data transmitting module comprises:

a covert indicator data transmitting module configured to transmit the covert indicator data to the communication device in response to intercepting the communiqué aspect data and in lieu of transmitting to the communication device header-type data associated with the communiqué.

18. The system of claim 17, wherein said covert indicator data transmitting module comprises:

a covert indicator data transmitting module configured to transmit the covert indicator data to the communication device in response to intercepting the communiqué aspect data and in lieu of transmitting to the communication device any data that directly identifies the source entity affiliated with the communiqué, subject heading of the communiqué, and/or reception time of the communiqué.

19. The system of claim 1, wherein said covert indicator data transmitting module configured to transmit to the communication device predefined data that when received by the communication device causes the communication device to present at least one predefined covert indicator that covertly indicates one or more aspects of the communiqué and/or one or more other aspects of the communiqué, wherein the at least one predefined covert indicator covertly indicates, without explicitly indicating, as the one or more covertly indicated aspects and/or one or more other aspects of the communiqué at least one of an identity of the source entity, a subject heading of the communiqué, or a reception time of the communiqué comprises:

a covert indicator data transmitting module configured to transmit to the communication device predefined data that is defined at least in part by the one or more conditional directives.

20. The system of claim 1, wherein said covert indicator data transmitting module configured to transmit to the communication device covert indicator data that when received by the communication device causes the communication device to present a covert indicator that covertly indicates one or more aspects of the communiqué and/or one or more other aspects of the communiqué comprises:

a covert indicator data transmitting module configured to transmit to the communication device covert indicator data that when received by the communication device causes the communication device to present a covert indicator that indirectly indicates the at least some of the one or more aspects and/or one or more other aspects of the communiqué.

21. The system of claim 20, wherein said covert indicator data transmitting module comprises:

a covert indicator data transmitting module configured to transmit to the communication device covert indicator data that when received by the communication device causes the communication device to present a covert audio indicator that audibly indirectly indicates to the end user the at least some of the one or more aspects and/or one or more other aspects of the communiqué.

22. The system of claim 21, wherein said covert indicator data transmitting module comprises:

a covert indicator data transmitting module configured to transmit to the communication device covert indicator data that when received by the communication device causes the communication device to present audibly at least a ping, a ring, and/or a hum that indirectly indicates to the end user the at least some of the one or more aspects and/or one or more other aspects of the communiqué.

23. The system of claim 21, wherein said covert indicator data transmitting module comprises:

a covert indicator data transmitting module configured to transmit to the communication device covert indicator data that when received by the communication device causes the communication device to present audibly one or more simulated natural background noises that indirectly indicates to the end user the at least some of the one or more aspects and/or one or more other aspects of the communiqué.

24. The system of claim 21, wherein said covert indicator data transmitting module comprises:

a covert indicator data transmitting module configured to transmit to the communication device covert indicator data that when received by the communication device causes the communication device to present audibly, at least one voice message that indirectly indicates to the end user the at least some of the one or more aspects and/or one or more other aspects of the communiqué.

25. The system of claim 24, wherein said covert indicator data transmitting module comprises:

a covert indicator data transmitting module configured to transmit to the communication device covert indicator data that when received by the communication device causes the communication device to present audibly at least one voice message that was created to indirectly indicate to the end user the at least some of the one or more aspects and/or one or more other aspects of the communiqué.

26. The system of claim 24, wherein said covert indicator data transmitting module comprises:

a covert indicator data transmitting module configured to transmit to the communication device covert indicator data that when received by the communication device causes the communication device to present audibly at least one voice message that was previously presented to indirectly indicate to the end user the at least some of the one or more aspects and/or one or more other aspects of the communiqué.

27. The system of claim 26, wherein said covert indicator data transmitting module comprises:

a covert indicator data transmitting module configured to transmit to the communication device covert indicator data that when received by the communication device causes the communication device to present audibly at least one voice message that was previously presented and that has been modified to indirectly indicate to the end user the at least some of the one or more aspects and/or one or more other aspects of the communiqué.

28. The system of claim 20, wherein said covert indicator data transmitting module comprises:

a covert indicator data transmitting module configured to transmit to the communication device covert indicator data that when received by the communication device causes the communication device to present a covert visual indicator that visually indirectly indicates to the end user the at least some of the one or more aspects and/or one or more other aspects of the communiqué.

29. The system of claim 28, wherein said covert indicator data transmitting module comprises:

a covert indicator data transmitting module configured to transmit to the communication device covert indicator data that when received by the communication device causes the communication device to present one or more visual symbols and/or icons that visually indirectly indicates to the end user the at least some of the one or more aspects and/or one or more other aspects of the communiqué.

30. The system of claim 28, wherein said covert indicator data transmitting module comprises:

a covert indicator data transmitting module configured to transmit to the communication device covert indicator data that when received by the communication device causes the communication device to present one or more particular colors that visually indirectly indicates to the end user the at least some of the one or more aspects and/or one or more other aspects of the communiqué.

31. The system of claim 28, wherein said covert indicator data transmitting module comprises:

a covert indicator data transmitting module configured to transmit to the communication device covert indicator data that when received by the communication device causes the communication device to present at least one visual message that visually indirectly indicates to the end user the at least some of the one or more aspects and/or one or more other aspects of the communiqué.

32. The system of claim 31, wherein said covert indicator data transmitting module comprises:

a covert indicator data transmitting module configured to transmit to the communication device covert indicator data that when received by the communication device causes the communication device to present one or more visual words and/or phrases that visually indirectly indicates to the end user the at least some of the one or more aspects and/or one or more other aspects of the communiqué.

33. The system of claim 32, wherein said covert indicator data transmitting module comprises:

a covert indicator data transmitting module configured to transmit to the communication device covert indicator data that when received by the communication device causes the communication device to present the one or more visual words and/or phrases in a particular font and/or style that visually indirectly indicates to the end user the at least some of the one or more aspects and/or one or more other aspects of the communiqué.

34. The system of claim 31, wherein said covert indicator data transmitting module comprises:

a covert indicator data transmitting module configured to transmit to the communication device covert indicator data that when received by the communication device causes the communication device to present a visual message that was previously presented to visually indirectly indicate to the end user the at least some of the one or more aspects and/or one or more other aspects of the communiqué.

35. The system of claim 34, wherein said covert indicator data transmitting module comprises:

a covert indicator data transmitting module configured to transmit to the communication device covert indicator data that when received by the communication device causes the communication device to present a visual message that was previously presented and that has been modified to visually indirectly indicate to the end user the at least some of the one or more aspects and/or one or more other aspects of the communiqué.

36. The system of claim 20, wherein said covert indicator data transmitting module comprises:

a covert indicator data transmitting module configured to transmit to the communication device covert indicator data that when received by the communication device causes the communication device to present a covert vibrating indicator that indirectly indicates to the end user, via specific vibration, the at least some of the one or more aspects and/or one or more other aspects of the communiqué.

37. The system of claim 1, wherein said covert indicator data transmitting module configured to transmit to the communication device covert indicator data that upon reception by the communication device covertly indicates at least some of the one or more aspects and/or one or more other aspects of the communiqué, the transmission of the covert indicator data being in response to the intercepting of the communiqué aspect data and in lieu of transmitting direct indication of the communiqué to the communication device comprises:

a covert indicator data transmitting module configured to transmit to the communication device covert indicator data that does not, at least directly, identify the source entity as a source for the communiqué.

38. The system of claim 37, wherein said covert indicator data transmitting module comprises:

a covert indicator data transmitting module configured to transmit to the communication device covert indicator data that does not include any representations of the source entity.

39. The system of claim 38, wherein said covert indicator data transmitting module comprises:

a covert indicator data transmitting module configured to transmit to the communication device covert indicator data that includes one or more locum tenentes for one or more representations of the source entity.

40. The system of claim 1, wherein said communiqué aspect data intercepting module comprises:

a conditional directive receiving module configured to receive the one or more conditional directives from the communication device, wherein the conditional directive receiving module is separate from the communication device.

41. The system of claim 1, wherein the communiqué aspect data intercepting module comprises:

a communiqué aspect data intercepting module configured to intercept communiqué aspect data that is transmitted to the communication device, the communiqué aspect data intercepting module being configured to intercept the transmitted communiqué aspect data by diverting the transmitted communiqué aspect data into one or more memories and holding the diverted communiqué aspect data without releasing it until occurrence of one or more triggering events.

42. The system of claim 1, wherein the covert indicator data transmitting module configured to transmit to the communication device predefined data that when received by the communication device causes the communication device to present at least one predefined covert indicator that covertly indicates one or more aspects of the communiqué and/or one or more other aspects of the communiqué, wherein the at least one predefined covert indicator covertly indicates, without explicitly indicating, as the one or more covertly indicated aspects and/or one or more other aspects of the communiqué at least one of an identity of the source entity, a subject heading of the communiqué, or a reception time of the communiqué comprises:

a covert indicator data transmitting module configured to transmit to the communication device predefined data that when received by the communication device causes the communication device to present the at least one predefined covert indicator that covertly indicates, without explicitly indicating, at least a subject heading of the communiqué.

43. The system of claim 1, wherein the covert indicator data transmitting module configured to transmit to the communication device predefined data that when received by the communication device causes the communication device to present at least one predefined covert indicator that covertly indicates one or more aspects of the communiqué and/or one or more other aspects of the communiqué, wherein the at least one predefined covert indicator covertly indicates, without explicitly indicating, as the one or more covertly indicated aspects and/or one or more other aspects of the communiqué at least one of an identity of the source entity, a subject heading of the communiqué, or a reception time of the communiqué comprises:

a covert indicator data transmitting module configured to transmit to the communication device predefined data that when received by the communication device causes the communication device to present predefined covert indicator that covertly indicates one or more aspects of the communiqué, the predefined covert indicator being known by the end user.

44. An article of manufacture comprising:

a signal-bearing non-transitory storage medium bearing:

one or more instructions for intercepting communiqué aspect data that is transmitted to a communication device associated with an end user, the intercepting to prevent the communiqué aspect data from reaching at least temporarily the communication device, the communiqué aspect data to be intercepted indicating one or more aspects of a communiqué that is directed to the communication device and that is affiliated with a particular source entity, the intercepting of the communiqué aspect data being in accordance with one or more conditional directives received via the communication device, wherein the intercepting is performed separately from the communication device; and one or more instructions for transmitting to the communication device covert indicator data that upon reception by the communication device covertly indicates at least some of the one or more aspects and/or one or more other aspects of the communiqué, the transmission of the covert indicator data being in response to the intercepting of the communiqué aspect data and in lieu of transmitting direct indication of the communiqué to the communication device, the one or more instructions for transmitting to the communication device covert indicator data including at least:

one or more instructions for transmitting to the communication device covert indicator data that when received by the communication device causes the communication device to present a covert indicator that covertly indicates one or more aspects of the communiqué and/or one or more other aspects of the communiqué, wherein the one or more instructions for transmitting to the communication device covert indicator data that when received by the communication device causes the communication device to present a covert indicator that covertly indicates one or more aspects of the communiqué and/or one or more other aspects of the communiqué includes at least:

one or more instructions for transmitting to the communication device predefined data that when received by the communication device causes the communication device to present at least one predefined covert indicator that covertly indicates one or more aspects of the communiqué and/or one or more other aspects of the communiqué, wherein the at least one predefined covert indicator covertly indicates, without explicitly indicating, as the one or more covertly indicated aspects and/or one or more other aspects of the communiqué at least one of an identity of the source entity, a subject heading of the communiqué, or a reception time of the communiqué.

45. A system, comprising:

a communiqué aspect data intercepting module configured to intercept communiqué aspect data that is transmitted to an end user entity, the intercepting to prevent the communiqué aspect data from reaching at least temporarily the end user entity, the communiqué aspect data to be intercepted indicating one or more aspects of a communiqué that is directed to the end user entity and that is affiliated with a particular source entity, the intercepting of the communiqué aspect data being in accordance with one or more conditional directives of the end user entity, wherein the communiqué aspect data intercepting module is separate from the end user entity; and a covert indicator data transmitting module configured to transmit to the end user entity covert indicator data that upon reception by the end user entity covertly indicates at least some of the one or more aspects of the communiqué and/or one or more other aspects of the communiqué, including at least an indication of at least one of an identity of the source entity, a subject heading of the communiqué, or a reception time of the communiqué, the transmitted covert indicator data to include predefined data configured to covertly indicate without explicitly indicating, the at least some of the one or more aspects of the communiqué and/or one or more other aspects of the communiqué at least in part by causing presentation of at least one predefined covert indicator that covertly indicates, the at least some of the one or more aspects of the communiquéand/or one or more other aspects of the communiqué, the transmission of the covert indicator data being in response to the intercepting of the communiqué aspect data and in lieu of transmitting direct indication of the communiqué to the end user entity; and wherein at least one of the communiqué aspect data intercepting module or the covert indicator data transmitting module is at least partly implemented with hardware.

46. The system of claim 45, wherein the covert indicator data transmitting module configured to transmit to the end user entity covert indicator data that upon reception by the end user entity covertly indicates at least some of the one or more aspects of the communiqué and/or one or more other aspects of the communiqué, including at least an indication of at least one of an identity of the source entity, a subject heading of the communiqué, or a reception time of the communiqué, the transmitted covert indicator data to include predefined data configured to covertly indicate without explicitly indicating, the at least some of the one or more aspects of the communiqué and/or one or more other aspects of the communiqué at least in part by causing presentation of at least one predefined covert indicator that covertly indicates, the at least some of the one or more aspects of the communiqué and/or one or more other aspects of the communiqué, the transmission of the covert indicator data being in response to the intercepting of the communiqué aspect data and in lieu of transmitting direct indication of the communiqué to the end user entity comprises:

a covert indicator data transmitting module configured to transmit to the end user entity covert indicator data that when received by a communication device causes the communication device to present a covert indicator that covertly indicates at least some of the one or more aspects of the communiqué and/or one or more other aspects of the communiqué.

47. The system of claim 46, wherein the covert indicator data transmitting module configured to transmit to the end user entity covert indicator data that when received by a communication device causes the communication device to present a covert indicator that covertly indicates at least some of the one or more aspects of the communiqué and/or one or more other aspects of the communiqué comprises:

a covert indicator data transmitting module configured to transmit to the end user entity predefined data that when received by the communication device causes the communication device to present at least one predefined covert indicator that covertly indicates at least some of the one or more aspects of the communiqué and/or one or more other aspects of the communiqué.

* * * * *